(12) United States Patent
Fenley

(10) Patent No.: US 7,064,513 B2
(45) Date of Patent: Jun. 20, 2006

(54) PHASE ANGLE CONTROL FOR SYNCHRONOUS MACHINE CONTROL

(75) Inventor: Thomas D. Fenley, Perkasie, PA (US)

(73) Assignee: J. L. Behmer Corporation, Perkasie, PA (US)

( * ) Notice: Subject to any disclaimer, the term of this patent is extended or adjusted under 35 U.S.C. 154(b) by 0 days.

(21) Appl. No.: 10/955,451

(22) Filed: Sep. 30, 2004

(65) Prior Publication Data
US 2005/0073279 A1 Apr. 7, 2005

Related U.S. Application Data

(60) Provisional application No. 60/507,555, filed on Oct. 1, 2003.

(51) Int. Cl.
H02P 1/46 (2006.01)

(52) U.S. Cl. .................. 318/700; 318/712; 318/798

(58) Field of Classification Search ............... 318/713, 318/712, 700, 798, 706, 707, 710, 723, 786, 318/803, 807
See application file for complete search history.

(56) References Cited

U.S. PATENT DOCUMENTS

| | | |
|---|---|---|
| 2,444,077 A | 6/1948 | Weathers |
| 2,561,654 A | 7/1951 | Eller |
| 2,581,436 A | 1/1952 | McCarthy |
| 2,768,341 A | 10/1956 | Landis |
| 2,839,692 A | 6/1958 | Kirchmayer |
| 2,853,665 A | 9/1958 | Choudhury |
| 2,881,377 A | 4/1959 | Apa et al. |
| 2,888,129 A | 5/1959 | Chapman |
| 2,922,052 A | 1/1960 | Peaslee |
| 2,962,598 A | 11/1960 | Larew et al. |
| 3,431,483 A | 3/1969 | Lafuze |
| 4,039,930 A | 8/1977 | Lukas |
| 4,088,934 A | 5/1978 | D'Atre et al. |
| 4,489,265 A | 12/1984 | Kuznetsov |
| 4,532,460 A | 7/1985 | Gale et al. |
| 4,549,121 A | 10/1985 | Gale |
| 4,598,240 A | 7/1986 | Gale et al. |
| 4,638,224 A | 1/1987 | Gritter |
| 4,651,066 A | 3/1987 | Gritter et al. |
| 4,698,562 A | 10/1987 | Gale et al. |
| 4,719,381 A | 1/1988 | Miles |
| 4,977,362 A * | 12/1990 | Mader ................. 318/713 |
| 5,729,118 A * | 3/1998 | Yanagisawa et al. ....... 322/29 |
| 6,320,350 B1 | 11/2001 | Take |

OTHER PUBLICATIONS

Intersil, HIP4086 3-Phase Bridge Driver Configurations and Applications, Application Note, Feb. 2003, AN9642.3, pp. 1-13.
Intersil, HIP4086, Data Sheet, May 1999, File No. 4220.4, pp. 1-9.
Analog Devices, 28-Lead Flash Memory, DSP Motor Controller with Current Sense, Preliminary Technical Data, (Copyright 2000, exact date unknown) ADMCF328, pp. 1-36.
DSP-Based Motor Controller Seminar, Spring 2000, Analog Devices, slides 49-56.

* cited by examiner

Primary Examiner—Karen Masih
(74) Attorney, Agent, or Firm—Akin Gump Strauss Hauer & Feld, LLP

(57) ABSTRACT

A synchronous machine with 3-phase sensors set 120° apart and 90° advanced is used to provide commutation from a direct current source. A time delay circuit with an electronically implemented algorithm controls torque by delaying the 90° advance. This delay is controlled by a linear voltage, independent of frequency, and can be used to control position, speed, or acceleration. A delay beyond 90° advance causes commutation to cease, and the alternating current machine switches to a generator, indicative of motive power being applied. If motive power ceases, the alternating current machine switches to a motor. Controlled switching can be less than half of one hertz.

26 Claims, 43 Drawing Sheets

| A | B | C | ELEC* | STEP POSITION |
|---|---|---|-------|---------------|
| 0 | 1 | 1 | 60°   | 1 |
| 0 | 0 | 1 | 60°   | 2 |
| 1 | 0 | 1 | 60°   | 3 |
| 1 | 0 | 0 | 60°   | 4 |
| 1 | 1 | 0 | 60°   | 5 |
| 0 | 1 | 0 | 60°   | 6 |
| 0 | 1 | 1 | 60°   | 1 |
| 0 | 0 | 1 | 60°   | 2 |

\* INCREMENTAL ADVANCE

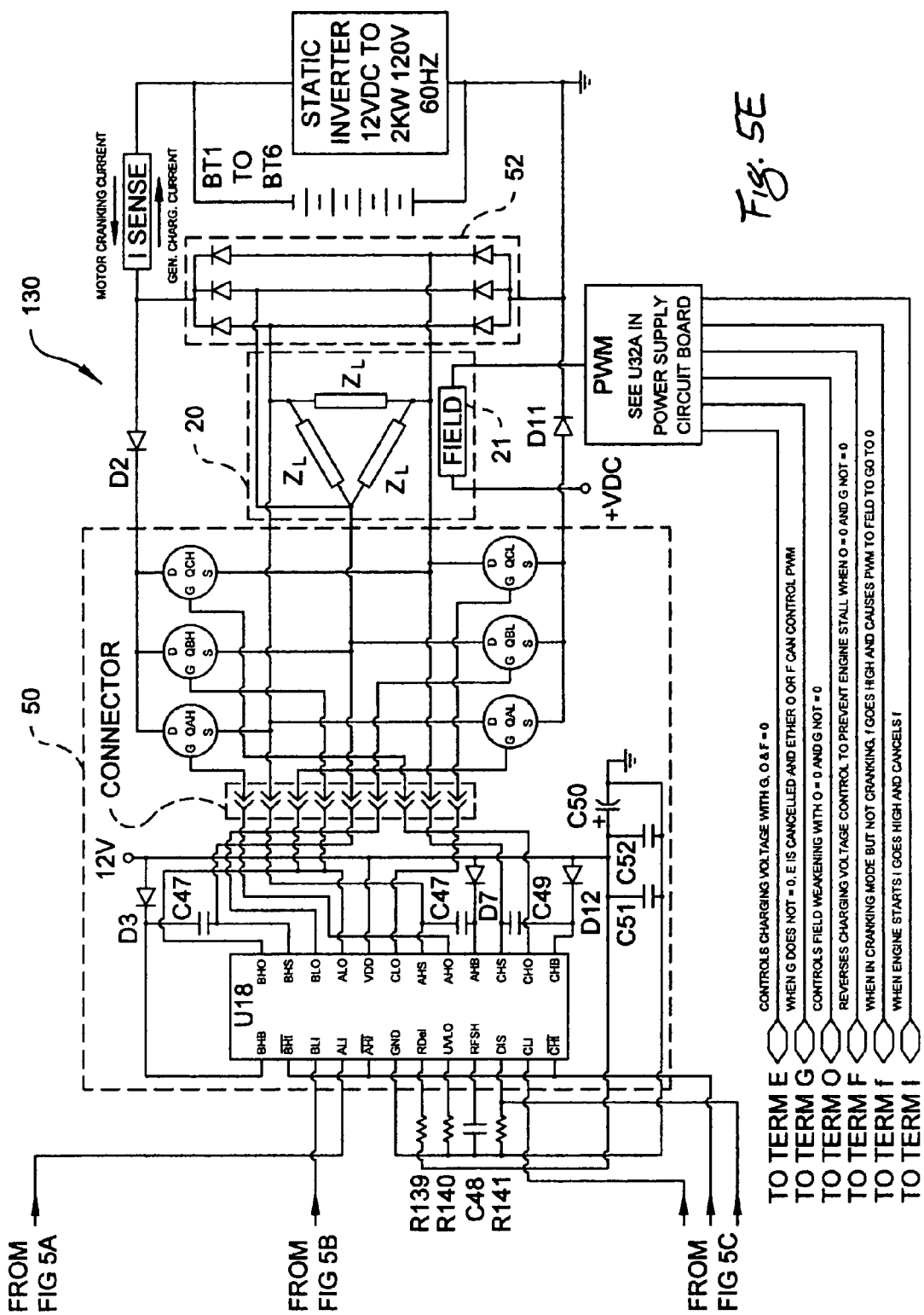

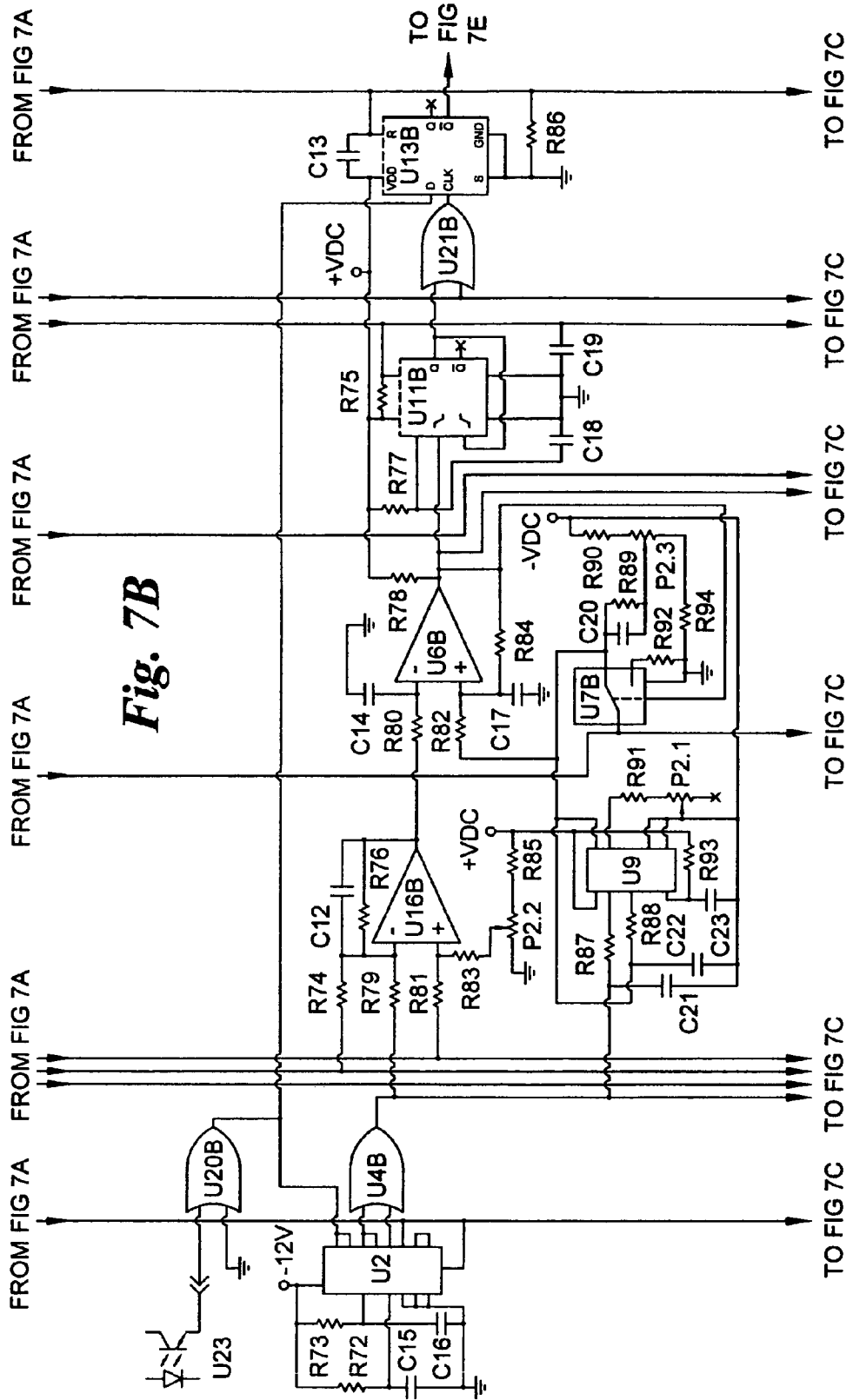

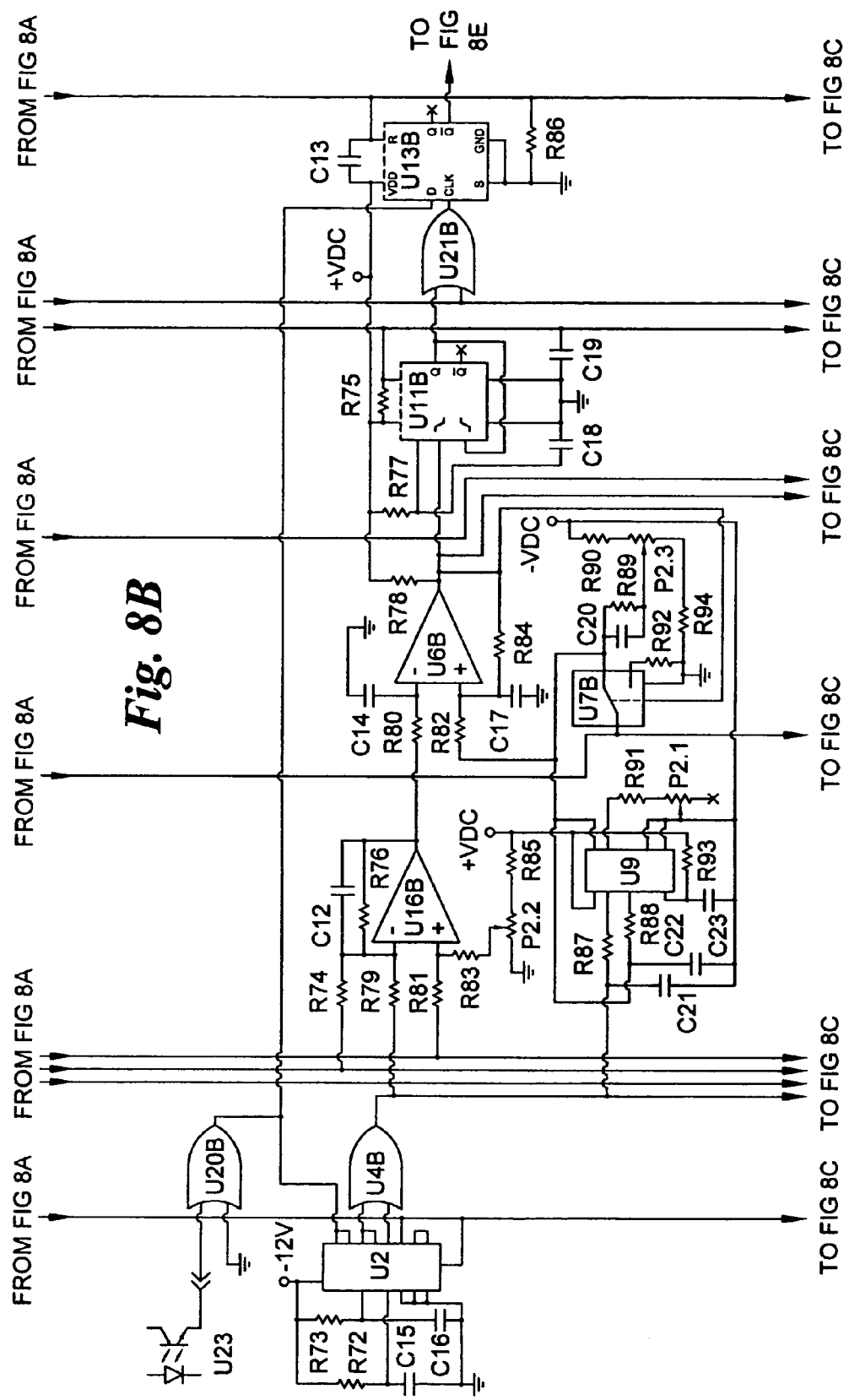

Fig. 13

| U2B | | | | | | U2C | | | | |
|---|---|---|---|---|---|---|---|---|---|---|
| % | $E_0$ | $E_1$④ | $E_2$⑥ | $V_1$① | $V_2$② | $V_3$⑤ | $E'_0$⑥ | $E'_1$④ | $E'_2$③ | $V'_1$② | $V'_2$⑤ |
| 0 | 1.5 | 0.2 | 0 | 0 | -2.1182 | 1.20 | 0 | 0.2 | .57045 | -2.1182 | 1.20 |
| 25 | 5.0 | 3.7 | 0 | 0 | -2.1182 | 2.95 | 0 | 3.7 | .57045 | -2.1182 | 2.95 |
| 50 | 8.5 | 7.2 | 0 | 0 | -2.1182 | 4.70 | 0 | 7.2 | .57045 | -2.1182 | 4.70 |
| 75 | 12.0 | 10.7 | 0 | 0 | -2.1182 | 6.45 | 0 | 10.7 | .57045 | -2.1182 | 6.45 |
| 100 | 15.5 | 14.2 | 0 | 0 | -2.1182 | 8.20 | 0 | 14.2 | .57045 | -2.1182 | 8.20 |

① $V_1$ REMAINS AT 0V WHILE CHARGING BUT GOES HI (12V) FOR S.D., CLOSES THROTTLE SWITCH, AND REMAINS HI WHILE IN "SLEEP" MODE. IT GOES LO (0V) FOR STARTING AND CHARGING (OPENS THROTTLE).

② $V_2$ AND $V'_1$ ARE TIED TOGETHER AND PROVIDE A FIXED BIAS OF APPROX. -2V FOR U2B AND U2C.

③ $E'_2$ IS A FIXED BIAS SET AT 0.57V FOR U2C.

④ $E_1$ AND $E'_1$ ARE CONNECTED TOGETHER TO KW LOAD. A SUDDEN INCREASE IN KW LOAD THAT KVRPM CANNOT TRACK WILL CAUSE $E'_0$ OF U2C TO RISE ABOVE 0V. WITH $E'_0$ OF U2C CONNECTED TO $E_2$ OF U2B (SEE⑥), $E_0$ OF U2B WILL RISE AND OPEN THROTTLE REGARDLESS OF ALL OTHER INPUTS TO U2B.

⑤ $V_3$ AND $V'_2$ ARE CONNECTED TOGETHER TO KVRPM. ANYTIME KVRPM CANNOT TRACK AN INCREASE IN KW LOAD (SEE④), $E'_0$ OF U2C WILL RISE ABOVE 0V, AND THROUGH TERMINAL F TO PWM FOR ALTERNATOR FIELD, WILL REDUCE CHARGING VOLTAGE. THIS ACTION REMOVES THE KW LOAD ON THE ALTERNATOR AND TRANSFERRING TO THE BATTERY ALLOWS I.C. ENGINE RPM TO INCREASE.

⑥ $E'_0$ AND $E_2$ ARE CONNECTED TOGETHER, AND $E_2$ OF U2B HAS A GAIN OF 22.

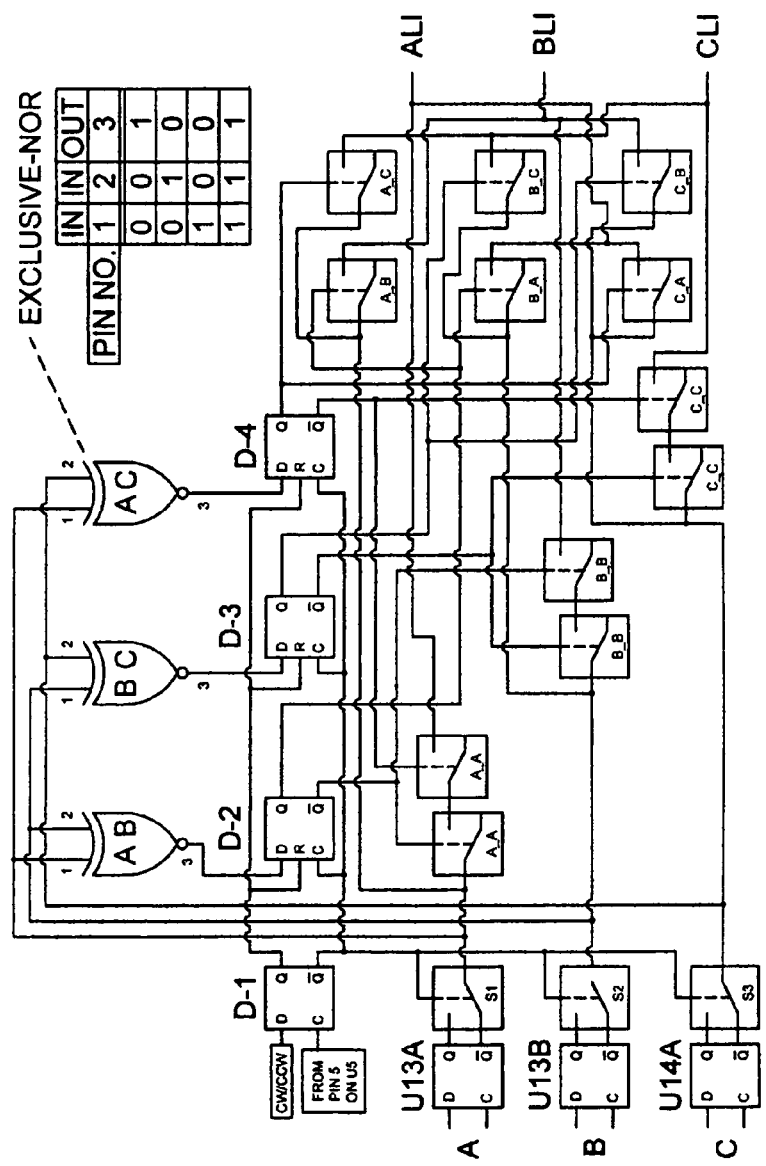

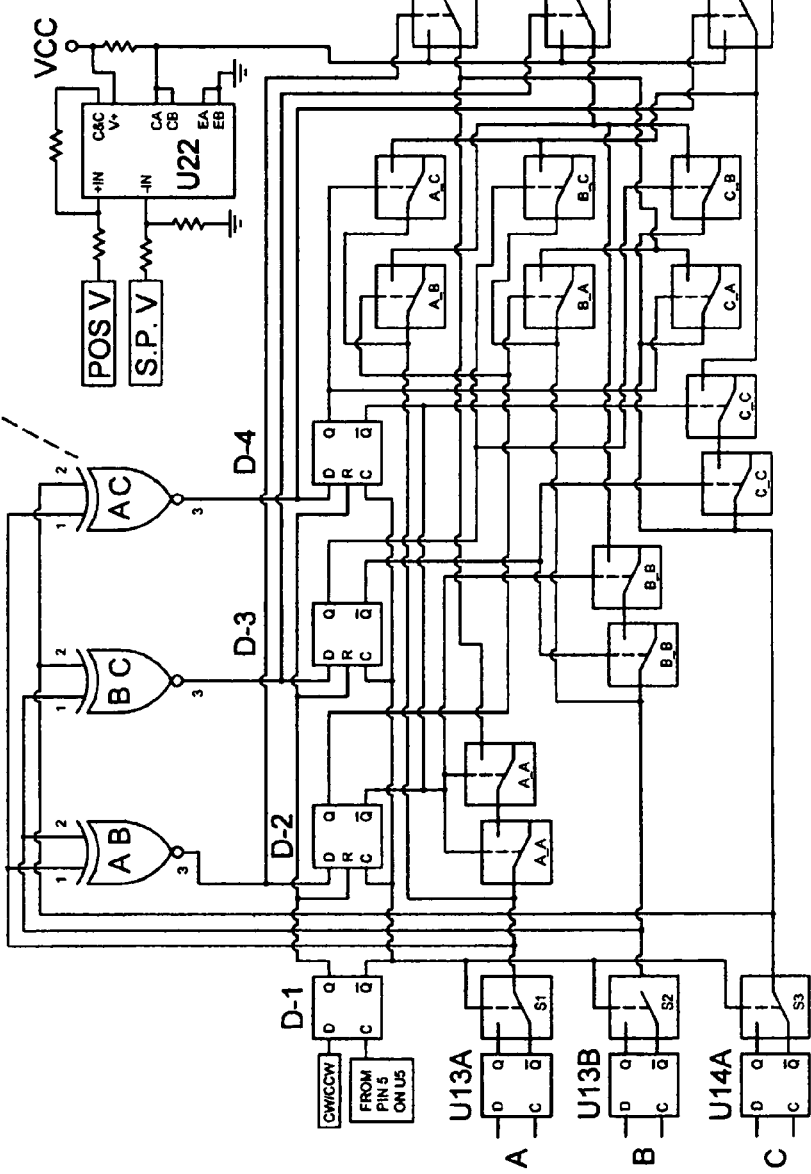

| A RxCx | 5 | msec |
|---|---|---|
| B | 2.47 | volts |
| C | -1.12921 | volts |
| E | -0.39665 | volts |
| D | 2.32 | volts |

*Fig. 20B* t-Dis = 60/(21*Vrpm)
T = 60/(28*Vrpm)
t prime = A *LN(0.9375*(B*Vrpm + C + 1.8)/(D*Vrpm + E))
Initial Vrpm = ((0.9375 * (B * Vrpm + 1.8 + C)/e^(t/5))-E)/D

| Start Vc | Trip Vc | Vrpm | t | t prime | Error | Error % | Ln function | t-dis |
|---|---|---|---|---|---|---|---|---|
| 1.416174 | 0.392151 | 0.34 | 6.3025 | 6.4203 | 0.118 | 1.87 | 3.611299 | 8.4033613 |
| 1.589846 | 0.566151 | 0.415 | 5.1635 | 5.1627 | -0.001 | -0.02 | 2.808166 | 6.8846816 |
| 1.786674 | 0.763351 | 0.5 | 4.2857 | 4.2520 | -0.034 | -0.79 | 2.340567 | 5.7142857 |
| 2.481362 | 1.459351 | 0.8 | 2.6786 | 2.6541 | -0.024 | -0.91 | 1.700319 | 3.5714286 |
| 3.176049 | 2.155351 | 1.1 | 1.9481 | 1.9384 | -0.010 | -0.49 | 1.473565 | 2.5974026 |
| 3.870737 | 2.851351 | 1.4 | 1.5306 | 1.5283 | -0.002 | -0.15 | 1.35751 | 2.0408163 |
| 4.565424 | 3.547351 | 1.7 | 1.2605 | 1.2616 | 0.001 | 0.08 | 1.286995 | 1.6806723 |
| 5.260112 | 4.243351 | 2 | 1.0714 | 1.0740 | 0.003 | 0.24 | 1.239613 | 1.4285714 |
| 5.954799 | 4.939351 | 2.3 | 0.9317 | 0.9348 | 0.003 | 0.34 | 1.205583 | 1.242236 |
| 6.649487 | 5.635351 | 2.6 | 0.8242 | 0.8274 | 0.003 | 0.39 | 1.17996 | 1.0989011 |
| 7.344174 | 6.331351 | 2.9 | 0.7389 | 0.7420 | 0.003 | 0.41 | 1.15997 | 0.9852217 |
| 8.038862 | 7.027351 | 3.2 | 0.6696 | 0.6724 | 0.003 | 0.41 | 1.143939 | 0.8928571 |
| 8.733549 | 7.723351 | 3.5 | 0.6122 | 0.6146 | 0.002 | 0.39 | 1.130798 | 0.8163265 |
| 9.428237 | 8.419351 | 3.8 | 0.5639 | 0.5659 | 0.002 | 0.35 | 1.119829 | 0.7518797 |
| 10.12292 | 9.115351 | 4.1 | 0.5226 | 0.5242 | 0.002 | 0.30 | 1.110536 | 0.6968641 |
| 10.81761 | 9.811351 | 4.4 | 0.4870 | 0.4882 | 0.001 | 0.24 | 1.102561 | 0.6493506 |
| 11.5123 | 10.50735 | 4.7 | 0.4559 | 0.4567 | 0.001 | 0.17 | 1.095642 | 0.6079027 |
| 12.20699 | 11.20335 | 5 | 0.4286 | 0.4290 | 0.000 | 0.09 | 1.089584 | 0.5714286 |
| 12.90167 | 11.89935 | 5.3 | 0.4043 | 0.4044 | 0.000 | 0.01 | 1.084233 | 0.5390836 |
| 13.59636 | 12.59535 | 5.6 | 0.3827 | 0.3824 | 0.000 | -0.07 | 1.079475 | 0.5102041 |
| 14.29105 | 13.29135 | 5.9 | 0.3632 | 0.3626 | -0.001 | -0.16 | 1.075214 | 0.4842615 |
| 14.52261 | 13.52335 | 6 | 0.3671 | 0.3564 | -0.001 | -0.20 | 1.073892 | 0.4761905 |

THROTTLE CONTROL

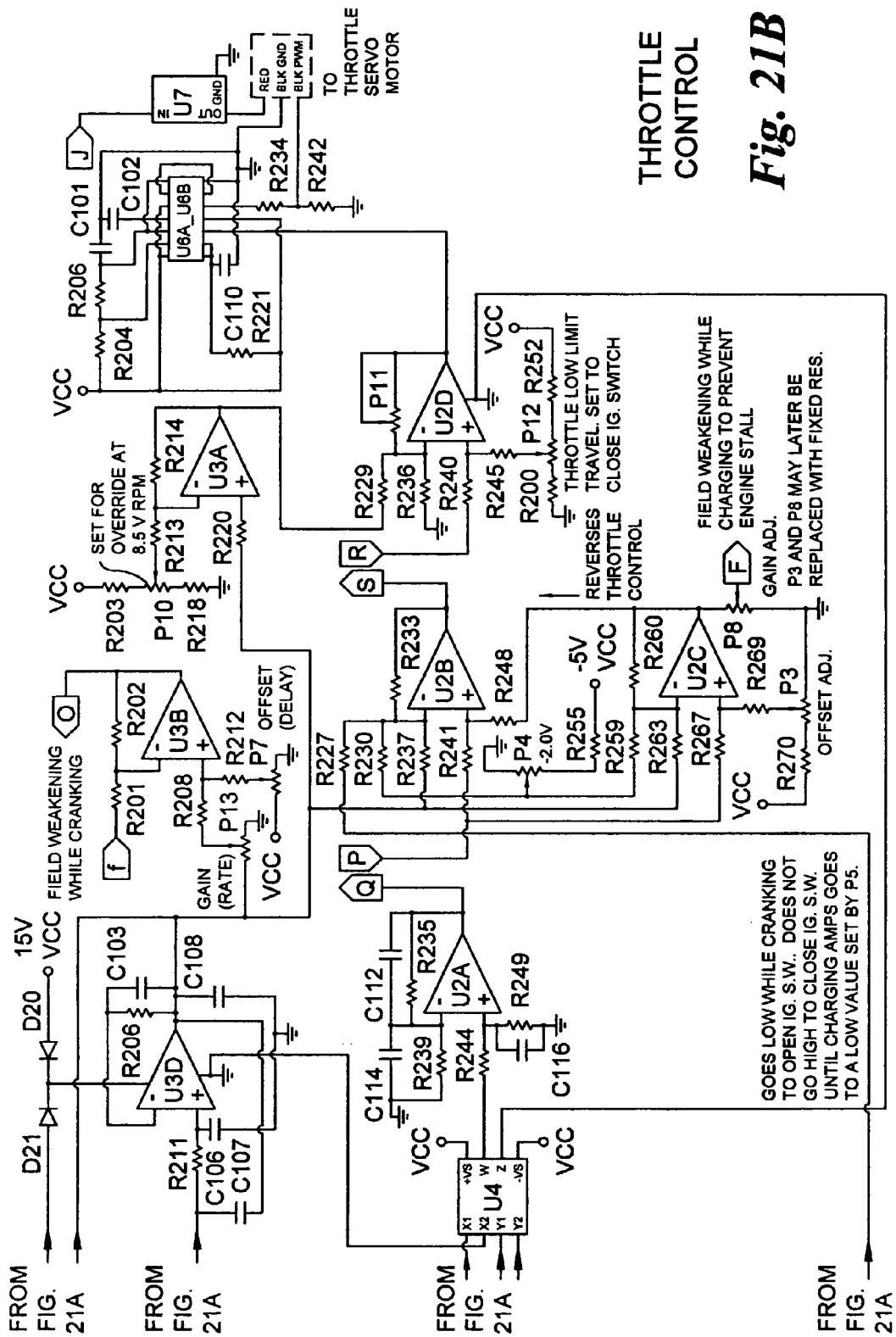
Fig. 21B THROTTLE CONTROL

IN ONE CYCLE OF 6 STEPS EACH POWER MOSFET OR IGBT CONDUCTS:

$\frac{1}{2}I$ FOR 1/3 OF THE TIME

AND $(\frac{I_T}{2})$ FOR 1/3 OF THE TIME = $I_{AV}$

WHERE R IS THE INTERNAL "ON" RESISTANCE OF A TYPICAL MOSFET.

$(\frac{I_T}{2}) \times \frac{1}{3} = I$, WHERE $I = I_{(AVER.)}$ $W = \frac{I_T^2 R}{4 \times 3} = I^2 R$ $I_T = I\sqrt{12}$ $I_T = I(3.464)$

∴ $I_T$ (CONTINUOUS AMPS) = 3.4611 TIMES $I_{(AVER)}$

PHASE ANGLE CONTROL FOR SYNCHRONOUS MACHINE CONTROL

CROSS-REFERENCE TO RELATED APPLICATIONS

This application claims the benefit of co-pending U.S. Provisional Patent Application No. 60/507,555, filed Oct. 1, 2003, entitled "Phase Angle Control for Synchronous Machine Control," the disclosure of which is incorporated herein by reference.

BACKGROUND OF THE INVENTION

The present invention relates generally to an apparatus and method for controlling electrical motors and generators, and more particularly, to an improved apparatus and method for controlling a synchronous electrical machine which selectively acts as both a motor and a generator by controlling phase angle.

A synchronous electrical motor can also act as a synchronous electrical generator, and therefore, devices which act as either a synchronous electrical motor or generator are referred to as synchronous electrical machines. Mechanical energy is changed into electrical energy by movement of a conductor through a magnetic field. The converse is also true wherein electrical energy is supplied to a conductor line normal to the magnetic field resulting in current flow in the conductor and mechanical force and thus mechanical energy being produced. Basically, the motor is the reverse of a generator; so simply stated, a synchronous motor is a synchronous machine that changes electrical energy into mechanical energy, and a synchronous generator is a synchronous machine that changes mechanical energy into electrical energy.

An alternator is a device that changes mechanical energy into alternating current to produce the electrical energy and is therefore an alternating current (AC) generator. On some applications the output of an alternator is rectified into direct current (DC) or in order to charge a battery or provide voltage and current (i.e., power) for a DC load.

A typical synchronous generator or motor, i.e., a synchronous machine, includes an armature core, an air gap, poles, and a yoke which form the magnetic circuit. The synchronous machine also includes an armature winding, a field winding, brushes and slip rings that form the electrical circuit. Further, the synchronous machine includes a frame, bells, bearings, brush supports and a shaft which together provide the mechanical support. The stator is generally the stationary component. The stator includes a group of individual electromagnets arranged in such a way that they form a hollow cylinder, with one pole of each magnet facing toward the center to the group. The rotor is the rotating electrical component, and the rotor includes a group of electromagnets arranged around a cylinder with the poles facing toward the stator poles. The rotor is located inside the stator and is mounted on the motor or generator shaft.

Another type of synchronous machine, a brushless version of the rotating magnetic field type, has armature coils for rotating the magnetic field in the stator and a field coil for the magnet in the rotor. Some synchronous machines utilize permanent magnets (PM) instead of electrically induced magnets to produce the magnetic moment of the rotor. PM type machines do not need electricity or slip rings, so such PM type machines are efficient in terms of energy consumption. However, PM type machines are generally expensive to produce and preclude the possibility of simple control of field strength needed when the synchronous machine under a varying RPM is to be both a motor and generator and under total control in either mode. Further, permanent-magnets are not permanent when inadvertently subjected to extreme high currents and extreme high temperature.

Other types of synchronous machines, which are really hybrid-type synchronous machines, include switched reluctance configurations with rotor position-triggered power electronics current control. The rotor position is either measured or estimated. The rotor position-triggered power electronics current control a variety of machines that are typically known as reluctance synchronous electric machines and drives with respect to rotor and stator configuration and stator current modes. Such reluctance synchronous machines have distributed anisotropy rotors formed of conventional or axial laminations with or without an equivalent cage winding in order to provide high saliency ratios from 6:1 to more than 20:1 which lead to high torque density, low loss, high power factor, and fast torque-speed transients. These types of hybrid-synchronous machines provide adequate improvements in control, however, they lack quick response and have difficulty in handling large KW needed for hybrid automobiles. They also lack a simple method of voltage control while in generating mode for braking.

Modern electric machines may generally have better efficiency and relatively reasonable costs in line-start applications and for power electronics and digital control in variable speed drives. As the cost of losses becomes higher and higher for line-start constant speed applications, high efficiency induction and synchronous motors are being produced at the cost of additional active materials (e.g., copper and iron).

Permanent magnets having high energy densities (~35 $J/cm^3$) are in existence and have been applied to synchronous, i.e., brushless, motors for high torque-density, low loss/torque, high KW/KVA ratio and fast torque and speed response drives with either sinusoidal or bipolar-rectangular current power electronics control. However, the relatively high costs of magnets, operating temperature limitations (100–150° C.) and the danger of PM demagnetization at high transient torques or at short circuit restrict the applications of such PM motors.

Vector control of induction motors provides almost equally fast speed dynamics with a lower cost rugged motor but with a slightly more complex and parameter-dependent controller and higher motor losses and static power converter ratings. Also, vector controlled induction motors are widely applied to spindle drives where a wide constant power (flux weakening) speed range is required. In applications where sustained large torque, low speed running is required, or in high precision machining (e.g., spindle) induction motor drives, the high rotor cage losses pose serious cooling and rotor thermal deformation problems, respectively.

Reluctance synchronous motors with distributed anisotropy rotors are made of conventional or axial laminations with or without an equivalent cage winding that provide high saliency ratios from about 6 to 1 to more than 20 to 1, where the higher values correspond to higher powers. Such reluctance synchronous motors have relatively high torque density, low loss/torque, high power factor, fast torque-speed transients and, for inverter-fed (cageless rotor) applications, to simplified control in the absence of rotor currents. The stator of these machines has uniform slots with concentrated (one tooth wide or pole-pitch wide coils (q=1)) with unipolar or bipolar two-level current control, or with distributed (q≧2) multiphase single or double windings and sinusoidal current (rotor-position-triggered) control. These types of pseudo-synchronous motors (essentially stepping motors) are lacking for all of the reasons set forth above including high heat loss in large KW sizes for hybrid automobiles, poor torque control at zero to very low RPM, difficulty controlling position especially while reversing and difficulty in controlling voltage while generating.

It is therefore desirable to provide a motor and generator (i.e., electrical machine) along with a control system that can control the phase angle of the motor with a linear voltage independent of frequency. It is also desirable to provide motor and generator control systems that can control the phase angle of the motor as well as torque from zero RPM and rotation in either direction and switch back and forth from motor to generator to motor within one half cycle of 3-phase power. It is also desirable to provide a synchronous machine configuration having high torque density, low loss/torque, high kW/KVA, fast torque and speed dynamics, wide speed range operation, efficient field weakening (i.e., constant power), motor ruggedness, high precision and robustness, and low motor costs. It is also desirable to provide a hybrid automobile having a synchronous machine as the primary drive control element. Further, it is desirable to provide a generator having a phase angle control device which can act as a cranking motor for automatic starting an internal combustion engine with automatic throttle control which provides engine RPM at maximum fuel efficiency for a corresponding KW load. Even further, it is desirable to provide an electrical machine transistor bridge wired in parallel to increase drive current maximums.

BRIEF SUMMARY OF THE INVENTION

A synchronous machine with a 3-phase stator and a field rotor can be used as a motor or a generator using a control system comprised of a commutation circuit, a phase sensing circuit, and a phase delay circuit. The commutation circuit uses a high voltage side and a low voltage side from a direct current (DC) source. The phase sensing circuit is used to establish the phase of the stator flux vector as well as the direction of the rotor rotation and is set to a fixed advanced position ahead of the rotor position. When the machine is used as a motor, the phase delay circuit uses a control voltage to directly and linearly control the phase of the commutation from maximum-advance to in-phase and beyond. The phase delay control is independent of the stator frequency. The control, (e.g., setpoint) voltage can be used to control torque or RPM. When the commutation reaches an in-phase position the synchronous machine is neither a motor nor a generator. As changes in external forces or in the control voltage cause the phase delay to push the commutation phase past the in-phase position by a predetermined amount, commutation ceases and the machine becomes a generator. As a generator, the output voltage can be controlled to charge a battery and/or supply power to another load. This change from motor to generator can occur at any stator frequency as quickly as ⅙ to ⅓ of a cycle of 3-phase power. Should external forces to the synchronous machine reverse or should the control voltage increase and cause a reduction in phase delay the phase is advanced ahead of the in-phase position, the synchronous machine will again become a motor within ⅙ to ⅓ of a cycle.

When used in a hybrid automobile, four such control systems could be used on the wheels and a fifth control system could be used to control an internal combustion engine (ICE) for battery charging. The ICE control system could also include automatic start, RMP control and shut down features. For automobile acceleration, the use of the control system as an electronic differential and as an anti-slip mechanism between wheels is described. For deceleration or braking, the use of the control system for anti-slip (as opposed to anti-lock) regenerative braking through battery charging is described. Starting torque from zero RPM can also exceed that of reluctance synchronous and induction type motors.

Briefly stated, the present invention comprises a synchronous machine control device for a polyphase synchronous machine. The polyphase synchronous machine has a field coil, a rotor and polyphase windings. The control device includes a phase detection sensor and a control circuit. The phase detection sensor is set to 90° advanced electrically with respect to the direction of the rotor RMP of the synchronous machine. The control circuit includes a phase delay circuit, a commutation driver circuit and a time delay circuit. The phase detection circuit is coupled to the phase detection sensor and configured to determine electrical phase of the synchronous machine independent of frequency. The phase detection circuit at least detects when the machine is being operated in-phase, lagging and advanced with respect to electrical phase angle. The commutation driver circuit is coupled to the phase detection circuit and has a high-side output coupled to the windings and a low-side output coupled to the windings. The commutation driver circuit selectively and alternately controls the high-side and low-side outputs to control commutation of the synchronous machine only when the phase detection circuit provides the commutation output. The time delay circuit is coupled to the phase detection circuit, the commutation driver circuit. The time delay circuit provides a control output to the commutation driver circuit based upon an adjustable setpoint compared to a speed of the machine as measured by the phase detection circuit.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 5A–5E are a schematic circuit diagram of a detailed control circuit for a phase angle controller in accordance with the present invention;

FIGS. 7A–7E are a schematic circuit diagram of a detailed control circuit for engine control in a hybrid automobile;

FIGS. 8A–8E are a schematic circuit diagram of a detailed control circuit for wheel control in a hybrid automobile;

FIG. 13 is a table demonstrating examples using the circuit of FIG. 12;

FIG. 14 is a detailed electrical schematic of a control circuit for controlling direction of rotation for a synchronous machine in accordance with the preferred embodiments;

FIG. 15 is a truth table for the circuit of FIG. 14;

FIG. 16 is a detailed electrical schematic of a control circuit for controlling direction of rotation for a synchronous machine with digital position control in accordance with the preferred embodiments;

FIG. 17 is a truth table for the circuit of FIG. 16;

FIG. 20B is a table of the plotted values demonstrating the response of the control algorithm of FIG. 19;

DETAILED DESCRIPTION OF THE INVENTION

Figure 1:
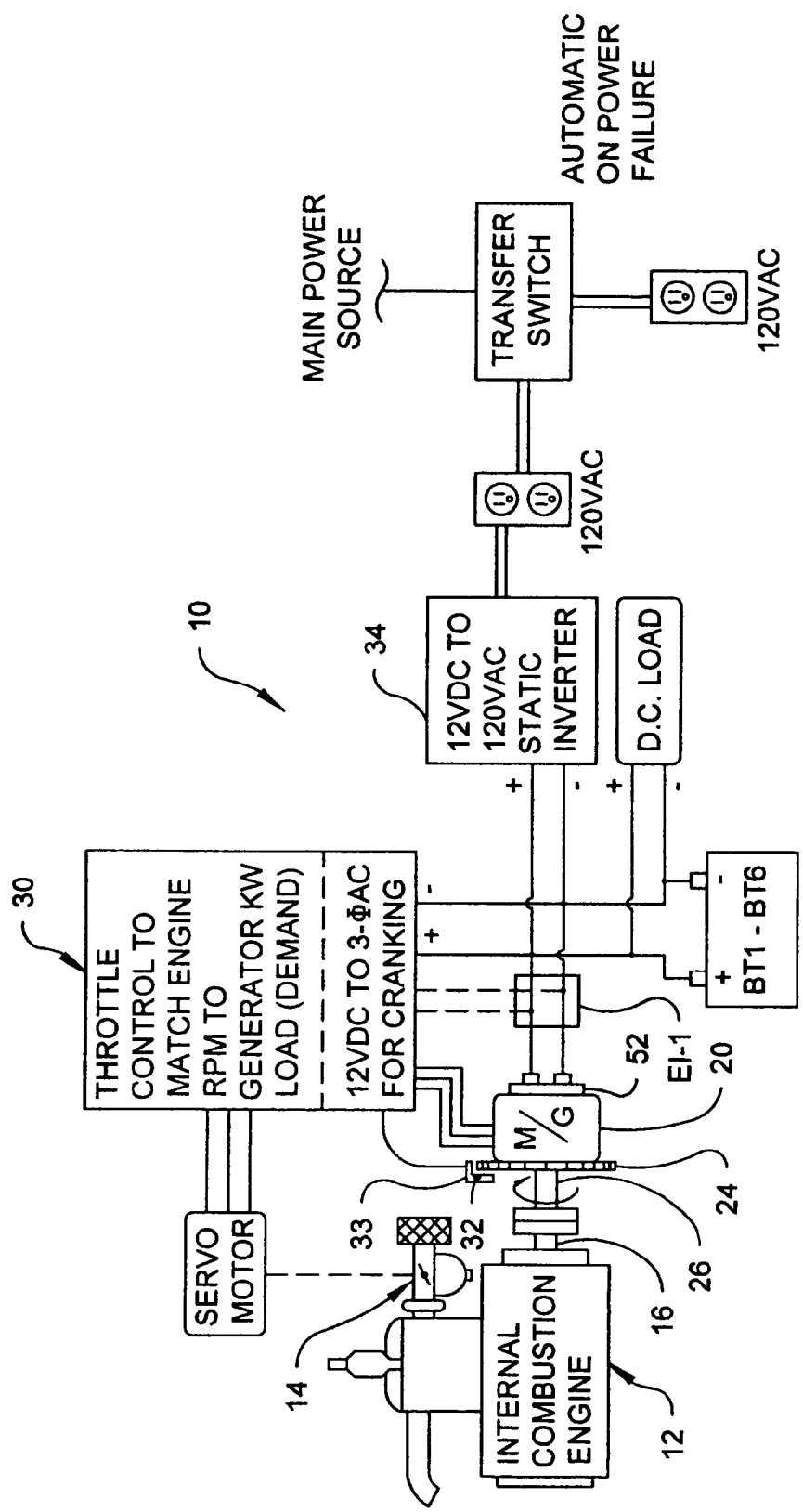
FIG. 1 is a system block diagram of a generator system incorporating a phase angle controller in accordance with the present invention.

Certain terminology is used in the following description for convenience only and is not limiting. The words "right," and "left," "lower," and "upper" designate directions in the drawings to which reference is made. The words "inwardly" and "outwardly" refer to directions toward and away from, respectively, the geometric center of the object discussed and designated parts thereof. The terminology includes the words above specifically mentioned, derivatives thereof and words of similar import. Additionally, the word "a" is used in the claims and in the corresponding portions of the Specification, means "at least one."

I. General Description:

Referring to the drawings in detail, wherein like reference numerals indicate like elements throughout, there is shown in FIG. 1 a typical internal combustion engine powered generator set 10 which incorporates phase angle control in accordance with the present invention. The internal combustion powered generator set or gen-set 10 includes an internal combustion or simply IC engine 12 having a servo controlled carburetor throttle valve 14 and an output shaft 16. The output shaft 16 of the IC engine 12 is coupled by known means to a synchronous electrical motor/generator or synchronous machine 20. The synchronous machine 20 includes a stator, a rotor, and a field winding as is known in the art. The synchronous machine 20 includes at least two poles or one pair, but the present machine 20 preferably includes 14 poles or seven pairs. The synchronous machine 20 is connected to a control system 30 as will be described in greater detail below. The synchronous machine 20 also includes an input shaft 26 which is coupled to the output shaft 16 of the IC engine 12. A vane type interrupter 24 is mounted on the input shaft 26 of the synchronous machine 20. A speed and phase step sensor 32 (FIGS. 2A–2B) is mounted proximate to the vane type interrupter 24 in order to detect speed in revolutions per minute (RPM) and phase step in electrical degrees (e.g., FIG. 4) of the synchronous machine 20. Preferably, the speed and phase step sensor or simply the step sensor 32 includes three photo-interrupters 32A, 32B, 32C, for detecting both speed and step number in conjunction with the vane type interrupter 24. The photo-interrupters 32A–32C are preferably mounted on a suitable bracket 33 and are set 90° advanced against the direction of rotation of the rotor of the synchronous machine 20.

The gen-set 10 further includes at least one battery BT1, a voltage and current sensor EI-1 and a static inverter 34. Preferably, the gen-set 10 has six cells or six batteries BT1–BT6. The synchronous machine 20 is configured analogous to an alternator wherein mechanical energy can be converted to electrical energy in the form or alternating current (AC) which is rectified by six diodes 52 (FIG. 3C) normally included within or integral to the synchronous machine 20 and conditioned to DC voltage for charging the batteries BT1–BT6. The static inverter 34 inverts DC power to AC power having an AC waveform. For example, 12 or 24 volts DC input can be output at a 120 volts AC, 60 Hz, at a given wattage wherein the AC output has either a square wave, a quasi-sine wave, or a true sine wave.

Figure 2A:
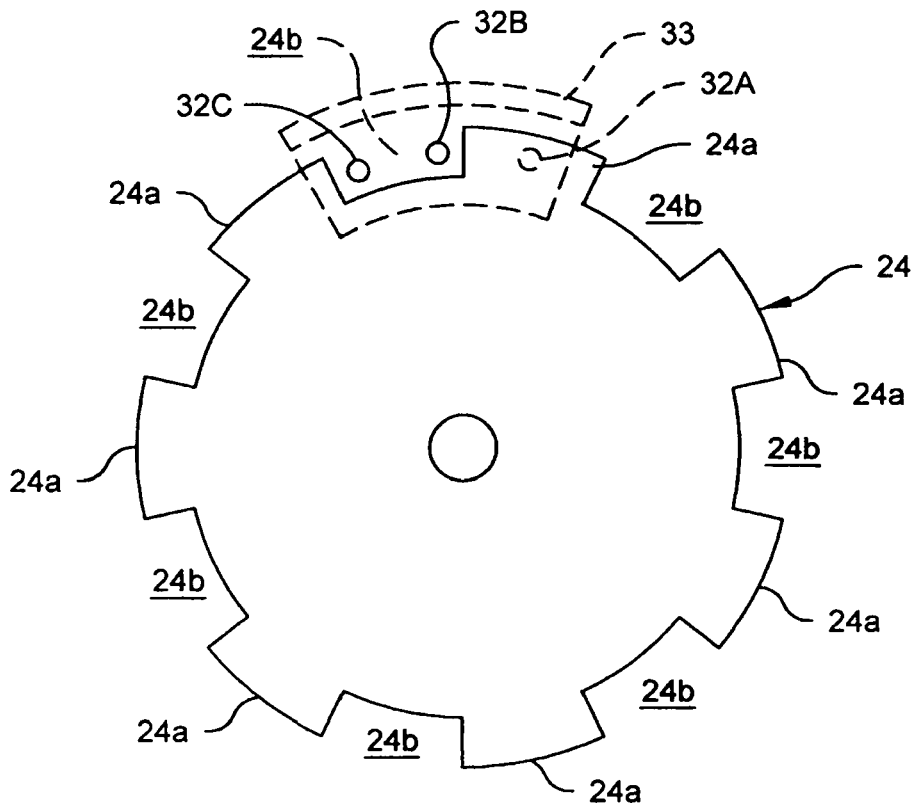
FIG. 2A is a front view of a vane type interrupter for seven cycles per revolution and three phase detector in accordance with the phase angle controller of FIG. 1.
Figure 2B:
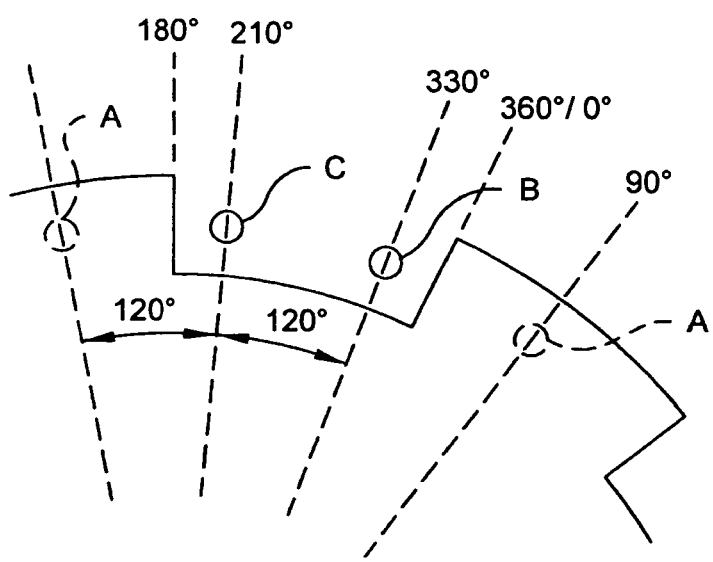
FIG. 2B is a detailed view of the photo-interrupters of FIG. 2A.

Referring to FIGS. 2A–2B, the vane type interrupter 24 is shown with the phase sensor 32 having the photo-interrupters 32A–32C spaced 120° (electrical degrees) apart. This particular vane type interrupter 24 is configured with seven vanes 24a and seven gaps 24b which correspond to a synchronous machine 20 having seven pairs of poles. While the vane type interrupter 24 is shown with seven vanes 24a any number of vanes and a synchronous machine 20 having any number of corresponding poles may be utilized without departing from the present invention as would be obvious to one skilled in the art.

Figure 4:
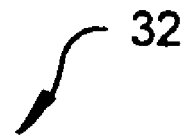
FIG. 4 is a timing table for the vane-type photo-interrupter of FIG. 2A.

As shown, the vane type interrupter 24 has a vane 24a covering the photo-interrupter 32A leaving photo-interrupters 32B–32C not covered or in a gap 24b. As the shaft 26 of the synchronous machine 20 rotates, the vanes 24a and the gaps 24b selectively cover or expose the photo-interrupters 32A–32C in a fashion which corresponds to the particular step number of the synchronous machine 20 in terms of electrical activity in phases A–C. FIG. 4 is a table showing the particular pattern of energization and de-energization of the photo-interrupters 32A–32C in accordance with rotation of the vane type interrupter 24 wherein ones (1's) indicate that a particular photo-interrupter 32A–32C is energized and zeros (0's) indicate that a particular photo-interrupter 32A–32C is de-energized. For example, in the first row, step 1, photo-interrupter 32A is de-energized (i.e., light is blocked) and photo-interrupters 32B–32C are energized (i.e., light is not blocked) which corresponds to the arrangement shown in FIG. 2A and to the input pattern in the first row of FIG. 4 (i.e., "011"). As the vane type interrupter 24 continues to rotate in the counterclockwise direction, both photo-interrupters 32A–32B will become covered by the particular vane 24a that is covering photo-interrupter 32A as shown and photo-interrupter 32C will remain exposed in the gap 24b creating the next row in FIG. 4 (i.e., "001"). In no case however, will all three photo-interrupters 32A–32C be exposed (111) or will all three photo-interrupters 32A–32C be covered (000) because of the mechanical spacing of the photo-interrupters 32A–32C and the spacing of the vanes 24a and gaps 24b. It would be obvious to one skilled in the art to utilize other detectors or detection devices such as Hall Effect sensors, inductive sensors, capacitive sensors, and other proximity sensors, encoders, potentiometers and the like, and therefore, using other such position detection devices is possible without departing from the spirit and scope of the present invention.

Figure 3A:
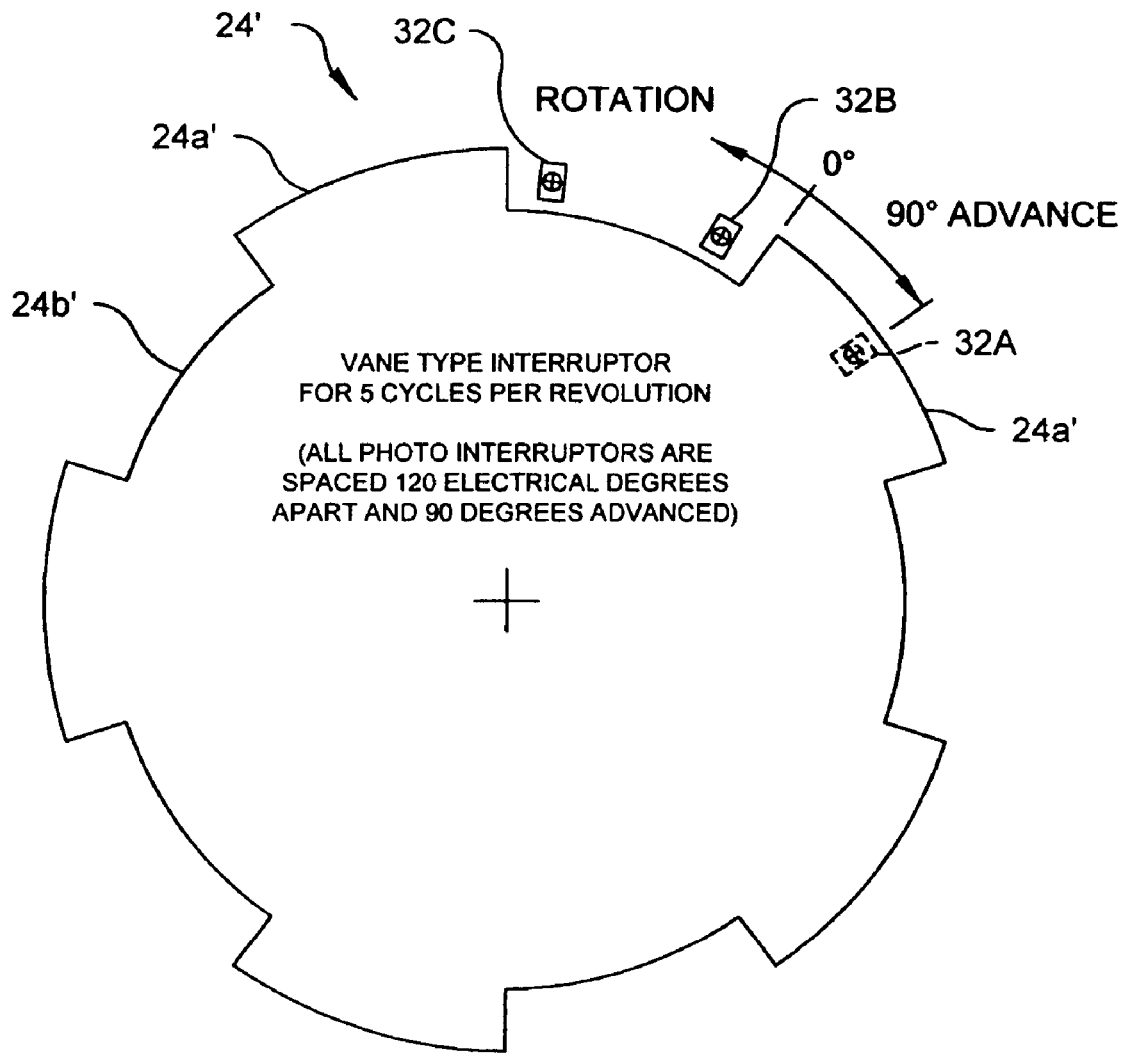
FIG. 3A is a front view of another vane type interrupter for five cycles per revolution in accordance with the present invention.

FIG. 3A shows another vane type photo-interrupter 24' for five cycles per revolution which operates under substantially the same principles as the vane type interrupter shown in FIGS. 2A–2B. The vane type photo-interrupter 24' is intended to be used with a synchronous machine having five pairs of poles as would be understood by one skilled in the art. Obviously, any number of vanes on a vane type interrupter 24, 24' may be utilized which accord with the number of pairs of poles of the synchronous machine 20.

Figure 3B:
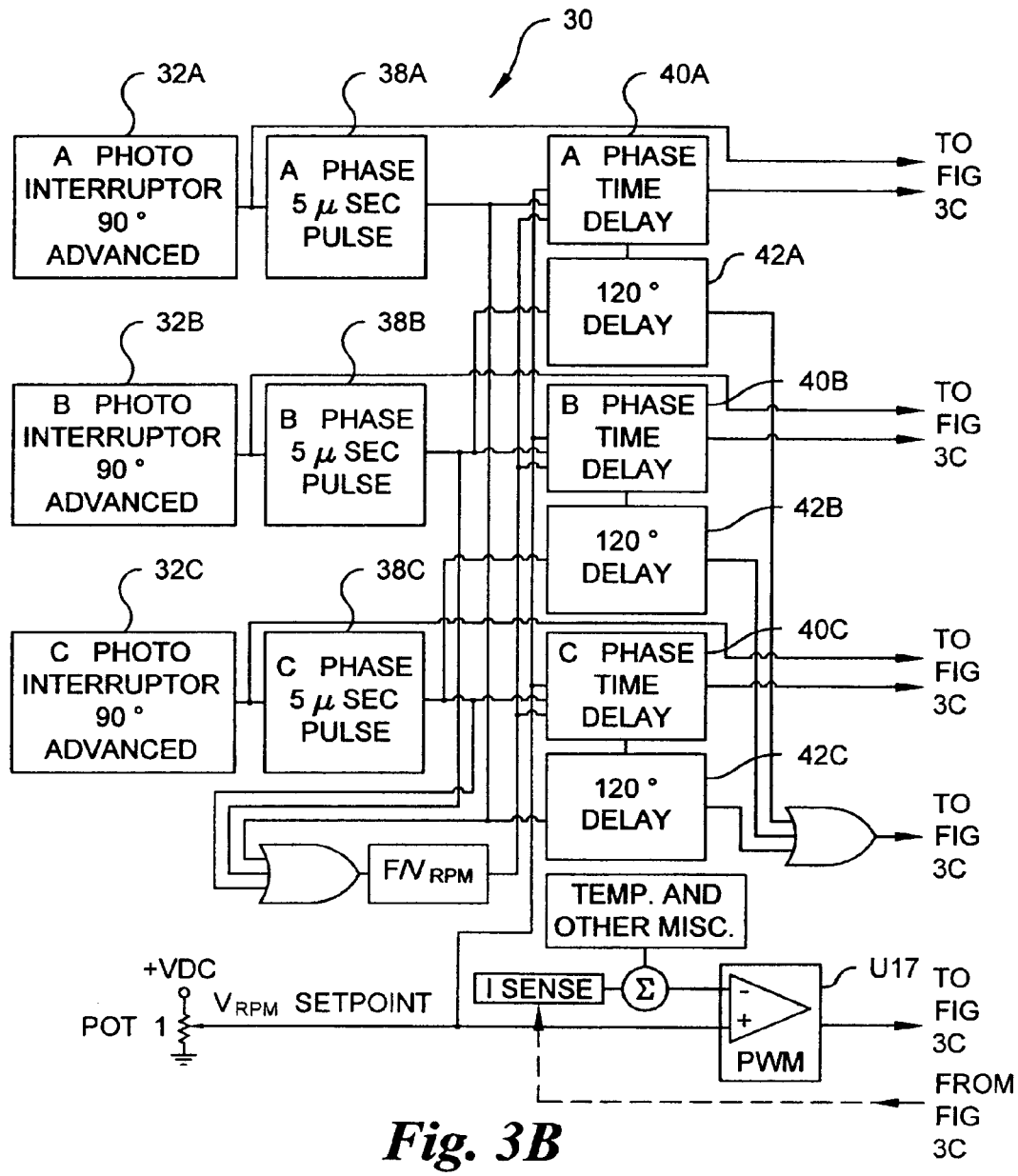
FIGS. 3B–3C is a schematic circuit diagram of a control circuit for a control system for synchronous motors and generators in accordance with the present invention.
Figure 3C:
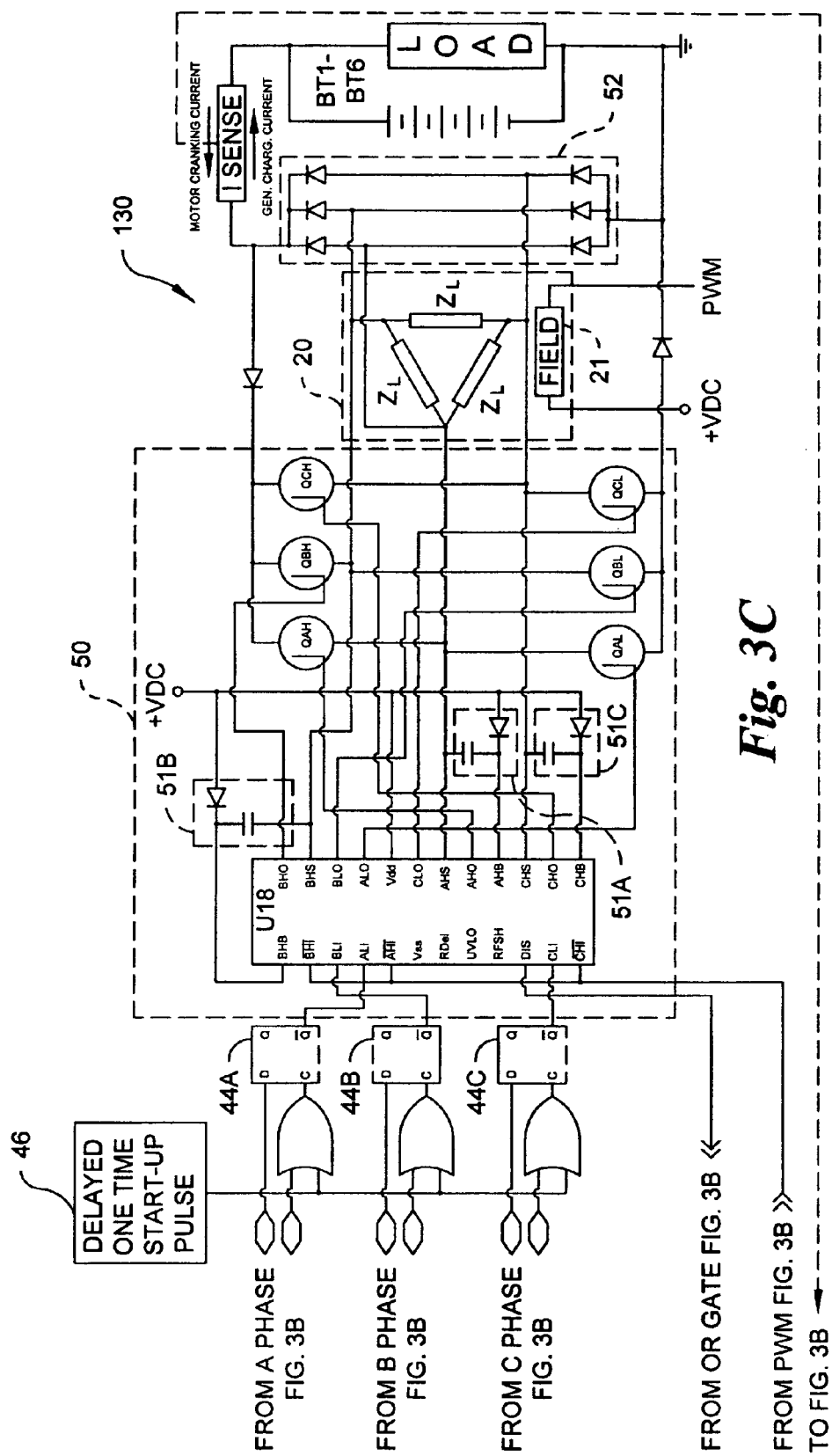

FIGS. 3B–3C show a block diagram circuit schematic of a control circuit 30 for controlling a synchronous machine 20 in accordance with the present invention. For purposes of the description, the synchronous machine 20 shown in detail in FIG. 3C is a delta-wound, three phase type synchronous machine 20 having an externally excited field coil 21. Of course, other synchronous machines 20 having other winding configurations and other numbers of phases may be utilized without departing from broad inventive scope of the present invention.

The photo-interrupters 32A–32C provide inputs to pulse detector circuits 38A–38C which are capable of detecting the rising edge and falling edge of a pulse and providing a short duration positive pulse of a predetermined duration as an output when a rising edge is detected and separately when a falling edge is detected. The output of each pulse detector circuit 38A–38C is connected to a respective time delay circuit 40A–40C. The output of the pulse detector circuit 38A (the A phase) is also applied as an input to a 120°-delay circuit 40C for the C phase. Similarly, the output of the B phase pulse detector 38B provides an output to a 120°-delay circuit 42A for the A phase and the output of the C phase pulse detector 38C provides an output to a 120°-delay circuit 42B for the B phase. The 120°-delay circuits 42A–42C receive inputs from their respective time delay circuits 40A–40C, as well, in order to determine if the synchronous machine 20 is leading or lagging in terms of electrical degrees. Additionally, the outputs of the pulse detector circuits 38A–38C are OR-gated together and conditioned to provide a voltage output signal $V_{RPM}$ based on the speed in RPM which is also applied to the time delay circuits 40A–40C. Further, a setpoint voltage $V_{RPMsetpoint}$ is applied to all three time delay circuits 40A–40C for the three phases A–C which in this case is derived from a potentiometer POT 1. Accordingly, the time delay circuits 40A–40C are comparing an actual process variable, the speed in RPM $V_{RPM}$, to the setpoint voltage $V_{RPMsetpoint}$, and based on the error and the electrical position detected, are selectively controlling the commutation of the synchronous machine 20. It is contemplated that the setpoint voltage $V_{RPMsetpoint}$ could be derived from any variable setpoint device such as a sliding potentiometer, a rotary potentiometer or a variable resistance actuated by a device such as an accelerator pedal or a computer generated setpoint.

The outputs of the time delay circuits 40A–40C provide the clock inputs for D-type flip-flops 44A–44C, respectively. A delayed one time startup pulse 46 is OR-gated with the outputs of the time delay circuits 40A–40C for "jump starting" the circuit from a zero or off position (i.e., moving from an inactive state to an active state). The D input of the flip-flops 44A–44C is provided directly from the output of the photo-interrupters 32A–32C. The output of the D-type flip-flops 44A–44C move the D input to the output when the clock input transitions from low to high as is known in the art. The output of the D-type flip-flops 44A–44C are applied to low-side inputs of their respective phases A–C of a three phase bridge driver integrated circuit (IC) U18 which is part of a commutation sub-circuit 50. The commutation sub-circuit 50 includes the three phase driver IC U18, three (3) metal oxide silicon field effect transistors (MOSFETs) for high-side control QAH–QCH, three (3) power MOSFETs for low-side control QAL–QCL and three (3) boot strap circuits 51A–51C, one for each phase A–C, respectively, as is known in the art. The high-side boot strap circuits 51A–51C provide an upwardly biased voltage to inputs AHS–CHS of the three phase driver IC U18 in order to maintain a floating bias voltage when the high-side MOSFETs QAH–QCH are on and the low-side MOSFETs QAL–QCL are off, during commutation. The time delay circuit 40A–40C controls the phase of commutation from an advanced condition to an in-phase condition in an analog manner.

The three-phase bridge-driver IC U18 is specifically designed for driving high-side and low-side three phase MOSFET bridges which control commutation for a three phase motor such as the wound synchronous machine 20 shown in FIG. 3C. The three phase driver IC U18 provides commutation control only when the synchronous machine 20 is functioning as a motor. The three phase driver IC U18 includes inputs for high-side control for each phase $\overline{AHI}$–$\overline{CHI}$, inputs for low-side control for each phase ALI–CLI and a disable input DIS. When the disable input DIS is a logic one (or high), all the outputs to the three phase driver IC U18 are turned off and all the control inputs $\overline{AHI}$–$\overline{CHI}$ and ALI–CLI are overridden (ignored). The three phase driver IC U18 further includes three outputs AHO–CHO for driving the high-side MOSFETs QAH–QCH and three low-side outputs ALO–CLO for driving the low-side MOSFETs QAL–QCL, respectively. Because the high-side MOSFETs QAH–QCH operate in pairs with their respective low-side MOSFETs QAL–QCL, it is necessary to have a delay turn-on time built into the three phase driver IC U18 such that a particular high-side or low-side MOSFET QAH–QCH, QAL–QCL is turned on only after the other of the pair QAH–QCH, QAL–QCL is completely shut off to prevent shoot through or short circuiting. Further, when the three phase driver IC U18 receives low ON inputs ALI–CLI, it automatically (with a delay) turns on its respective $\overline{\text{AHI}}$–$\overline{\text{CHI}}$ unless it is over-ridden by a "high" on its respective $\overline{\text{A}}$ $\overline{\text{HI}}$–$\overline{\text{CHI}}$. Therefore, if the three phase driver IC U18 receives a high input on $\overline{\text{AHI}}$, its respective output will be driven low and cannot be driven high by a low to ALI. An adjustable delay time must elapse after the low-side MOSFET QAL is de-energized before energizing the high-side MOSFET QAH because of the inherent physical turn on and turn off times of a given MOSFET type so as to avoid direct shorting between the low-side and the high-side of the windings $Z_L$ of any phase. A direct shorting between the low-side and the high-side of the windings $Z_L$ of any phase would result in an extreme over current condition which would likely destroy the MOSFET pair of any phase.

As shown, the high-side inputs $\overline{\text{AHI}}$–$\overline{\text{CHI}}$ are driven by a PWM controller IC U17 and associated circuitry. The PWM controller IC U17 receives inputs from the voltage setpoint $V_{RPMsetpoint}$ and the current/voltage sensor EI-1 in order to provide PWM as a function of the setpoint $V_{RPMsetpoint}$. Due to logic internal to the three phase driver IC U18, when a high-side input $\overline{\text{AHI}}$–$\overline{\text{CHI}}$ is high, the respective high-side output AHO–CHO is disabled. The corresponding low-side output ALO–CLO can be turned on and off, but no current will flow to the stator while the $\overline{\text{AHI}}$–$\overline{\text{CHI}}$ is high. The PWM frequency to the $\overline{\text{AHI}}$–$\overline{\text{CHI}}$ is at a 10 kHz rate while the ALO–CLO frequency will vary from near zero to a maximum of less than 1 kHz. Accordingly, external logic which prevents the low-side input from being energized when the high-side input $\overline{\text{AHI}}$–$\overline{\text{CHI}}$ is energized is not necessary. Of course, if another type of three phase driver IC U18 or three phase driver circuitry is utilized, such control logic would be necessary. Three phase bridge drivers, such as three phase bridge drive IC U18, are used for controlling synchronous motors and are commonly controlled by PWM only. Of course, other circuit implementations using only discrete components, dedicated purpose ICs, application specific integrated circuits (ASICs), microcontrollers, and the like could be utilized for commutation control, as would be obvious to one skilled in the art, without departing from the broad inventive scope of the present invention.

Referring to FIG. 3C, when the synchronous machine 20 functions as a generator (i.e., while cranking as a motor, the engine starts) the current sensed $I_{sense}$ is flowing toward the batteries BT1–BT6 and/or load. When this occurs, the phase delay pulses from 40A–40C are delayed beyond the 90° advance by 120° (i.e., 30° LAG). When 120'-delay circuits 42A–42C determine that the synchronous machine 20 is lagging by 30° (electrically), their output is "OR" gated to the disable input DIS of the three phase driver IC U18. Commutation is terminated, allowing the IC engine 12 to drive the synchronous machine 20, which in turn generates electrical power to be stored in the batteries BT1–BT6. However, should the engine 12 fire weakly only once and fail to start and the RPM falls to less than the cranking RPM, the phase delay circuits 40A–40C determine that the synchronous machine 20 is operating 0–90° advance mode. The disable input DIS is then de-energized and the three phase driver IC U18 begins commutation once again, (i.e., return to cranking mode). Ideally, the synchronous machine 20 can be switched between generating mode and motor mode within a half cycle of 3-phase frequency in an ongoing fashion as detected by the control circuit 30.

During startup, the field winding 21 is controlled by PWM at 100% "ON" until a predetermined frequency is obtained, such as 180 pulses/sec, and thereafter, field weakening occurs as frequency (pulses/sec) increases. Meanwhile PWM to the stator does the opposite, PWM goes from a low percentage "ON" to 100% "ON" at approximately 200 pulses/sec and the phase delay circuits 40A–40C control phase angle as well as switching between motor mode and generator mode. Specifically, from zero, control starts out with maximum PWM of the voltage applied to the field winding 21 while measuring stator current feedback to control starting torque up to a maximum so as not to burn out the MOSFETs QAH–QCH, QAL–QCL. Once the control mode is in phase angle control, PWM at a 10 kHz rate is selectively and simultaneously used by a stator current control circuit 58 (FIG. 5D) to PWM the high-side inputs only during motor control as will be described in greater detail hereinafter. During this time, the back electromotive force (back EMF) may also, but not necessarily, be controlled by PWM of the voltage applied to the field winding 21.

When the synchronous machine 20 is not moving, i.e., zero RPM, all the outputs for the high-side AHO–CHO and low-side ALO–CLO will not automatically begin commutation. The photo-interrupters 32A–32C will "wake up" in one of the stable states as shown in FIG. 3A and FIG. 4. A previous 90° advanced pulse will no longer exist. So, a "false pulse" is required from the delayed one time startup pulse generator 46 (FIG. 3C) in order to begin commutation forcing the synchronous machine 20 to be thereafter pulsed from 60° to 120° for an average of 90° advanced. It may be advantageous here to think of the synchronous machine 20 as starting up from zero RPM as a stepping motor. PWM control is provided to the field winding 21 inversely until the synchronous machine 20 comes up to speed. PWM of the field winding 21 constitutes field weakening thereby reducing back EMF as is well known in the art. Once up to speed, the goal is to control the phase angle. However, it is exceedingly difficult to measure the phase angle with a rapidly changing frequency. So, an alternative to measuring the phase angle is to control it without measurement with a linear voltage that is independent of frequency. In this manner the phase angle is controlled to a specific position ahead of time, based on the delay circuitry for each phase which is 90° advanced. When delayed to 0° from 90° advanced, the phase is then "on time". Generally speaking, the maximum torque in a synchronous machine 20 is when the phase vector of the stator field is 90° ahead of the rotor position. When not delayed, the rotor will rotate following the "one-time" start-up pulse and then will advance 60° to 120° advanced as shown in FIG. 4. Thereafter, the synchronous machine 20 will operate between 60° and 120° for an average of 90° advanced when operating in motor mode to maximize torque.

II. Detailed Description:

A. Control Circuit

FIGS. 5A–5E depict a detailed control circuit 130 for controlling the commutation sub-circuit 50 (FIG. 3C) and the synchronous machine 20 as described above. The detailed control circuit 130 is one implementation of a phase angle control circuit 30 (FIG. 1) and other circuit implementations using other designs and/or components may be utilized without departing from the broad inventive scope of the present invention. FIGS. 5A–5E show a detailed implementation of the step sensor circuits 32A–32C (photo-interrupters as depicted here), the pulse detector circuits 38A–38C, the time delay circuits 40A–40C, the 120°-delay D type flip-flop circuits 42A–42C for each of the phases A–C, respectively, as shown more simplistically in FIGS. 3A–3C.

Figure 5A:
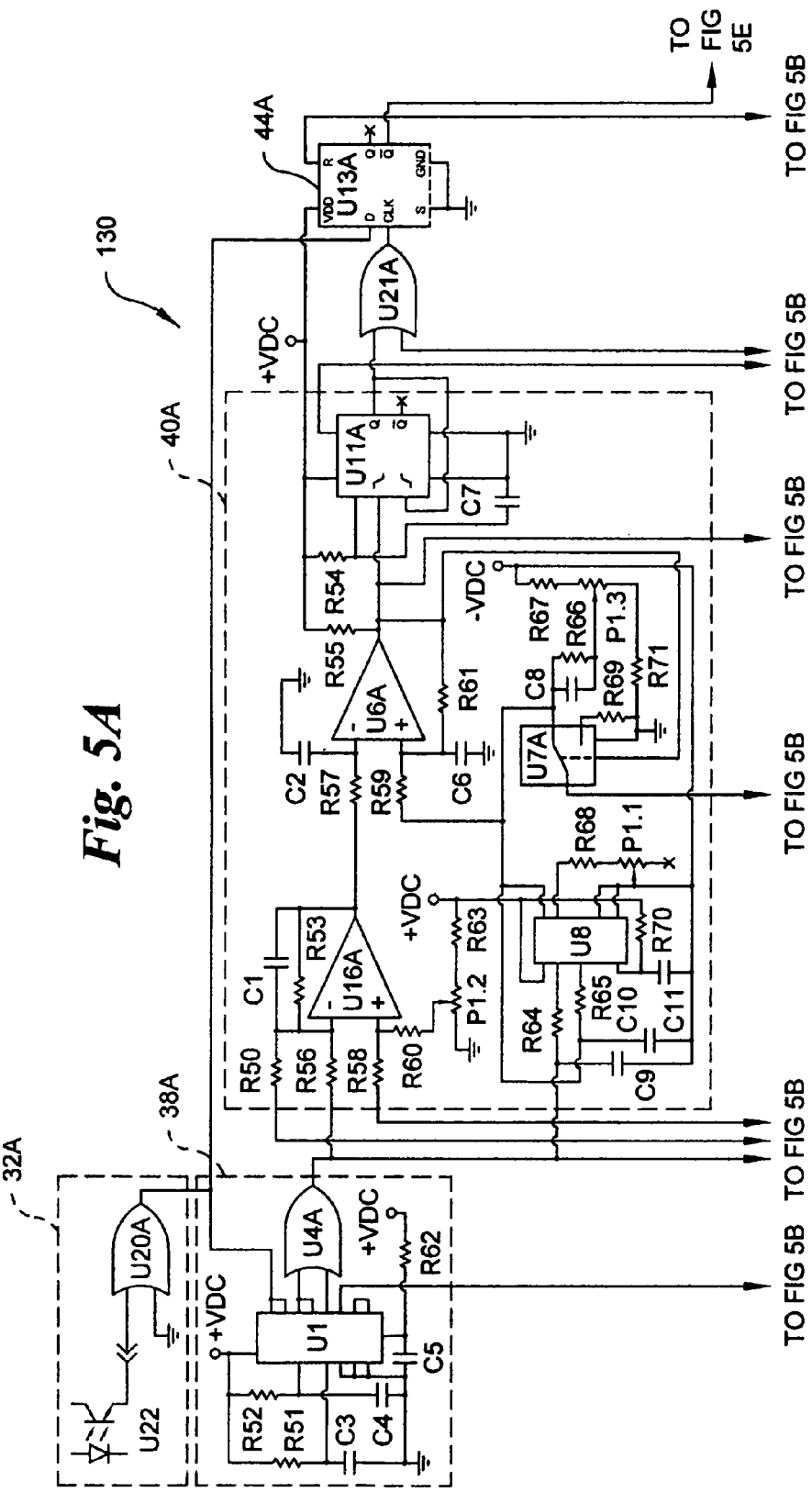
Figure 5B:
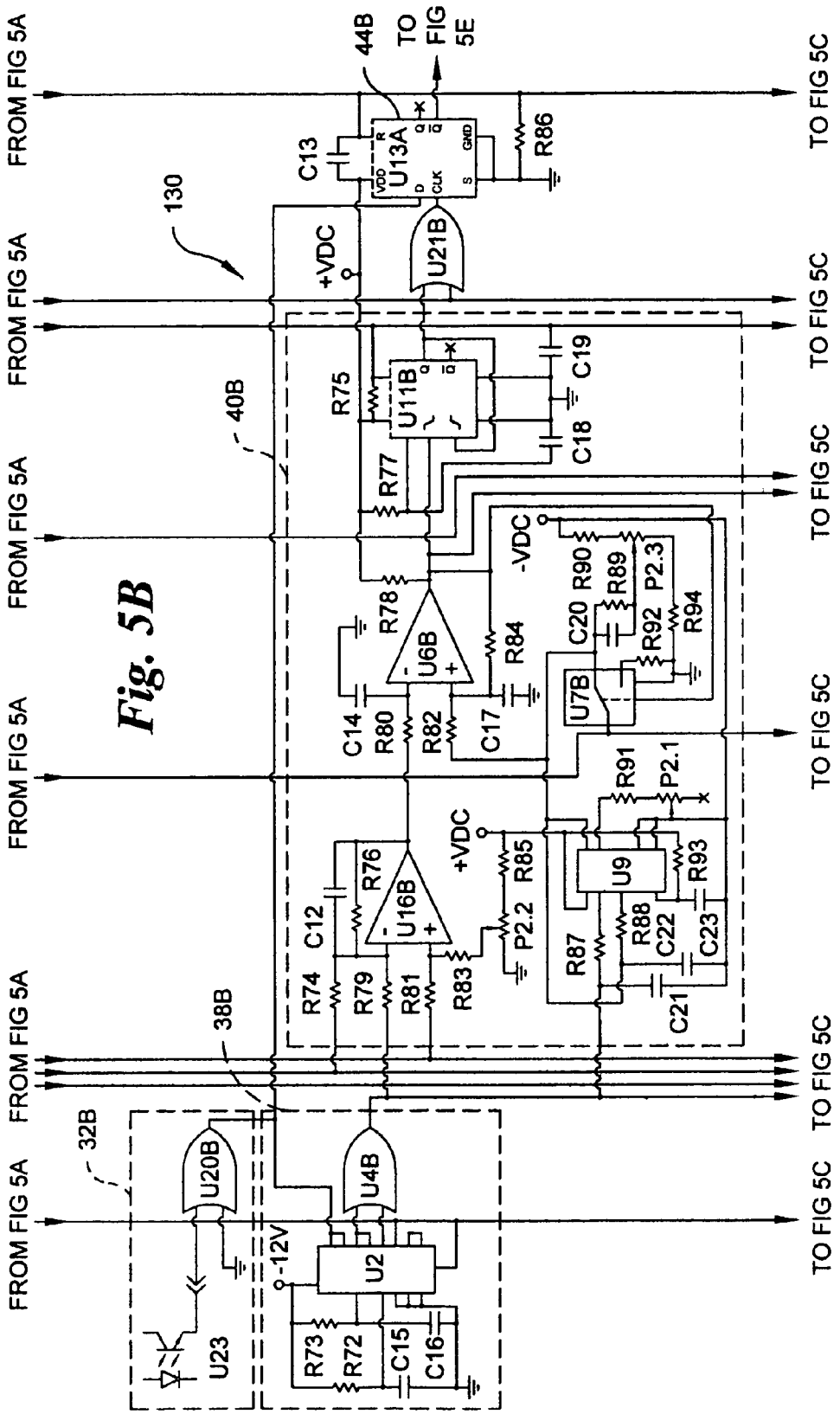
Figure 5C:
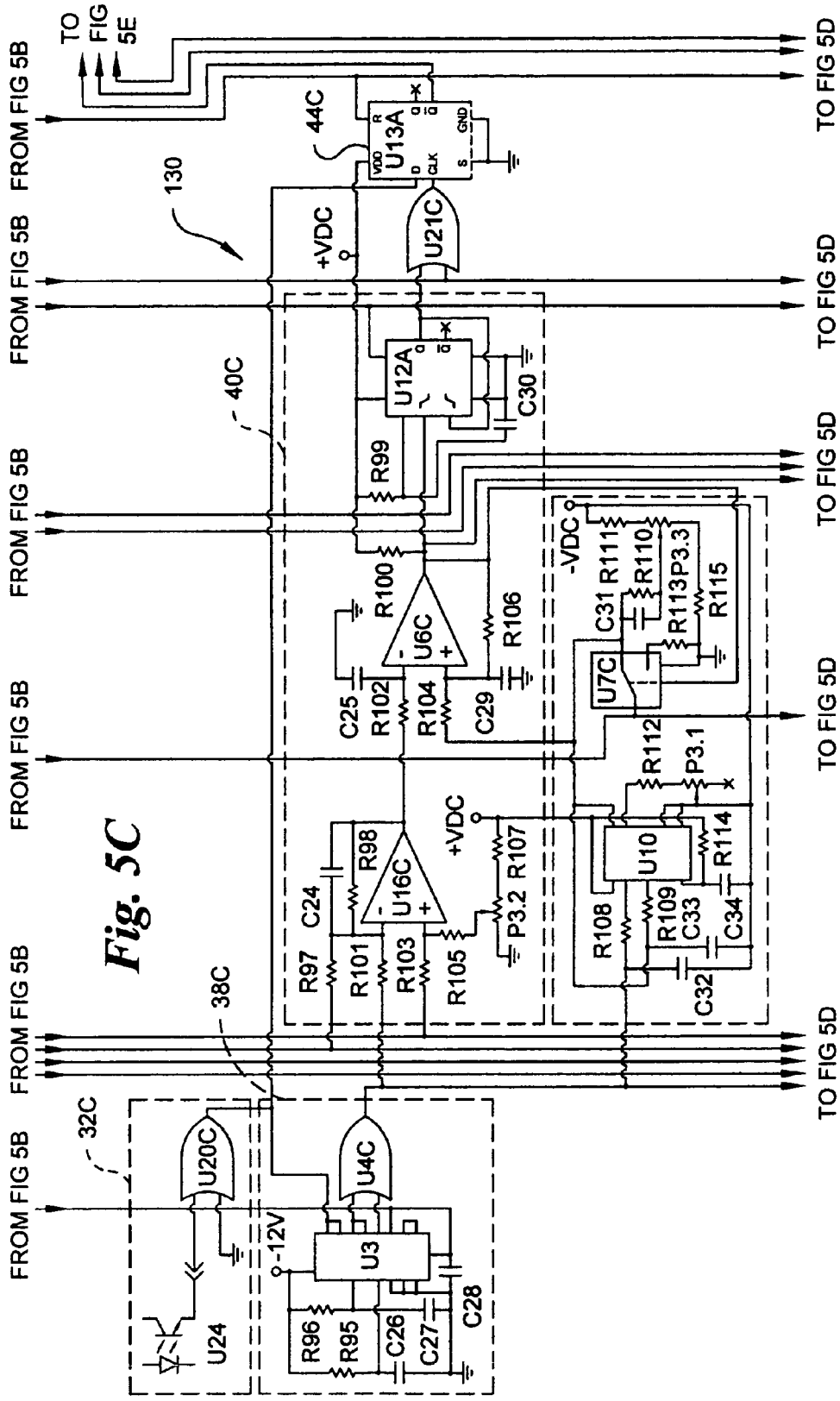

Accordingly, the following description with reference to the A phase is equally applicable to the B and C phases as well. FIG. 5A shows a photo-interrupter 32A having an output applied through an OR gate U20A to the pulse detector circuit 38A. The pulse detector circuit 38A includes an edge detector IC U1 and an OR gate U4A. The edge detector IC U1 detects both the rising and falling edges of the pulse output from the photo-interrupter 32A. The edge detector IC U1 then applies a short duration pulse to the OR gate U4A when the photo-interrupter 32A is first covered by a vane 24a' and when the photo-interrupter 32A is just uncovered from the vane 24a' (FIG. 3A). Thus, the OR gate U4A outputs ten (10) pulses per revolution of the five vane 24a' type vane interrupter 24', i.e., two (2) pulses per electrical cycle.

The time delay circuit 40A includes operational amplifiers (op-amps) U16A and U6A as well as falling edge detector IC U11A, trim potentiometers P1.1, P1.2, charge pump IC U8, solid state switch U7A, resistor R66, capacitor C8 and trim potentiometer P1.3. The speed setpoint $V_{RPMsetpoint}$ is derived by applying +VDC over a potentiometer P8 (FIG. 5D) although as mentioned above, other variable setpoint devices could be readily substituted without departing from the spirit of the present invention.

Figure 5D:
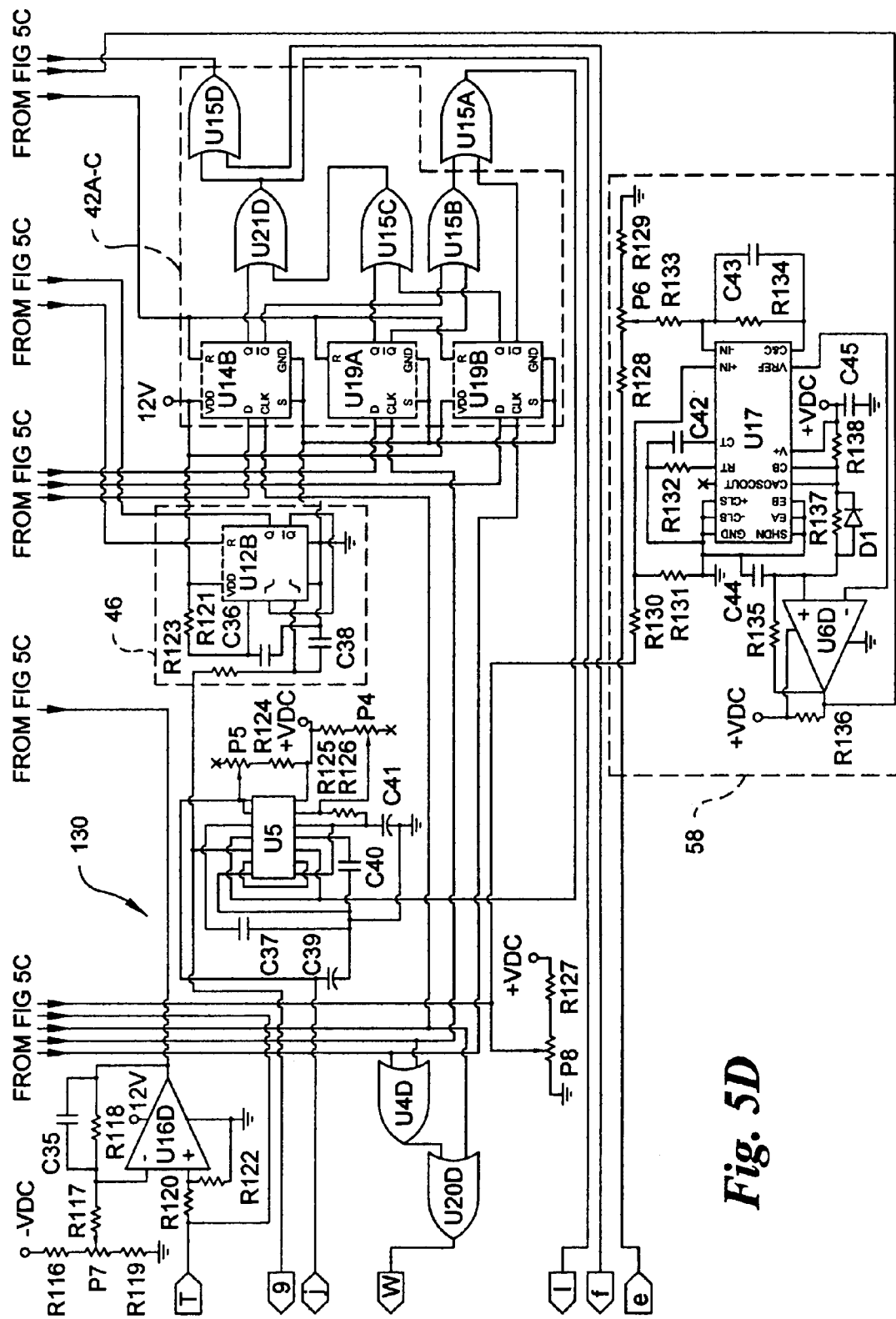

FIG. 5D shows the one time false pulse circuitry 46. The one time false pulse circuitry 46 includes rising edge detector U12B (FIG. 5D) and suitable timing components including resistors R121 and R123 and capacitors C36 and C38. The one time false pulse circuitry 46 primarily provides a one-shot output when starting up from an offline condition (i.e., zero speed or zero RPM) or when the logic has not been reset since commutation has ceased. The one time false pulse circuitry 46 also receives a reset on power up along with other various resettable components such as ICs including D flip flops and edge detectors and the like. Other means or devices can be provided to reset the various resettable components without departing from the present invention.

There are four basic modes 1–4 of cranking control that the PWM of the field winding 21 of FIG. 5E must respond to in a particular manner plus a "sleep mode." In "sleep mode", all power is off except to those circuits required to determine that the battery BT1–BT6 is fully charged and no load is great enough to require the IC engine to start. No power is available for PWM of field winding 21 to operate. Should the battery voltage drop, indicating that the IC engine 12 should start, the following modes become operable after power is restored.

1. Cranking Mode and Cranking

The IC engine 12 is started with a cranking impulse of approximately 0.40 seconds, starting with 100% PWM "on" for approximately 0.1 second. Field weakening is then achieved by reducing the percentage of PWM "on" time. This reduction is based on frequency and allows for higher cranking RPM to be achieved during the short cranking impulse.

Figure 21A:
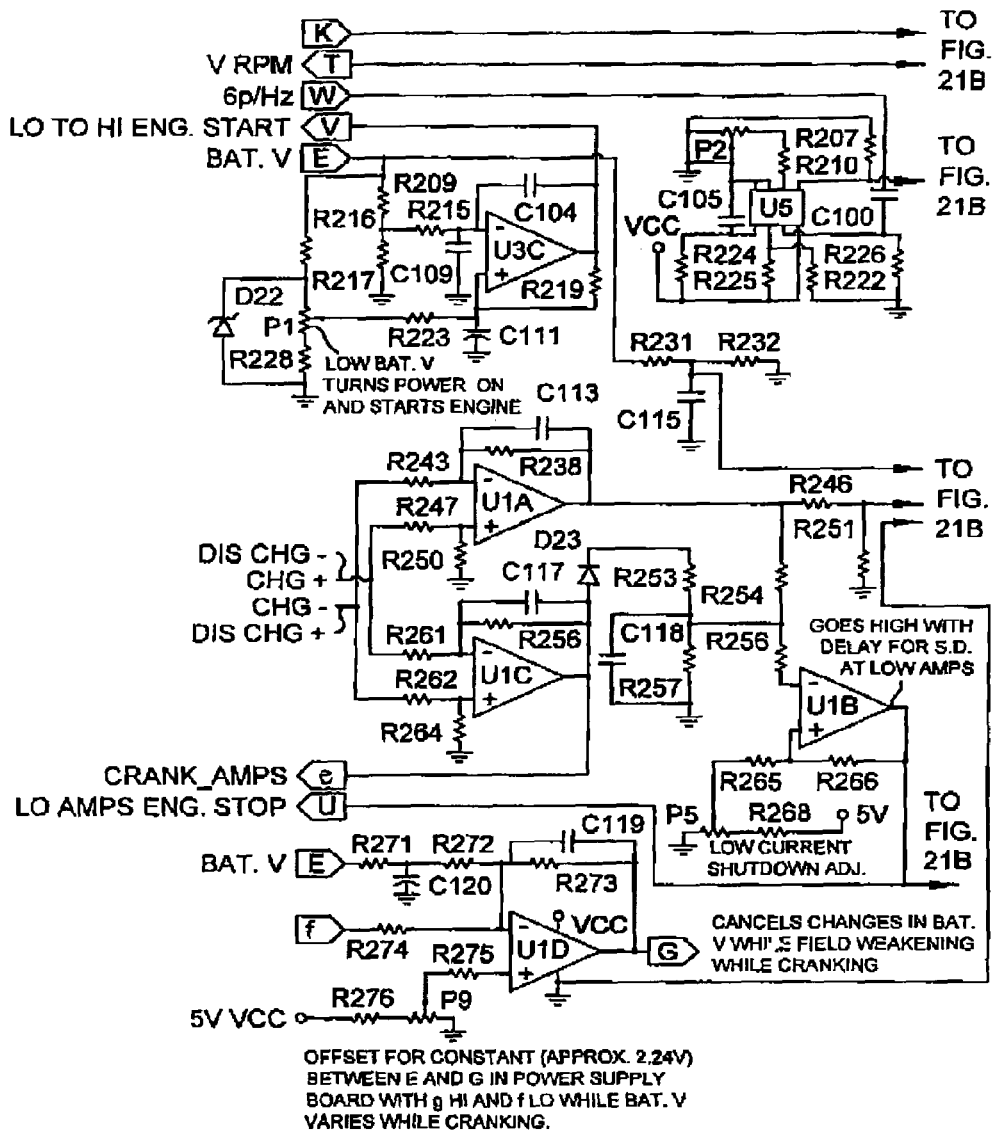
FIG. 21 is a detailed electrical schematic of a control circuit for throttle control of an internal combustion engine for use in driving a synchronous machine in accordance with the preferred embodiments.

Referring to FIGS. 5D–5E and 21, with power restored, dual timer IC U5 sends out a timed pulse of 0.4 seconds duration as set by potentiometer P5 to edge detector IC U12B which sends a "one time" starting pulse to OR-gates U21A–U21C, and also through terminal g to inverter/driver IC U35 on power supply circuit board (not shown). Inverter/driver IC U35 through terminal f, sends a "low" signal of 0.4 seconds enabling pulse to op-amp U3B which, through terminal O, controls field weakening to regulating pulse width modulator (PWM) IC U32A (also on power supply board, not shown). It also sends a "low" enabling signal to PWM IC U32A for PWM to field 21 and cranking of IC engine 12 begins. Potentiometer P7 applied to op-amp U3B sets the start of field weakening based upon frequency while potentiometer P13 controls the magnitude, also based on frequency. It also sends a "low" to comparator U1D for an enabling signal through terminal G to PWM IC U32A to cancel changes in battery voltage while cranking. Should the IC engine 12 fail to start during this timed impulse, cranking mode continues but not actually cranking follows.

2. Cranking Mode, but not Cranking

The PMW goes to zero or 0% "on". This may occur when the IC engine 12 is cold and does not start during the first impulse of cranking, i.e., if the IC engine 12 fails to start on the first impulse, cranking ceases for approximately 8.0 seconds, but stays in cranking mode, then cranks again for approximately 0.4 seconds with field weakening. This is repeated until the IC engine 12 starts, as follows:

Dual timer IC U5 times out on the initial 0.4 second pulse which terminates cranking through terminal g to inverter/driver IC U35 which goes low causing f to go "high" for approximately 6.0 seconds as set by potentiometer P4. Terminal f also turns off field PWM (0% on) through f to terminal 4 on PWM IC U32A on power supply board. Terminal f also goes "high" to OR-gate U15D to also produce a "high" to disable on three phase driver IC U18 which disables commutation. This mode continues for 6 seconds as set by potentiometer P4 on dual timer IC U5. Dual timer IC U5 then cycles back to cranking mode and cranking and repeats the cycling until the IC engine 12 starts. During the cranking cycle, potentiometer P8 for SPVRPM sets a maximum cranking RPM to 3,000 RPM via phase delay. When the IC engine 12 starts and RMP exceeds 3,000 RPM, the phase delay exceeds 120° of the 90° advance and 120° circuits 42A–42C cause the synchronous machine 20 to become a generator as previously described (42A–42C go to "set") and PWM of field 21 goes to charging mode.

3. Charging Mode

The field winding PWM controls the charging voltage during charging. The IC engine 12 starts and 120° delay circuits 42A–42C go to "set" condition, thereby causing commutation to cease. OR-gate U15C goes "high" to disable DIS on three phase driver IC U18 and OR-gate U15A goes "low" to dual timer IC U5 which disables cranking mode, and "g" goes "low" and f goes "high" which disables comparator U1D and terminal G goes to zero. Both F and I go "high" to PWM IC U32A, enabling PWM IC U32A to control battery charging voltage E as set by a potentiometer (not shown) on power supply circuit board. Charging mode continues until the battery BT1–BT6 is fully charged and very little or no load exists as sensed by I-SENSE. Then, the system automatically shuts down and returns to "sleep" mode. However, if at low KW load and at low RPM a sudden load increase occurs, a charging mode with a sudden load increase begins in order to prevent engine stall.

4. Charging Mode with Sudden Load Increase

When a sudden increase in KW load occurs, the PWM for charging voltage is reversed momentarily to prevent stall of the IC engine 12. This shifts the sudden load increase from the IC engine 12 to the battery BT1–BT6. Simultaneously, throttle control is also reversed so that a decrease in IC engine KW load opens instead of closes the throttle valve 14. This allows the IC engine 12 to jump to a higher RPM (nearly a step change) and return to normal control when the RPM increases to where the IC engine 12 can produce the KW necessary to accommodate the sudden load increase.

This is explained as follows:

With a sudden load increase when charging at a low RPM, the IC engine 12 may stall because it cannot jump suddenly to a high RPM to carry a sudden load increase. To prevent stall, op-amp U2C amplifies the difference between measured RPM and desired RPM and when a preset maximum is exceeded as set by P3, op-amp U2C will send a signal proportional to the error as set by potentiometer P8 through terminal F to the inverting input of PWM IC U32A and reduce the PWM to field 21. This lowers the charging voltage and shifts the KW load increase from the IC engine 12 to the battery BT1–BT6. Simultaneously, it also sends a signal to the non-inverting input of op-amp U2B which causes the throttle valve 14 to open instead of close, which it would normally do with a decrease in KW load on the IC engine 12. Thus, the IC engine 12, without a load, jumps to a higher RPM where the error is eliminated and the output of op-amp U2C returns to zero and control returns to normal at the higher RPM.

5. Sleep Mode

When the charging load is low, indicating that the battery BT1–BT6 may be fully charged as set by potentiometer P5 to op-amp U1B on FIG. 21, the output of op-amp U1B goes from a low to a high through terminal U to D flip-flop U30B, a "D" type F—F on power supply not shown. D flip-flop U30B will be clocked by commutation pulses from terminal "W" and the "high" on input "D" will be transformed to output "Q" and will turn off P-channel MOSFET UQ5 (power supply board not shown). This removes power from the power supply itself and all other circuits except those connected directly to battery BT1–BT6 through terminal "E" and "K" which includes D flip-flop U30B and op-amp U3C. Should the battery BT1–BT6 drop below a certain value as set by P1 indicating that the battery BT1–BT6 had equalized at rest and was not fully charged, or that a load was applied causing the BT1–BT6 voltage to drop, the output of op-amp U3C goes from "low" to "high". This is transmitted through terminal "V" to "reset" on D flip-flop U30B causing "Q" to go "low", turning on P-channel MOSFET UQ5 and restoring power to power supply and all circuits. With power restored to dual timer IC U5, cranking mode No. 1 will become operative as described above.

B. Stator Currency Control

FIG. 5E shows the commutation sub-circuit 50 as described in detail above. FIG. 5D shows the stator current control circuit 58. The stator current control circuit 58 includes a PWM controller IC U17 and an op-amp U6D along with suitable proportional components including resistors R130 and R131, capacitor C44, diode D1 and trim potentiometer P6. The sensed stator current $I_{sense}$ from terminal e (FIG. 21) is applied through potentiometer P6, which provides adjustability of maximum stator current by PWM from the PWM controller IC U17 and op-amp U6D (FIG. 5D) to the three phase driver IC U18 (FIG. 5E). The control outputs CA and CB of PWM controller IC U17 are selectively pulsed based on the PWM derived from the input +in and –in to the PWM controller IC U17, and that pulsed output signal by the action of diode D1 and capacitor C44 allows op-amp U6D to hold PWM at absolute zero volts if current called for by potentiometer P8 (SPV$_{RPM}$ on FIG. 5D) does not exceed the limit established by potentiometer P6 when applied to the high-side inputs $\overline{AHI}$–$\overline{CHI}$ (FIG. 5E). Thus, the stator current control circuit 58 does not apply PWM to the high-side MOSFETs QAH–QCH unless stator current exceeds the limit as set by potentiometer P8 while the commutation cycling is not interrupted. The effect is a skipping of some portions of the high-side commutation during the normal commutation control in order to selectively reduce the stator current or permit it to operate to the maximum attainable by uninterrupted commutation. PWM control of stator current is in combination with, and is not in lieu of, PWM control of the voltage applied to the field winding 21 and further, the voltage set by potentiometer P6 to limit maximum stator current could, by the aid of an op-amp, be based on frequency to provide "soft" start in addition to limit of stator current.

C. Control Algorithm Derivation:

Derivation of the "control algorithm" that is used to control phase angle in a multi-phase machine independent of frequency is described hereinafter. As used herein, "control algorithm" is used to refer to the transfer function or control operation that takes place in either circuit elements or a microprocessor or controller (i.e., a physical implementation) to achieve the desired control of the output devices, where the output devices in this case include commutation control, field strength control and stator current control. But, the terminology "control algorithm" should not be construed as limiting.

As a model for developing the control algorithm, a curve (algorithm, t') that mirrors $$t = \frac{1}{4Freq}$$

to less than 1% from 0.344 V$_{RPM}$ to 6.0 V$_{RPM}$ was selected. For purposes of illustration, control of a conventional three-phase (3-phase) synchronous machine, such as synchronous machine 20 having a wound rotor with DC excitation is used herein. Other polyphase motors using other than delta wound stators, including permanent magnets and other configurations, and for a rotor including permanent magnets and wound rotors with multiple-phases and frequencies, including but not necessarily, superimposed on DC excitation may also be utilized without departing from the present invention.

While this method of phase control could be "open loop," the method will be described herein as "closed loop" control. As such, the control algorithm can be used to control any and all of the following variables: position, angular velocity (expressed in RPM), torque, and acceleration. All of these variables, otherwise known as "process variables," can be controlled by being represented by a linear voltage which is compared to a setpoint which is also represented as a voltage. The process variables are values as measured or estimated by sensors or inputs. Both voltages, process variable and setpoint, should ideally have the same scale whether RPM, torque or acceleration, etc. For example, here, 0–5 VDC represents 0–5000 RPM. Obviously, other scales could be used without departing from the present invention. For example, in the case of position control, it may be desirable to use digital scales. In the case of linear position, a linear scale such as "etched glass" or another method as is known in the art may be used. In the case of rotary motion, an optical digital encoder or resolver might be used. Only the setpoint and position need to be digital. V$_{RPM}$ can come directly from the servo that creates a change of position. In any case, only the digital difference (±) between the setpoint and a process would have to be converted to an analog signal to be used as the setpoint voltage (SP V$_{RPM}$). When the SP V$_{RPM}$ is not zero it will cause the servo V$_{RPM}$ to rotate ($\mp$) to reduce the digital difference to zero. While analog signals are used to explain many of the preferred embodiments of the present invention, digital signals (DSP) and/or microprocessors could be used instead.

The difference between $V_{RPM}$ and SP $V_{RPM}$ is measured by a differential voltage amplifier (e.g., an op-amp applied as a differential device). If the difference between the process $V_{RPM}$ and the SP $V_{RPM}$ is zero, at any point on the scale the phase angle between the stator flux vector and rotor flux vector is 0° and independent of frequency. If the difference, for example is 200 mV with the SP $V_{RPM}$ being the higher, the phase angle of the stator flux vector is 90° advanced over the rotor flux vector. Any difference greater than 200 mV will not produce an advance greater than 90°. If the difference is less than 200 mV, the 90° advance is reduced (delayed) down to 0° where both voltages are equal. Since the phase angle between 0° and 90° is dependent only on the difference at any point on the $V_{RPM}$ scale which represents frequency, phase control is independent of frequency. Thus, the proportional band for this loop is 200 mV. This proportional band is adjustable and the method used will be described hereinafter. If the full scale $V_{RPM}$ is 5 VDC, the proportional band expressed as a percentage is [0.200/5×100] or 4%. The gain is the reciprocal of the proportional bond, so this equates to a gain of 25. Not only is the proportional band adjustable, but so is the 5 VDC scale. It should also be mentioned here and explained hereinafter that the SP $V_{RPM}$ could be set or varied via superposition from another process variable. This is, in the art, sometimes called "cascade control." Further, at zero RPM there are two things to consider: (i) there is no back EMF and (ii) that maximum torque is determined by the combined magnitude of the flux vector of the stator and the flux vector of the rotor, and that the stator vector is advanced 90° in the direction of rotation to that of the rotor. Since these two properties are well known in the art, it will be demonstrated hereinafter how stator current without back EMF is limited by PWM and rotor flux density is controlled right up to the point of saturation by field current. As RPM becomes measurable and back EMF is able to limit stator current, the PWM of stator current goes to 100% "ON" and back EMF is simultaneously reduced by reducing field current as a function of frequency. Both of these functions, the control of stator current in the absence of back EMF and reduction of field current based on $V_{RPM}$, are controlled automatically based on the difference between $V_{RPM}$ (and/or stator current) as measured and the SP $V_{RPM}$. In other words, a soft start (i.e., a reduction in the abruptness of the torque initially applied to obtain a smoothing effect in response) at the beginning of rotation can be controlled by the difference between $V_{RPM}$ and/or stator current and SP $V_{RPM}$. A load torque (sometimes called stall) and on up to a starting torque that greatly exceeds the load torque, can be controlled by the difference between $V_{RPM}$ (and/or stator current) and SP $V_{RPM}$. As is also known in the art, motors generally have a starting torque (and current) way in excess of their continuous rating. It is also well known in the art that motor failures due to locked rotor (or stall torque) may be prevented by measuring currents and their time duration or measuring temperature. It is also known in the art that small motors can sustain an overload much greater and longer than comparatively larger motors. This is because of the adverse ratio of mass to surface area of a large motor compared to a smaller one of similar design.

All of the above explains what occurs when the SP $V_{RPM}$ is equal to or greater than $V_{RPM}$. If the opposite occurs, then within ⅙ of a cycle of the 3-phase power to the synchronous machine 20, the algorithm converts the AC motor to an AC generator with controlled voltage generation. This allows the generator to "absorb" energy from whatever the previous load was. This may be a moment of inertia of the previous load that needs to be braked in a controlled manner. Or the situation where the synchronous machine 20 was being used to crank or start automatically, an IC engine 12 and as soon (within ⅙ of a cycle) as the IC engine 12 starts the synchronous machine 20 becomes a generator with a controlled voltage. In the case of a hybrid automobile where each wheel may be controlled by a separate synchronous machine 20, accelerating and/or braking can be controlled individually and collectively on any surface to prevent wheel slip under any and all conditions.

A unique aspect of the control circuit 130 in accordance with the present invention is that the circuit 130 uses a single setpoint to control torque whether it is derived from stator current or from phase angle changes. Either one separately, or both by superposition, can control torque. Stator current must be measured to be controlled while phase angle, because of the algorithm, does not. Phase angle is controlled solely by the difference between the measured variable (i.e., position, RPM, acceleration) and respective setpoint (position, RPM, acceleration).

Figure 19:
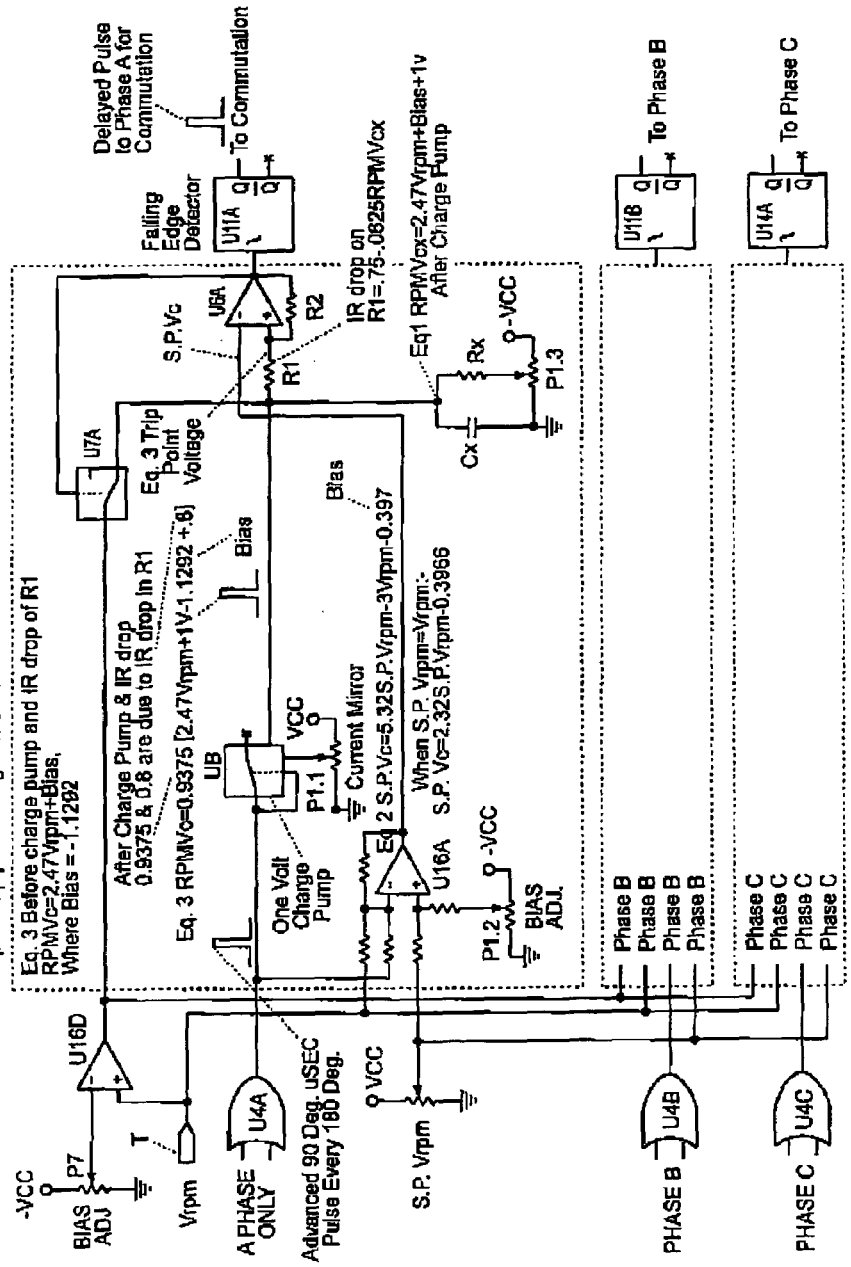
FIG. 19 is a detailed electrical schematic of a control circuit for a control algorithm in accordance with a preferred embodiment of the present invention.

A detailed schematic of the phase delay circuit is shown in FIG. 19 comprising two op-amps UI6A, U16D, a pulse generator U8, a single pole double throw switch (a monolithic CMOS device) U7A, a voltage comparator U6A, a pulse forming device (a falling edge detector) U11A, and an RC circuit including resistor Rx and capacitor Cx. The algorithm is a time delay device and must be repeated for each phase. Three inputs are required for this time delay circuit to function. The first input labeled "T" is $V_{RPM}$ and is a linear voltage starting at zero and represents the revolutions per minute of the synchronous machine. Where $V_{RPM}$ comes from will be described hereinafter. What this $V_{RPM}$ voltage represents is the process to be controlled and it is imputed to op-amp U16A and U16D. Op-amp UI6D converts $V_{RPM}$ to $V_c$ and thence to all three phases, e.g., for phase A, op-amp U16A, switch U7A and capacitor Cx. Vc now represents frequency and can rightfully be called RPMV_c. The "c" in $V_c$ designates a "control" voltage. It is derived from a transfer function for $V_{RPM}$. It is designated as RPM $V_c$ and is inputed to the inverting input of op-amp of all three phases. The second input is "setpoint" $V_{RPM}$. The transfer function for SP $V_{RPM}$ is designated as SP $V_c$ in either case both $V_c$'s have the a linear scale but may have different gains and offsets designated as a bias. $V_{RPM}$ and SPV$_{RPM}$ may be added to, or subtracted from, via other circuit elements prior to or subsequent to the phase delay control circuit, as described below. $V_{RPM}$ and SPV$_{RPM}$ are also input to the op-amps U16A, U16B, U16C of all three phases A, B, C (i.e., SPV$_{RPM}$ is applied to the non-inverting inputs of each op-amp).

SP $V_{RPM}$ is depicted as being derived from a manually operated potentiometer on schematic FIG. 19. The third input, labeled from OR gate U4A is one of short pulses of several microseconds duration (i.e., each phase A, B, C has its own timing pulse input OR gate U4A, U4B and U4C, respectively). The pulses are from one phase only and there are two per cycle spaced 180° apart and all are advanced 90° ahead of rotor position. The generation of the pulses will be described hereinafter. This third input goes to the pulse generator U8 and to op-amp U16A. Its input to op-amp U16A is amplified and momentarily drives its associated output to ground potential. The input to pulse generator U8 causes a "one shot" pulse, also of microseconds duration, which adds approximately one volt to Cx. The internal switch of pulse generator U8 is only connected to capacitor Cx for the duration of the timed pulse. Simultaneously, the negative pulse from op-amp U16A to comparator U6A causes the output of comparator U6A to go from low to high which causes switch U7A to disconnect from capacitor Cx and also adds as a current source through resistor $R_2$ to resistor $R_1$ to resistor $R_x$ to ground. Capacitor Cx is now free to discharge the added voltage thru resistor Rx along with the additional current from resistor $R_1$ and resistor $R_2$ to ground. After a period of time in milliseconds as capacitor Cx drops in voltage, the output of comparator U6A will revert back from high to low when the voltage between resistors $R_1$ and $R_2$ becomes less than SP $V_c$ and switch U7A will close and bring Cx back to RPM $V_c$. As the output of comparator U6A, connected to edge detector U11A, goes from high to low, edge detector U11A will yield a short positive pulse measured in microseconds. Hence, there is a time delay from the 90° advance. It is the purpose of this time delay, called t', to be the same as t where $$t = \frac{1}{4Freq}$$

Figure 20A:
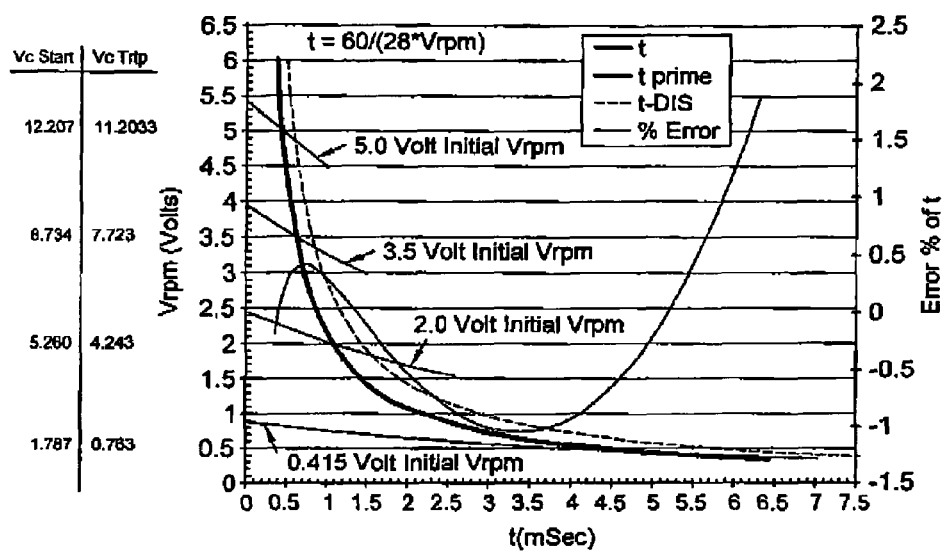
FIG. 20A is a graph of $V_{RPM}$ versus time versus error.

(where Freq on this particular machine 20 is $$\frac{7}{60} V_{RPM}),$$

and Freq is in KHz so that t is in ms of ¼ of one cycle of one phase of a multiple phase synchronous machine where t is plotted as a dotted line on the graph of FIG. 20A. The graph is plotted as a function of $V_{RPM}$ as well as $V_c$START which is RPM $V_c$ plus the one volt added by charge pump U8. RPM $V_c$ on this plot is the output of op-amp U16D. It is therefore RPM $V_c$. The transfer function for $V_c$START= [(gain)$V_{RPM}$+V1+V2] where V1 is 1 volt (as adjusted via potentiometer P1.1) from charge pump U8. V2 is a fixed bias (as adjusted from potentiometer P7) and gain from U16D equal to 2.47. Op-amp U16A acts in a manner similar to op-amp U16D except that it has both SP $V_{RPM}$ and $V_{RPM}$ inputs and a different transfer function. The transfer function for op-amp U16A is SP Vc=[5.32×SP $V_{RPM}$−3 $V_{RPM}$+E2 BIAS] where E2BIAS (as adjusted by potentiometer P1.2) =−0.3966. From this transfer function it can be seen that if SP VRPM=VRPM, the equation becomes SPV$_c$=[2.32(SP $V_{RPM}$)−E2BIAS], with nearly the same gain as for op-amp U16D, and the delay will be t', as previously described. However, if SP $V_{RPM}$ is not equal to $V_{RPM}$, the output of op-amp U16A is increased or decreased depending on whether the VRPM is lower or higher than SP $V_{RPM}$. If $V_{RPM}$ is lower, SPV$_{RPM}$ will rise, the output will be higher to comparator U6A and the time delay will be shorter, and will advance the phase angle toward 90°. If $V_{RPM}$ is higher than SP $V_{RPM}$, the output will be lower and the time delay will be greater, increasing the delay of the 90° advance.

If the delay should increase an additional 30° (i.e., 120° total delay), on any phase, the following undelayed pulse (90° advanced) from the previous phase, from gate U4A–U4C (FIG. 19) to "C" input of flip-flop U14B, U19A, B of 42A–42C (FIGS. 5A–D) catches up to the delayed output of the previous Phase to "D" input and the "D" high transfers to the Q output of the D type flip-flop to OR gate U15D and thence to the disable DIS of three phase driver IC U18 (FIG. 5E) to disable commutation causing the synchronous machine 20 to become a generator. It should now be clear to those skilled in the art of closed loop control that this method of process feedback to the inverse input of SP amplifier UI6A with the appropriate transfer function is a way of controlling the proportional band of a process controller. It should also be noted here that if the process variable $V_{RPM}$ is steady and the setpoint SP $V_{RPM}$ is changed, the action of phase control is the same and phase angle is therefore controlled only by the millivolt difference between $V_{RPM}$ and SP $V_{RPM}$ and is independent of the absolute value of either. Also shown on FIG. 20A in solid lines for $V_{RPM}$ of 5.0V, 3.5V, 2.0V and 0.415V where each discharges to a negative voltage and crosses the plot of t. Since RPM $V_c$ represents frequency, phase control is therefore independent of frequency anywhere on the scale where t and t' coincide. Only a 200 millivolt difference between $V_{RPM}$ and SPV$_{RPM}$ will cause the phase angle to go from 90° advance to 0° and vice versa, in analog fashion, and linear in between. A delay from an advanced 90° pulse is done ahead of time, down to 0° where it is "ON" time, but regeneration or breaking is delayed another 30°. Each plot is noted in the table on FIG. 20B. In FIG. 20A, the difference between t' and t is the error between t from $$t = \frac{1}{4Freq}$$

and its algorithm is t'. As with any algorithm there are always some error.

FIG. 20B (i.e., Table 1) was made from the well known equation:

$$v = Ee^{\frac{-t}{RC}}$$

D. Algorithm Calculations:

Note the difference between RPMVcx and RPMVc of FIG. 19, i.e., RPMVcx is the voltage on capacitor Cx before and after the +1V from charge pump U8. RPMVc (trip voltage) is the voltage to the non-inverting (+) input to comparator U6A. When upon discharge of RPMVcx through Rx, it becomes equal to SPVc which is the voltage to the inverting (−) input of the comparator U6A. When they are equal, comparator U6A will trip from high to low for a 90° delay. This only occurs when $V_{RPM}$=SPV$_{RPM}$. They can be equal at any $V_{RPM}$ which is derived from frequency. The delay, therefore, is independent of frequency.

From FIG. 19, $$RPMVcx = 2.47\ V_{RPM} + yCBIAS, \qquad \text{Eq. 1,}$$

before charge pump U8 where 1v is added; and after charge pump U8 but before Vcx has time to discharge through Rx, and where 0.75v-14 0.0625 RPMVcx is voltage added to RPMVcx due to current through resistors $R_2$ and $R_1$ when the output of comparator U6A goes from low to high, the IR drop through resistor $R_1$ is added to RPMVcx for the trip voltage of comparator U6A when its output goes from high to low as RPMVcx discharges thru Rx, i.e., the trip voltage at the non-inverting input to comparator U6A is equal to S.P. $V_c$ to the inverting input which occurs when the $V_{RPM}$=S.P.V$_{RPM}$ and there is a 90° delay of the 90° advanced pulse.

Eq. 3 then becomes:

RPMVcx=2.47 $V_{RPM}$+1+C-BIAS+IR drop on R1 for start of trip voltage,

Eq. 3, as shown on FIG. 19, now becomes the start of trip voltage RPMV$_c$=0.9375(2.47$V_{RPM}$+1 v−1.1292+0.8) where CBIAS=−1.1292 and 0.9375 and 0.8 are due to the IR drop in R1 and 1 is from charge pump U8.

Simplified, RPMVc=2.32 $V_{RPM}$+0.6289

From FIG. 19, Eq. 2, $$SPVc = 5.32\ SPV_{RPM} - 3\ V_{RPM} + EBIAS, \text{ where } EBIAS = -0.39664$$

When SPV$_{RPM}$=V$_{RPM}$, Eq. 2 becomes SPVc=2.32 SPV$_{RPM}$−0.3966.

From the well known Eq. 4

$$v = E e^{\frac{-t}{RC}}$$

solving for t yields:

$$t = RC \ln \frac{E}{v},$$

where E=RPMVc, v=SPVc and RC=RxCx or $$t' = R_x C_x \ln \frac{RPMvc}{SPvc}$$

where t=t'; RPMVc=Eq. 3 start of trip voltage; SPVc=Eq. 2 when SPV$_{RPM}$=V$_{RPM}$.

Substituting provides:

$$t' = 5 \text{ ms } \ln \frac{2.32\ V_{RPM} + 0.6289)}{2.32\ SPV_{RPM} - 0.3966} \quad \text{Eq. 5}$$

where RxCx=5 ms.

Thus, t' is a function of V$_{RPM}$ for a 90° delay when SPV$_{RPM}$=V$_{RPM}$. If they are not equal and the SPV$_{RPM}$ is greater, the delay will be reduced and the stator flux will be advanced toward 90°. This action can best be explained by noting that op-amp U16A (FIG. 19) has two inputs. One input is the SPV$_{RPM}$ signal to the non-inverting input (+) and the other input is the V$_{RPM}$ signal to the inverting input (−). The gain of the SPV$_{RPM}$ signal is greater than the gain of the V$_{RPM}$ signal and if they are not equal (but SPV$_{RPM}$ is greater than V$_{RPM}$), the difference will be amplified and SPVc to comparator U6A will be increased with amplification. The proportional band (or gain) of the difference can be increased or decreased according to the external circuitry of op-amp U16A. By increasing the gain of the difference, the SPVc to comparator U6A can, with very little error between SPV$_{RPM}$ and V$_{RPM}$, cause the delay to be (0°). It can go no further in that direction and the phase angle will be 90° advanced for maximum torque to cancel the error. With closed loop control, the error will be reduced. Since this control through phase angle is dependent only upon the difference between two voltages and not on their absolute value or frequency, phase angle controls the measured variable independent of frequency.

If SPV$_{RPM}$ is less than V$_{RPM}$, the opposite occurs. With 30° additional delay beyond the 90° delay, the same amplification of the error occurs to the SPV$_{RPM}$ but of opposite polarity and the AC motor becomes a generator. To plot the curve for any V$_{RPM}$ where SPV$_{RPM}$=V$_{RPM}$ Eq. 4 is necessary.

Going back to Eq. 4, and solving for v as a function of t'

$$v = \frac{E}{e^{\frac{t'}{RC}}}$$

where E=2.32 V$_{RPM}$+0.6289 and v=2.32 V$_{RPM}$−0.3966 and RC=5ms.

Thus, $$2.32\ V_{RPM} + E = \frac{(2.47)V_{RPM} + 1.8 + C}{e^{\frac{t'}{RC}}},$$

where SPV$_{RPM}$ = V$_{RPM}$ $$V_{RPM} = \frac{\frac{[(2.32)V_{RPM} + 0.6289]}{e^{\frac{t'}{RC}}} - E}{2.32\ V_{RPM}} \quad \text{(Eq. 6)}$$

V$_{RPM}$ is plotted as a function of t' (starting at t'=0) for any V$_{RPM}$ to obtain plots such as 5.0, 3.5, 2.0 and 0.415 volts V$_{RPM}$ on FIG. 20. Where a particular plot crosses the graph of t', there will be a 90° delay of the 90° advance. Where the V$_{RPM}$ is greater than the SPV$_{RPM}$, the plot will be elevated by op-amp U16D and the SPV$_{RPM}$ will be lowered by op-amp U16A causing the plot to cross the t-dis line before the t' line and the synchronous machine 20 will become a generator, as described previously. But now, it can be visualized where the non-inverting input to comparator U6A is elevated and the inverting input is lowered so that the t-dis line is crossed before the comparator U6A trips and goes from high to low. Thus, the synchronous machine 20 can convert from a motor to a generator within one-sixth of a cycle, and as quickly, convert back to being a motor if either the SPV$_{RPM}$ or V$_{RPM}$ reverse.

Figure 6A:
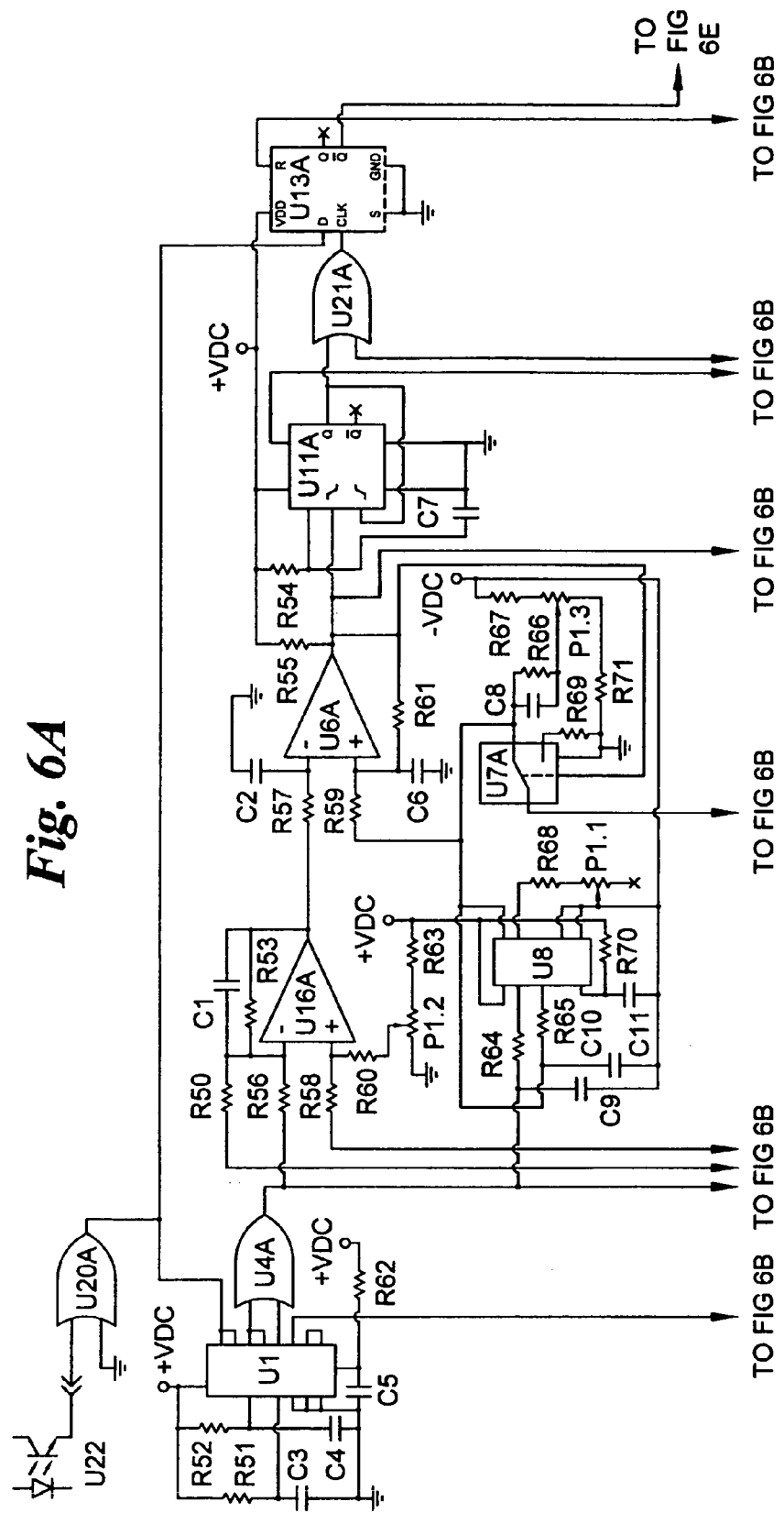
FIGS. 6A–6E are a schematic circuit diagram of a detailed control circuit for an emergency generator.
Figure 6B:
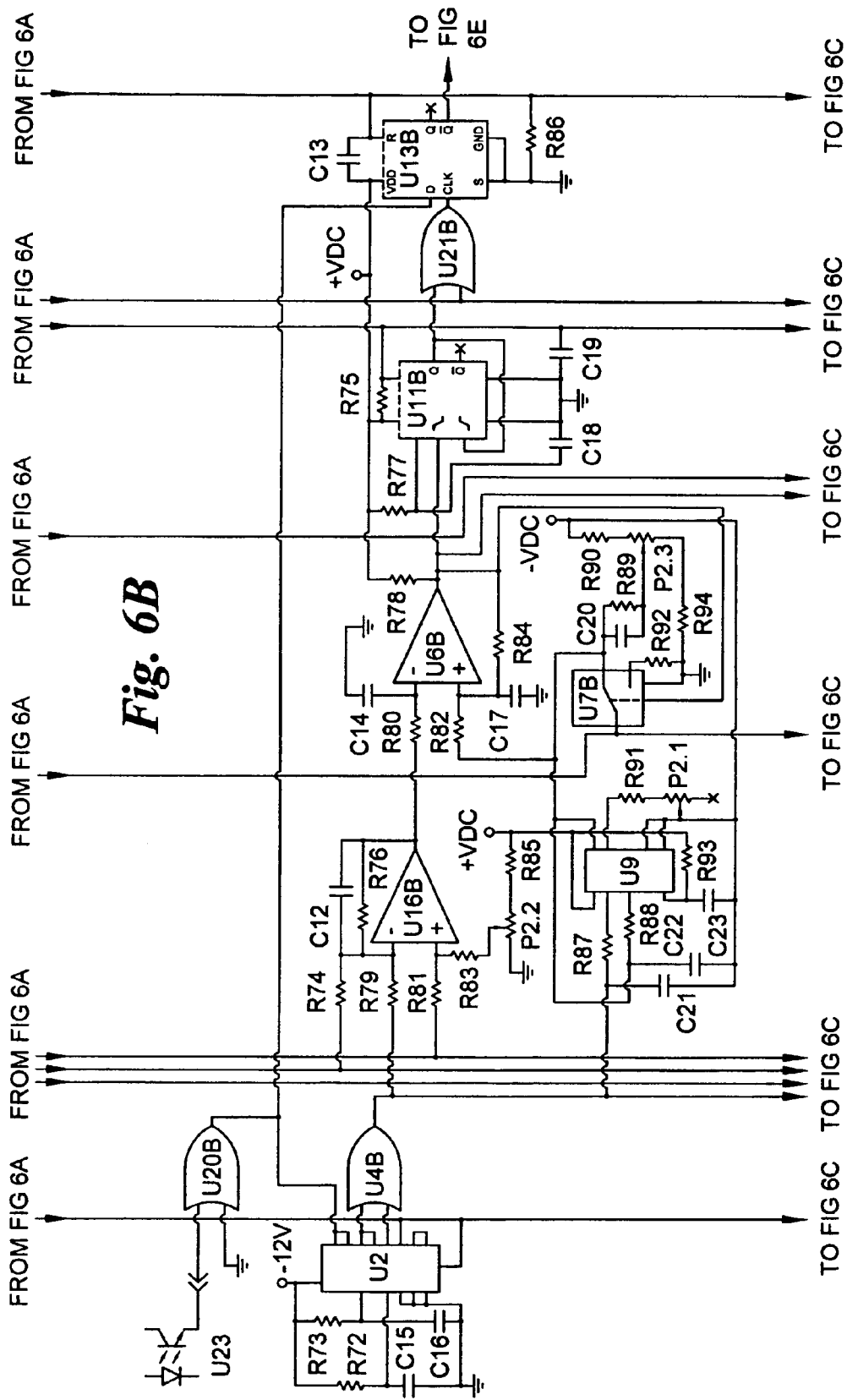
Figure 6C:
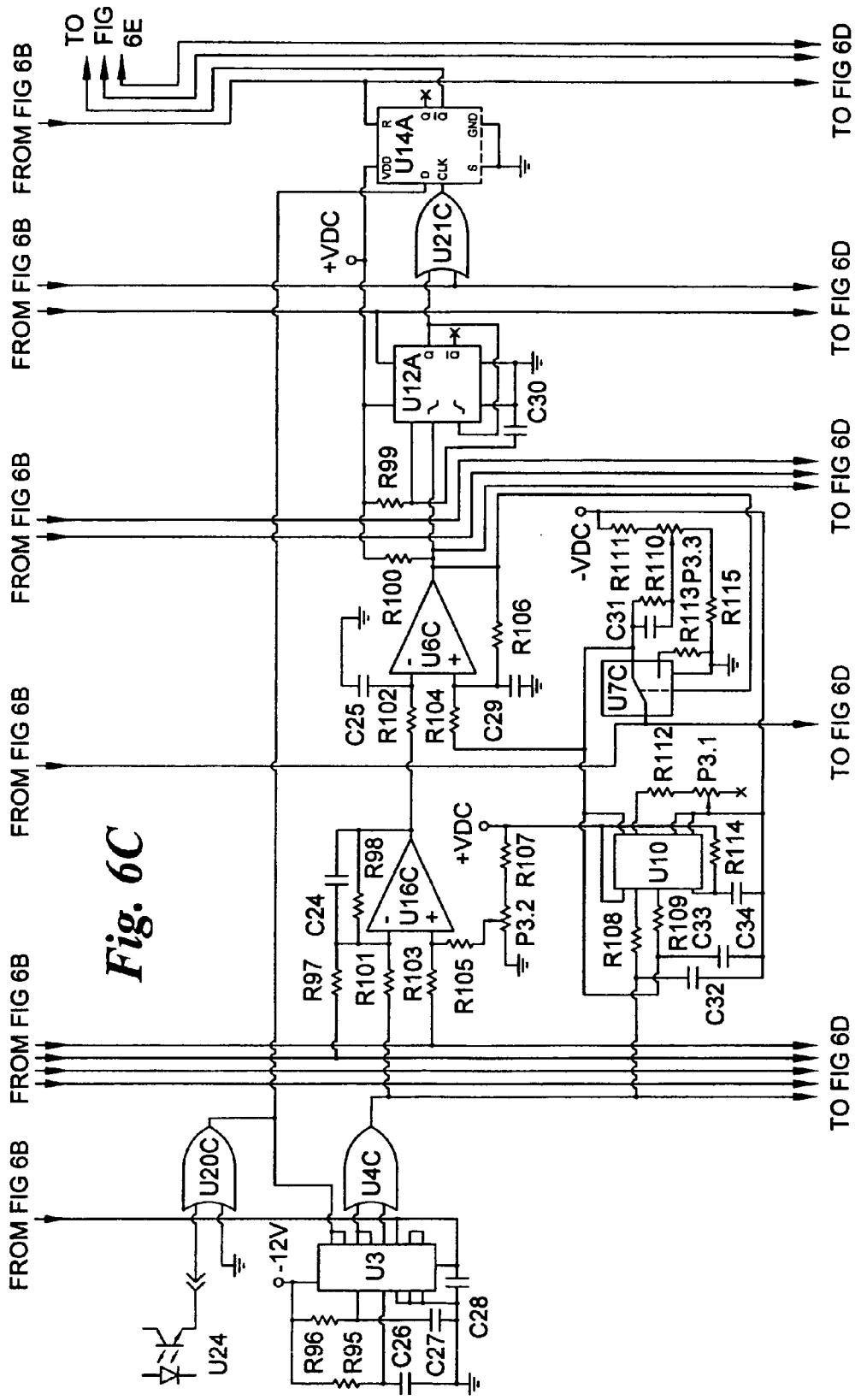
Figure 6D:
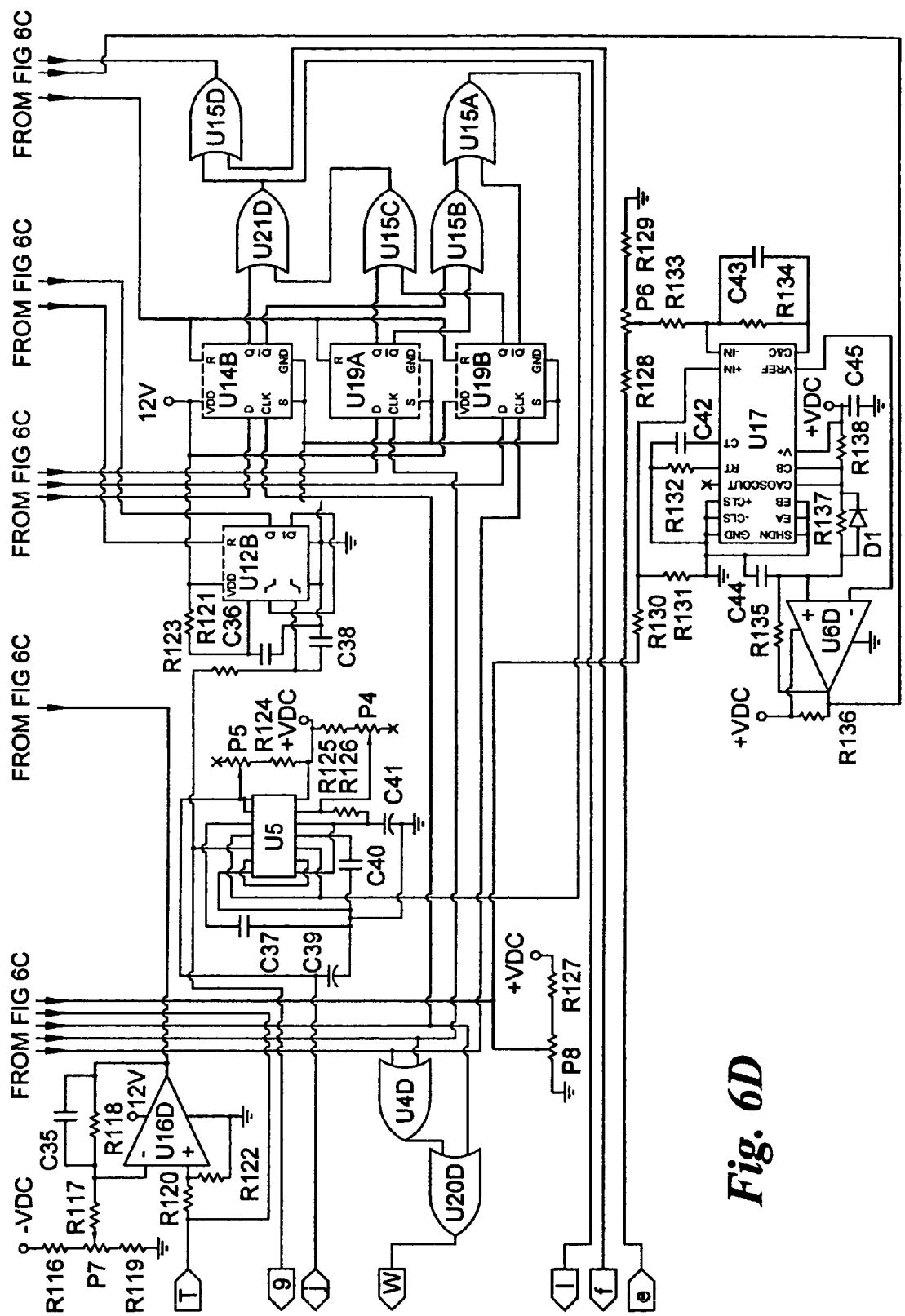
Figure 6E:
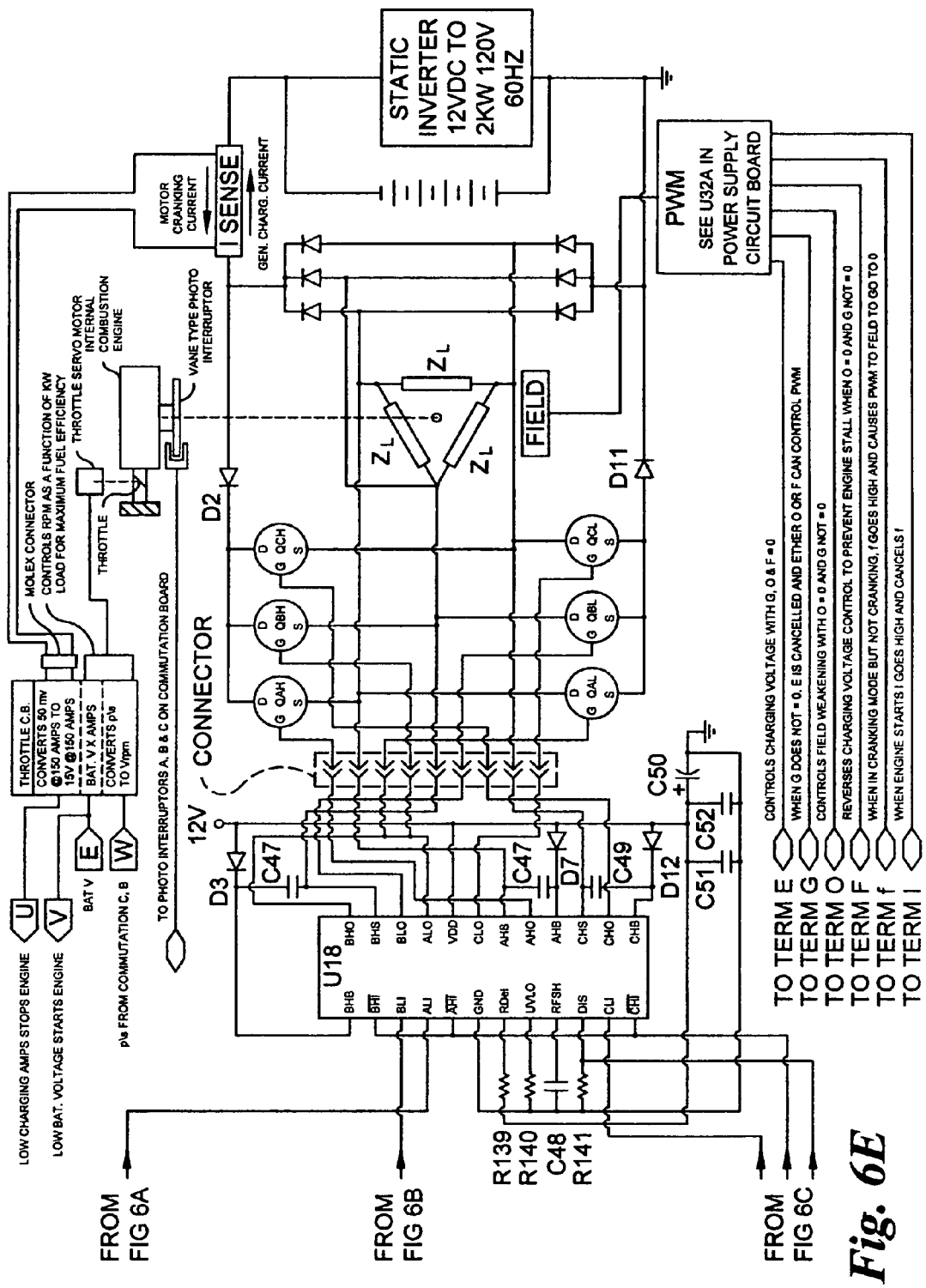

III. Applications of the Control Circuit:

A. Emergency Generator:

FIGS. 6A–6E are a schematic circuit diagram of a detailed control circuit for an emergency generator and/or uninterrupted power supply (UPS) in accordance with the present invention. FIGS. 6A–6D are identical to FIGS. 5A–5D, but FIG. 6E shows that the I$_{SENSE}$ provides a feedback signal to a throttle control board (FIG. 21) for controlling a throttle servo motor (FIG. 1) of the IC engine 12.

1. Discussion of Automatic Throttle Control

All IC engine 12 when not controlled manually by a throttle valve 14 or in the case of diesel IC engine 12 by a fuel injector, are controlled automatically by a governor or regulator to some particular speed or RPM. This is especially true where the IC engine 12 is used to generate AC power to a particular frequency, usually 60 Hz. In this case, as the load on the IC engine 12 varies, it would tend to cause the IC engine 12 to deviate from a "set" RPM. Thus, the governor or regulator must, regardless of the load, keep the IC engine 12 rotating at a "set" RPM. For example, in the case of cruise control on an automobile, the IC engine RPM is controlled to a "set" RPM which keeps the IC engine and hence the speed of the automobile at a "set" or fixed speed. The setting in this instance is variable or analog but "set" or controlled manually by the operator. In another case, the IC engine 12 may be driving an arc welder. In the arc welder case there are two "settings." One is idle when the welder is not welding (i.e. changing position or changing a welding rod). When welding resumes, the "set" RPM goes to a higher "set" value suitable for welding. If the welding load changes, the operator must adjust the higher setting to a new value. The RPM stays "set" at the new RPM value. If welding ceases, the RPM returns to the idle "setting" and this saves fuel by having two different settings.

With automatic throttle control in accordance with the present invention, the IC engine 12 is used to generate electric power but in this case it is AC but rectified to DC. Thus, the IC engine 12 is not governed or regulated to a specific RPM, but is instead controlled in analog fashion according to the KW load to that RPM which is optimally the most fuel efficient. As the load changes, the RPM changes in analog fashion to a new RPM that will again be that RPM to provide the greatest possible fuel efficiency for the new load. These load changes and corresponding RPM changes can be small or great. They can also change gradually or suddenly. When the load is very low or near an idle RPM and a large load appears gradually, the IC engine 12 will gradually increase in RPM to accommodate the higher load. However, when a large load is added suddenly, the IC engine 12 would stall, because an IC engine 12 would not be able to go from a very low to a very high RPM as quickly as a load could go from low to high. The opposite change in load, i.e., a sudden change from a high load to a low load, would not be a problem because the IC engine 12 merely has to be reduced to a lower RPM. In the event where the IC engine 12 is subject to "stall", the present method of throttle control provides for a shift in load from the IC engine 12 to a battery BT1–BT6 while simultaneously calling for an open throttle. The IC engine 12 without a load will jump (i.e., nearly a step change) to a higher RPM (in milli-seconds) and then the throttle control reverts back to normal control based on KW load. This action also takes place in analog fashion without overshoot and without hesitation.

2. Advantages of this Method of Throttle Control a. Since controlling RPM according to the KW load that corresponds to that RPM, which is optimally the most fuel efficient, is synonymous with controlling compression pressure at the moment of ignition for maximum torque at the same RPM, and since any tendency for auto-ignition or spontaneous combustion, sometimes called "pinging" or "detonating," produces a loss in torque and fuel efficiency, it is then possible to increase compression ratio to 12:1 or possibly 14:1 and greater without resorting to a higher octane rating, i.e., usually designated as $$\frac{m_1 + m_2}{2} = 87 \text{ octane}.$$

b. With throttle control in accordance with the present invention used to control compression pressure at the time of ignition, it is possible to take advantage of the Atkinson Cycle while simultaneously controlling RPM for maximum fuel efficiency at a corresponding KW load. Briefly stated, the Atkinson Cycle is a method of allowing for greater expansion of a hot gas after all of the fuel is burned with respect to an internal combustion engine. This not only improves fuel efficiency at low RPM, but allows for greater "breathing" efficiency at higher RPM because of the increased compression ratio.

c. Because KW output of any engine goes up in direct proportion to RPM at constant torque, the Atkinson Cycle with improved high-end performance provides for a greater KW output without suffering a loss in fuel efficiency, even with most low octane fuels.

d. In a hybrid automobile or any situation when batteries are brought to a full charge without any other additional load on IC engine, the KW load will necessarily be very low, requiring a very low RPM of the IC engine. The Atkinson Cycle provides for improved fuel efficiency at very low RPM.

e. The present method of controlling compression pressure at the time of ignition also provides simple compensation for operating at high altitude where both torque and fuel efficiency fall off due to the reduction of atmospheric pressure at that altitude.

3. Throttle Control Description

FIG. 21 shows a throttle control circuit.

a. There are four main inputs to the throttle control circuit, as follows:

(i) P/S (pulses per second) through terminal W from commutation board where P/S is converted to a linear voltage by IC U5 and then to op-amp U3D which converts the linear voltage to $V_{RPM}$. The useful range for throttle control is 1200 RPM (roughly just above a typical idle) to 8200 RPM for maximum output of the alternator. $V_{RPM}$ goes to op-amp U3A where op-amp U3A is set to limit RPM at 9000 by remaining at zero output until $V_{RPM}$ reaches 9000 where output of op-amp U3A goes high in analog fashion. Op-amp U3A output then goes to inverse input of op-amp U2D and then to the throttle control circuit to reverse throttle position and limit high rpm to 9000 overriding the input of op-amps U2B–U2D.

(ii) S.D. (shut down) from commutation board through terminal U to $V_1$ of op-amp U2B, FIG. 12. Until shut down is desired, the voltage at terminal U remains at zero volts. As charging current is sensed at a very low value, indicating the battery BT1–BT6 is fully charged and there is little KW load, the shut down voltage goes from zero to high (approximately 12v). This high voltage to $V_1$ of op-amp U2B will override all other signals and cause the throttle to close, causing the IC engine 12 to shut down. When battery voltage drops, indicating the IC engine 12 should be started (automatically as previously described), the voltage from terminal U will return to zero, allowing the throttle valve 14 to return to a previous setting just above idle, or greater, allowing the IC engine 12 to start.

(iii) BAT E from commutation board terminal E is where the battery voltage is sensed by op-amp U3C in order to initiate cranking mode with a drop in E, as set by potentiometer P1 and sent to power supply board by terminal V.

Figure 12:
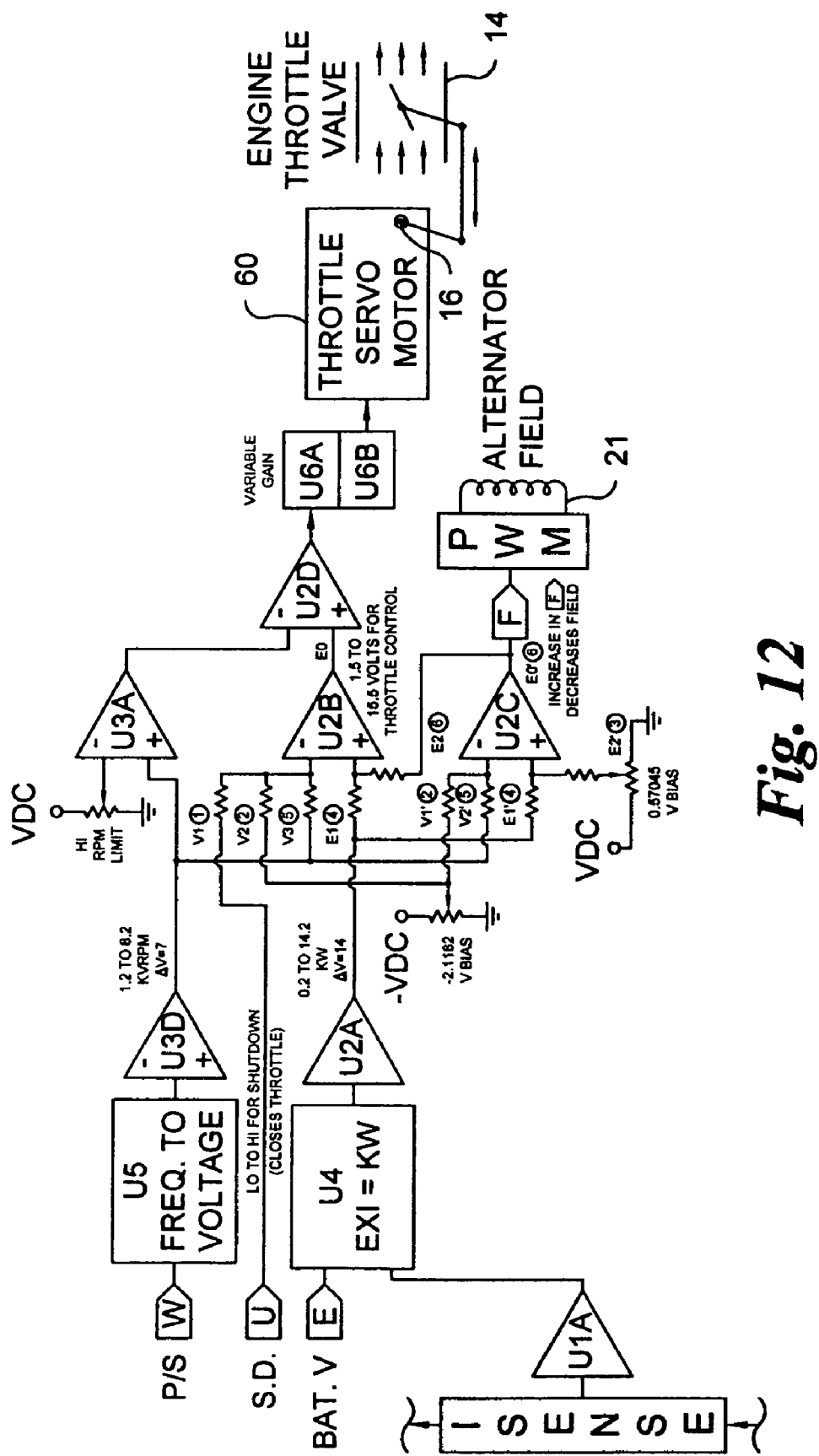
FIG. 12 is a detailed electrical schematic of a control circuit for throttle control in accordance with the preferred embodiment.

(iv) I SENSE which measures charging current to the battery BT1–BT6 to maintain battery charging voltage set in this case between 14.0 and 14.2 V. Op-amp U1A amplifies the current signal from I SENSE to a 0 to 15 V signal analogous to 0 to 150 A charging current. This signal is also sent to multiplier IC U4 where multiplier IC U4 multiplies I times E to obtain KW load upon the IC engine 12. U2A converts this to a 0.2v to 14.2v signal. Since this voltage signal represents power (i.e. E×I), there is a 14.2 V charging voltage×150 A charging current, to obtain power in watts of 14.2 V×150 A=2130 W or 2130 W/14.2 V or 150 W per V. For example, for a 0.2 V signal there is 150 W per volt×0.2 V signal=30 W and 30 W÷14.2 V charging voltage=2.1 A for a minimum charging current for shut down. FIG. 12 also shows the $KV_{RPM}$ signal from op-amp U3D going to $V_3$ of op-amp U2B and to $V_2$ of op-amp U2C. This signal varies from 1.2 $KV_{RPM}$ (the S.D. RPM) to 8.2 $KV_{RPM}$ while the KW load voltage from op-amp U2A goes to $E_1$ of op-amp U2B and to $E_1$ of op-amp U2C, and this signal varies from 0.2 $V_{KW}$ (the S.D. signal) to 14.2 $V_{KW}$ also of FIG. 12.

Figure 11:
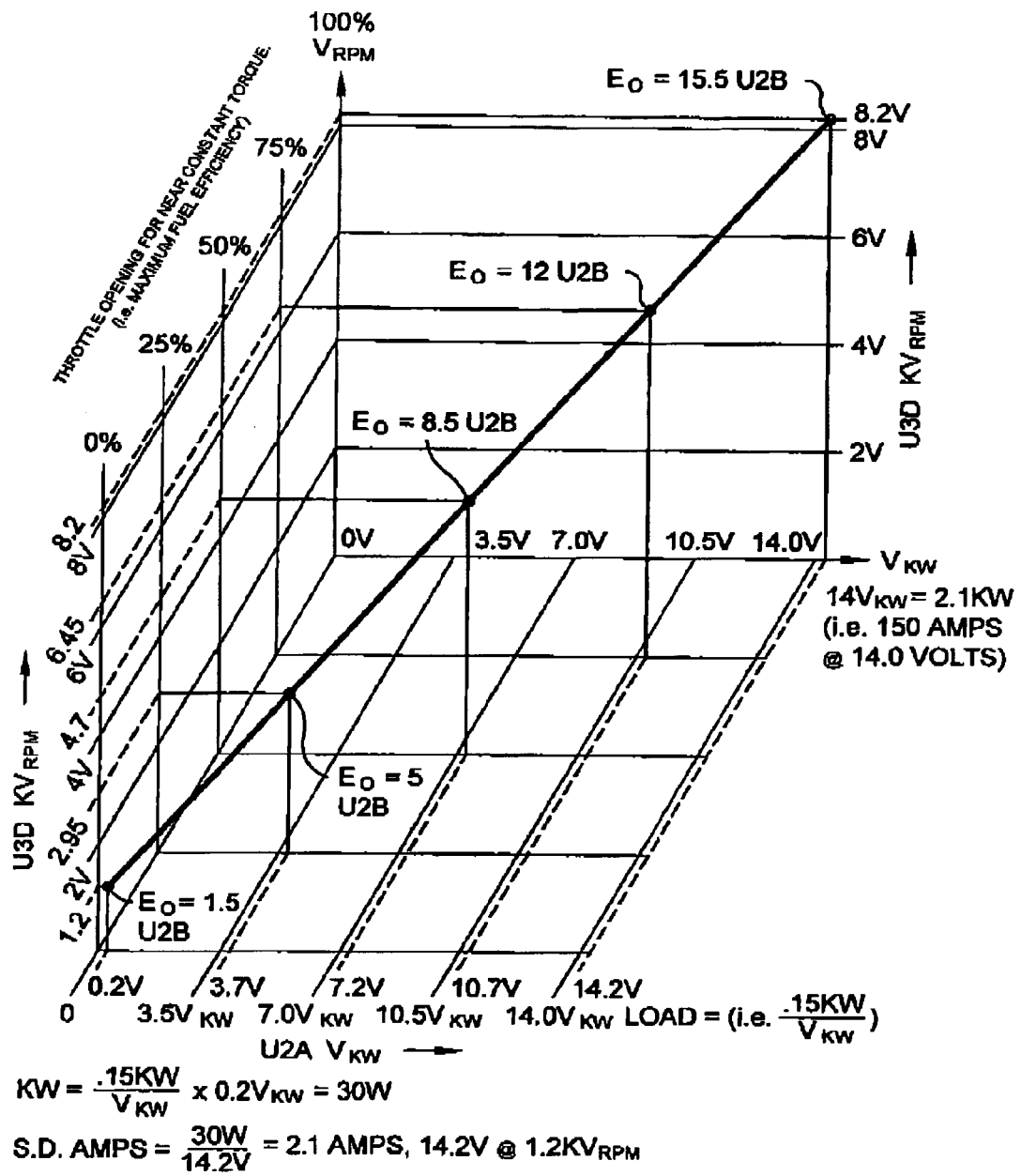
FIG. 11 is a dimensional graph of $V_{RPM}$ versus $V_{KWLOAD}$ versus percent throttle opening demonstrating electronic automatic throttle control in accordance with the present invention.

The transfer function of op-amp U2B is:

$$E_0 = 11(E_1) + 22(E_2) - V_1 - 11V_2 - 20V_3 \quad \text{Eq. 7.}$$

where $V_1$ is always at zero except for S.D. where it goes high and $V_2$ is a fixed bias at −2.1182 V and $E_2$ of op-amp U2B is a voltage from op-amp U2C which remains at zero as $E_1$ and $V_3$ of op-amp U2B track each other from minimum to maximum. Under these conditions where only $E_1$ and $V_3$ vary, they will be forced to track each other by the action of the output voltage $E_0$ to the throttle control circuit of op-amp U2D and U6A–U6B. With these values substituted into Eq. 7 and as shown in the 3-D graph of FIG. 11 at 0%, 25%, 50%, 75% and 100% of the change in value of $KV_{RPM}$ from 1.2 to 8.2 $KV_{RPM}$ and a load from 0.2 to 14.2 $V_{KW}$, there is a linear voltage output that goes from 1.5, 5.0, 8.5, 12.0 and 15.5 V as $KV_{RPM}$ tracks $V_{KW}$ load in analog fashion. Any deviation from tracking and the output voltage will be amplified by the difference between $E_1$ and $V_3$ and cause the throttle valve 14 to move in the direction necessary to keep the $KV_{RPM}$ of the IC engine 12 tracking KW load. The percentage change is not the percentage change in throttle position, but rather, the percentage change in $V_{RPM}$ as a result of the amplified change in throttle position because of an error in non-tracking of $V_{RPM}$ versus $V_{KW}$.

The transfer function for op-amp U2C (FIG. 12) is:

$$E_0 = 2E_1 + 4(E_2) - V_1 - 4V_2 \quad \text{Eq. 8,}$$

where $V_1$ of op-amp U2C receives the same bias voltage −2.1182v as $V_2$ of op-amp U2B. Also, $E_1$ and $V_2$ of op-amp U2C receive the same voltages from minimum to maximum as $E_1$ and $V_3$ of op-amp U2B. Also, $E_2$ of op-amp U2C receives a fixed bias of 0.57045 V. With these values at the same 0%, 25%, 50%, 75% and 100%, the change in output of op-amp U3D which becomes the input to op-amp U2C, the output of op-amp U2C will remain at zero voltage as long as the $KV_{RPM}$ and KW voltages track each other. However, if $KV_{RPM}$ and KW voltages do not track each other as inputs to op-amps U2B and U2C, then the output of op-amp U2C will come above zero if KW voltage should be greater than the tracking voltage $KV_{RPM}$ of the IC engine 12. In this event, the output of op-amp U2C will rise above zero with an amplification of 2 for $E_1$ and −4 on $V_2$. This occurs when a load change is suddenly applied to the synchronous machine 20 and the IC engine 12 cannot increase RPM via the throttle control fast enough to prevent stall. The output $E_0$ of op-amp U2C becomes the input $E_2$ of op-amp U2B which has a gain of 22 and causes the throttle valve 14 to open regardless of other signals to op-amp U2B. Also, the output of op-amp U2C to terminal F to the field 21 of the synchronous machine 20 reduces the output charging voltage of 14.2 V to the battery BT1–BT6 which removes the load from the synchronous machine 20 and transfers it to the battery BT1–BT6 to sustain the power to the load while the IC engine 12, with reduced charging load or no load and with open throttle, jumps to a higher RPM where the load can be sustained by the IC engine 12 and synchronous machine 20 allowing it to revert back to normal control. If the tracking of the $KV_{RPM}$ and the KW load should be upset in the opposite direction, due to a sudden reduction in KW load, the opposite of stall occurs and nothing happens, except that the output of op-amp U2C becomes biased below zero and the IC engine 12 returns to a lower RPM and resumes normal tracking control.

While the actual output voltage from op-amp U2B is linear and controls RPM of the IC engine 12, it must be further adjusted for span and offset. Span is adjusted by potentiometer $P_{11}$ and offset by potentiometer $P_{12}$ (FIG. 21) which also act as electronic limit switches.

Further conditioning is also required in order to compensate for the non-linearity of the throttle valve 14 in controlling RPM of the IC engine 12. This is accomplished by dual timer IC U6A–U6B. The position servomotor 60 is controlled by standard PWM, and, the PWM varies between two set values causing the output shaft 16 to rotate in linear fashion, back and forth analogous to PWM between two set limits. Dual timer IC U6A–U6B convert the linear input voltage from op-amp U2D to a non-linear output of PWM by utilizing the mirror image of a portion of an RC circuit. Further, a non-linear linkage between throttle valve 14 and servo motors can also be employed to enhance or suppress non-linearity correction.

B. Hybrid Automobile:

One possible application of a control circuit 30 or 130 for phase angle control in conjunction with stator PWM control is in a hybrid automobile. FIGS. 7A–7E are a schematic circuit diagram of a detailed control circuit for engine control in a hybrid automobile and FIGS. 8A–8E are a schematic circuit diagram of a detailed control circuit for wheel control in a hybrid automobile. Similarly, FIGS. 7A–7D and 8A–8D are identical to FIGS. 5A–5D, but FIG. 6E shows that the $I_{SENSE}$ provides a feedback signal to a throttle control board (e.g., FIG. 21) for controlling the throttle servo of the IC engine 12 and FIG. 8E and FIGS. 9–10 show the associated control circuitry and logic for controlling the interaction between four wheels WHEEL1–WHEEL4 and the IC engine 12.

In an ideal hybrid automobile, a synchronous machine 20 is provided for each driven wheel WHEEL1–WHEEL4 (see e.g., FIG. 9), and another synchronous machine 20 (see e.g., FIG. 10) is provided for an IC engine 12 for battery charging. When the hybrid automobile is being started from zero or a dead stop, the synchronous machines 20 drivingly coupled to each wheel WHEEL1–WHEEL4 are operated as motors from their respective batteries BT1–BT4. To accelerate from zero, $VR_1$ is increased and acceleration will be in a manner similar to a conventional automobile responds to a gas pedal. In operation at varying speeds, the synchronous machines 20 directly drive the respective wheel WHEEL1–WHEEL4 to which each is coupled. To decelerate, an operator merely removes his/her foot or hand from the accelerator $VR_1$ allowing the synchronous machines 20 to switch to generator mode and applies his/her foot or hand to $VR_2$ (sequentially disconnecting batteries BT1–BT4 to prevent overcharging) to charge the batteries BT1–BT4. If it is necessary to stop quickly or to decelerate rapidly, the generated current and voltage may be too great for battery charging. In this situation, a "false load" is applied to the synchronous machines 20 while simultaneously using PWM control on the field winding 21.

1. Discussion of Four Wheel Electric Versus Mechanical Drive

Most if not all, presently available hybrid automobiles employ mechanical drive with electric assist described as "serial" or "parallel." Serial means the IC engine 12 and electrical traction motor are mechanically connected in series, and parallel means they are connected side by side. Therefore, not only is the IC engine 12 retained, but also the automatic transmission, drive shaft, (front and rear if 4-wheel drive, along with an associated transfer case), ring-pinion gears along with differential assemblies (incorporating a mechanism for limited slip), housings, etc. Also, conventional brakes are retained with their associated carrier plates, brake shoes, drums and/or discs, and dual hydraulic master cylinders, slave cylinders and lines. All of the above require periodic maintenance and/or repairs, i.e., lubrication for transmissions and differentials, brake linings for brakes, and in some cases after 80,000–100,000 miles, new clutches, bands, and seals for automatic transmissions. The above mechanical drive system consumes up to 7% of the energy produced by the IC engine 12 in addition to that wasted in the form of heat when braking with conventional brakes.

2. Four-Wheel Electric Drive:

As shown in FIGS. 9–10, the system, in accordance with the present invention, uses four synchronous machines 20, one for each wheel WHEEL1–WHEEL4, independently and electrically controlled. There is no mechanical connection between any of the wheels WHEEL1–WHEEL4, nor is there any mechanical connection between the IC engine 12 and any wheel WHEEL1–WHEEL4. FIG. 10 is a block diagram which shows the complete system including the IC engine 12 for battery charging, along with the relays that cutout the batteries BT1–BT4 as they reach full charge. This is not shown on FIG. 9 but it is necessary so as not to overcharge batteries BT1–BT4 while braking going down a long hill.

The four synchronous machines 20 weigh less than the weight of mechanical components not used, i.e., transmission drive shaft, ring and pinion, housing, brakes, drums, brake shoes, carrier plates, etc. The obvious benefits include: less mechanical moving components to wear or maintain; all braking is done via regeneration and used to recharge batteries BT1–BT4; differential between wheels WHEEL1–WHEEL4 is electronic differential with anti-slip instead of limited slip. Anti-lock brakes (where wheels "lock" then "unlock" in a very noisy and disturbing manner) now become anti-slip. An on board accelerometer prevents wheel slip whether accelerating or braking (i.e., electronic differential between all four wheels WHEEL1–WHEEL4 will not by itself prevent wheel slip as long as they are in sync and not slipping with respect to each other). By using four synchronous machines 20 instead of one synchronous machine 20 that is four times larger than each of the smaller synchronous machines 20, a KW overload can be sustained which is much greater and much longer than with one four times larger. The area to mass ratio is much greater on four smaller machines 20 and with "air over," the air cooling is much greater than with a single larger machine 20 of the same design, which is the reason some of the hybrid automobiles available today using a serial or parallel arrangement require water-cooled electrical traction motors.

3. Changing Direction of Rotation:

In the application of a synchronous machine 20 that is coupled to an IC engine 12 and used as both a cranking motor and then as a generator when the IC engine 12 starts, the rotation is always in the same direction. There is no need to reverse the direction of rotation. However, as in the case of a hybrid automobile or any other application where it is necessary to reverse rotation, the reversal can be done electronically as shown in FIG. 14. First the synchronous machine 20 must be at rest, or zero rotation. This can be done from a high RPM (high frequency) by regeneration, either to charge a battery BT1–BT4 or by applying a fake load to output of the synchronous machine 20 or both. The latter would be most desirable if the synchronous machine 20 is to come to zero RPM quickly, which might cause an over-voltage to the battery BT1–BT4 being charged. If the synchronous machine 20 had a 2-pole rotor, there are six positions where the rotor (without an encoder) could come to rest. Those six positions are in the table of FIG. 15 (See also FIG. 4). If there are multiple pairs of poles (without an encoder), the rotor could come to rest in any of $$\left[\frac{N}{2} \times 6\right]$$

positions per revolution, where N equals the number of rotor poles, e.g., for a rotor with 24 poles there would be 72 positions in which the rotor could come to rest. However, there are still only six positions within any electrical cycle which one should be concerned with here. As with any synchronous machine 20 acting as a motor, it is well known that it is only necessary to switch only two of the A, B, C leads such as A and B, B and C, or A and C to reverse rotation. That being the case, with reference to the table of FIG. 15, there are either two high switches "on" or two low switches "on" in each of the 6 positions. The pair that are high or low must be selected and switched when reversing direction; otherwise, the rotor will jump to a different position possibly in the wrong direction before taking off in the correct direction. Also, since the photo-interrupters are located 90° advanced from rotor position, the vane-type photo-interrupter must be switched 180° (or the photo-interrupters themselves, but not both) to cause all the resultant pulses to be 90° advanced with respect to rotor position and rotation. This can all be done electronically instead of mechanically as shown in FIG. 14. Commutation is switched 180° by switching outputs of flip flops U13A U13B, and U14A from $\overline{Q}$ to Q. Simultaneously, the appropriate pair "A and B" or "B and C" or "A and C" must be switched. Only one pair will be switched and it must be the pair that is "0-0" or "1-1" in FIG. 15. Switching both the three commutation switches S1–S3 and the proper pair "A and B," "B and C," or "A and C," the rotor will start from whatever position it occupies at rest and rotate in the opposite direction after receiving the first artificial pulse mentioned above. The same artificial pulse must lock all switches in their switched positions until rotation is again brought to 0 RPM. This is accomplished with four "D" type flip-flops D1–D4. The artificial pulse clocks the flip-flops D1–D4 in "set" (CW) or "reset" (CCW) where they will remain until, at zero RPM, rotation is reversed again if desired. Rotation will not be reversed but will begin again in the same direction with another artificial pulse if all switches remain as they were before zero RPM.

4. Description of Anti-Slip:

FIG. 9 shows four wheels WHEEL1–WHEEL4 that are each driven separately by an associated synchronous machine 20, 1a–1d. On the opposite end of the motor shaft is a photo-interrupter 2a–2d which generates the three phases A, B, C to the commutation board 3a–3d described previously. The commutation board 3a–3d converts the three phases A, B, C to six pulses per cycle and transmits these pulses through terminal W to a modified throttle board 4a–4d also described previously. The throttle board 4a–4d converts pulses/sec to a linear voltage Vrpm and transmits this signal from terminal T to amplifier U1a–U1d, U4a–U4d and U2. In going to the inverting input to U4a–U4d which also has a $SPV_{RPM}$ from variable resistor $VR_1$ to the non-inverting input, it will modify the output of U4a–U4d inversely, as previously described, if $V_{RPM}$ is greater than $SPV_{RPM}$. This indicates, for example, that one wheel, such as WHEEL 1 is beginning to slip under acceleration. When $V_{RPM}$ at T exceeds $SPV_{RPM}$, the output of op-amp U4a will reduce the $SPV_{RPM}$ to stator control 3a from the $SPV_{RPM}$ called for by variable resistor $VR_1$. This is done with amplification through U4a, and is independent of the other wheels WHEEL2–WHEEL4. They however will act independently in like manner to keep any wheel from slipping should one or several hit a slippery spot while accelerating. While braking the whole process is reversed, but through the action of op-amps U1a–U1d the outputs of which go through terminal F to PWM 7a–7d to field coil 8a–8d, respectively, which controls braking. (Note that the output of U1a–U1d acts in reverse of U4a–U4d, i.e., an increase in output decreases braking.)

However, whether accelerating or braking, if all four wheels WHEEL1–WHEEL4 are slipping simultaneously and in unison with each other, reference must be made to amplifier U2. Amplifier U2 has four inputs, $V_{RPMa-d}$ and sums each $$\left[\left(\frac{V_{RPMa}}{4} + \frac{V_{RPMb}}{4} + \frac{V_{RPMc}}{4} + \frac{V_{RPMd}}{4}\right) = \text{Average } V_{RPM}\right].$$

Average $V_{RPM}$ is sent to op-amp U6 where it goes to both the inverting (−) and non-inverting (+) inputs. If $V_{RPM}$ is steady (neither increasing nor decreasing), it transmits $V_{RPM}$ on both the inverting (−) and non-inverting (+) inputs with equal amplitude and hence they both cancel. However, if the Average $V_{RPM}$ is increasing or decreasing, the rate $$\left(\text{i.e., } \pm \frac{dv}{dt}\right)$$

will be sensed at the non-inverting input (+) of op-amp U6 due to capacitors C1 and C2. This will cause the output of op-amp U6 to increase if Average $V_{RPM}$ is increasing, or decrease if Average $V_{RPM}$ is decreasing, unless the ratio is not matched by vehicle accelerometer amplifier U5. If there is no wheel slippage, the output of op-amp U6 will equally match the rate of change of Average $V_{RPM}$, both in polarity and amplitude, positive polarity if accelerating and negative polarity if braking. If there is wheel slippage, the output of op-amp U6 will amplify the difference and deliver this voltage to all inverting inputs of op-amps U4a–U4d and U1a–U1d. If the output is positive polarity, the wheels WHEEL1–WHEEL4 are slipping in accelerating mode, and op-amps U4a–U4d will invert the signal to $SPV_{RPM}$ to 3a–3d and decrease the accelerating torque to the wheels WHEEL1–WHEEL4. However, if the output is negative polarity, the wheels WHEEL1–WHEEL4 are slipping in the braking mode and the signal to op-amps U1a–U1d will override the braking signal to PWM 7a–7d causing the braking torque to be reduced.

It should be noted here that a signal to the inverting input of any op-amp changes the direction of the output opposite that of the input. Also, a decreasing signal from op-amp U4a–U4d to $SPV_{RPM}$ decreases accelerating torque to wheels WHEEL1–WHEEL4, while an increasing signal from op-amp U1a–U1d to PWM to field 7a–7d will decrease braking torque, and further, when variable resistor $VR_1$ for $SPV_{RPM}$ is calling for acceleration, variable resistor $VR_2$ for braking torque will be set at zero braking (i.e., maximum voltage). When variable resistor $VR_2$ for braking torque is set for braking, variable resistor $VR1$ for $SPV_{RPM}$ will be set at zero. This is illustrated in FIG. 9 which shows the pointer (slider) located for variable resistors $VR_1$ and $VR_2$.

There is also $I_{SENSE}$ 5a–5d while accelerating. This signal goes to 6a–6d which controls PWM for field weakening from 100% "ON" at zero $V_{RPM}$, through terminal O and also while accelerating from zero RPM limits stator current through terminal e, and braking will be zero. When braking mode is active with zero $SPV_{RPM}$, op-amps U1a–U1d control PWM through terminal F for braking and a decrease in voltage to PWM increases braking.

Thus, there are two systems. One controls wheel slippage for each wheel with respect to the average and the other works to control wheel slippage in unison, and both systems work simultaneously whether accelerating or braking.

By having RPM control of each wheel relative to the average, all will spin relatively the same. By having derivative response to the average of the wheels spinning in unison in conjunction with on-board accelerometers, it is possible to prevent wheel slippage under any and all conditions. Of course, because vehicles can go up and down hills with components of the acceleration of gravity, such a vehicle would require three accelerometers to compensate.

C. Position Control:

The control circuit 30, 130 could also be used in position control, such as in machine tool applications, i.e., to drive the speed of a rotary spindle on a lathe or for positioning motors such as on a robot, a position table (X-Y plane), and the like.

1. Digital Position Control with CW and CCW Rotation and Stopping Between Steps:

Sometimes position control must stop somewhere in between the six steps per cycle as previously described and then move incrementally between two steps against forces that alternate in direction with and against the direction of movement or stop and reverse direction. In the case of movement of robots or a computer numerical control (CNC) milling machine, it may be desirable to move very rapidly between two locations where incremental movement is of no concern, e.g., moving from one location to another for a "pick" and "put" operation of a robot or drilling holes on an X-Y table for a milling machine. As previously described, it is possible to control RPM from zero on up to frequencies well above 400 Hz, and to stop rotation with regenerative braking, then to reverse rotation (i.e., traction motors for autos). Stopping was at any one of six positions within a cycle, then rotation could be reversed, all using only three (3) photo-interrupters and a vane-type interrupter.

Figure 18:
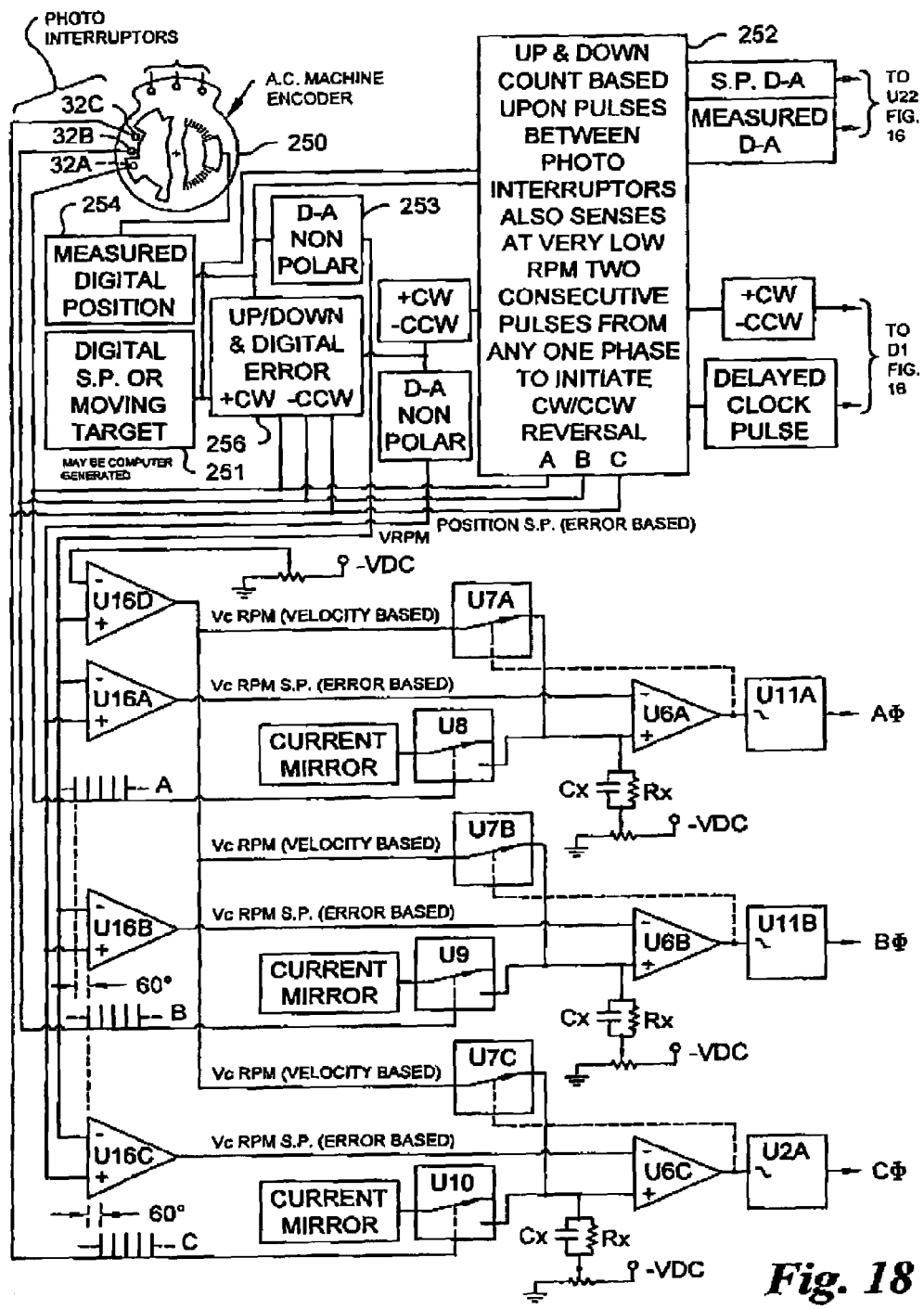
FIG. 18 is a detailed electrical schematic of a control circuit for digital position control.

To achieve position control between steps, a suitable encoder 250, 254 (FIG. 18) is necessary which will be able to count up and down as it rotates CW and CCW to provide an exact position of what is being moved in digital readout form (i.e., engineering units, decimal value, floating point or arbitrary counts, etc.). A digital setpoint 251 is also required that is the desired position of what is being moved and should be in the same readout format. A block diagram of this type is illustrated in FIG. 18. Also while counting up (i.e., CW direction), the Up/Down Counter 252 must count the number of positions between the six pulses per electrical cycle of the previously described vane-type interrupter 24, 24' as detected by photo-interrupters 32A–32C. The six pulses represent 60° of the 3-phase power to the AC synchronous machine, as previously described. Then, while rotating in the same direction, the Up/Down Counter 252, to the next 60° pulse, must count backwards to the next pulse from the photo-interrupters 32A–32C. The up and down count is separate from the total count of the actual position. This up and down count is converted to an analog signal for PWM control between pulses (Up/Down Counter 252 of FIG. 18). Should the setpoint stop moving, rotation would stop, the up and down count would stop, rotation would cease and PWM would remain fixed to hold the position. If an external force were applied to attempt to move the measured position, PWM (by PWM controller U22) would increase or decrease to hold the position, normally between two steps. This PWM is independent of the previously described PWM to the stator which limits stator current in the absence of back EMF. During this time and while moving incrementally, D/A 253 is zero. From this point, the setpoint-target 251 could move in either direction (i.e., CW the same or CCW reverse). Should the setpoint-target 251 move in the same direction, CW rotation would proceed as before. However, if the setpoint-target 251 moves in the opposite direction, the CCW rotation and the up and down count would move also in the opposite direction as would PWM. The photo-interrupters 32A–32C that was last interrupted would be again interrupted. Thus, two consecutive interruptions of the same photo-interrupter 32A–32C is the signal for the rotation of the synchronous machine 20 to reverse rotation, as previously described. Commutation then resumes as described before and counting up or down is done the same as before, but with opposite rotation and direction (i.e., frequency is non-polar).

Digital position control is thus described where position could be held without error to a particular position and moved incrementally counting up or down at low velocity. It is also necessary to provide a position control function where the position setpoint is moved abruptly (CW or CCW) with a discrete jump of considerable distance. This occurs, for example, in a computer controlled milling machine programmed to drill holes at discrete locations. Movement from one location to the next is done very rapidly without incremental steps from one position to the next. This is sometimes referred to as "slew rate." A milling rate is programmed in "inches per minute" where each and every increment from the encoder must follow the setpoint-moving target step by step without error. This limits the speed of slew rate. When moving at "slew rate," perhaps one hundred times faster, positions in between need not be identified for error but must be counted by encoder 250, 254 to identify the approach to the new setpoint position, where drilling and/or milling may continue. First there must be an "error" identified by Up/Down Digital Error 256, FIG. 18 which is bi-polar and notifies Up/Down Counter 252 whether or not to change direction by sending a signal to flip-flop D1 (FIG. 16). It also sends a signal to D/A 253 (FIG. 18) which is non-polar and converts error to a linear analog signal. The linear analog signal is error-based and becomes the $SPV_{RPM}$ signal to op-amps U16A–U16C. The Frequency/Voltage converts the non-polar $VR_{PM}$ signal. From op-amps U16D, U16A–C, to edge detectors U11A, U11B, U12A, phase angle, previously described, takes over control, as shown in FIG. 14 until there is little or no error. As the new position setpoint is approached, phase angle and velocity become near zero, control then returns to FIGS. 16 and 18. Up/Down Counter 252 counts up and down between pulses from photo-interrupters 32A–32C and sends analog setpoint and measured position to PWM controller U22 (FIG. 16). Up/Down Counter 252 also senses, at very low RPM, two consecutive pulses from any one of the photo-interrupters 32A–32C and initiates a reversal of rotation to flip-flop D1 (FIG. 16), as previously described, and D/A 253 returns to zero.

Exclusive-NOR gates A–B, B–C and A–C in FIG. 16 are continually monitoring the steps 1–6 of the table shown in the table of FIG. 17. However, their outputs go to the "D" input of flip-flops D2–D4 and initiate no change without a clock pulse from flip-flop D1 to the "C" input. This only occurs when at zero or near zero RPM, and Up/Down Counter 252 of FIG. 18 sends a CW/CCW signal to the D input of flip-flop D1 followed by a first artificial clock pulse from pin 10 of U12B (FIG. 8D). This results in a change of direction of rotation and only when Up/Down Counter 252 and Up/Down Digital Error 256 of FIG. 18 receives two consecutive pulses from any one of the photo-interrupters 32A–32C.

Figure 22:
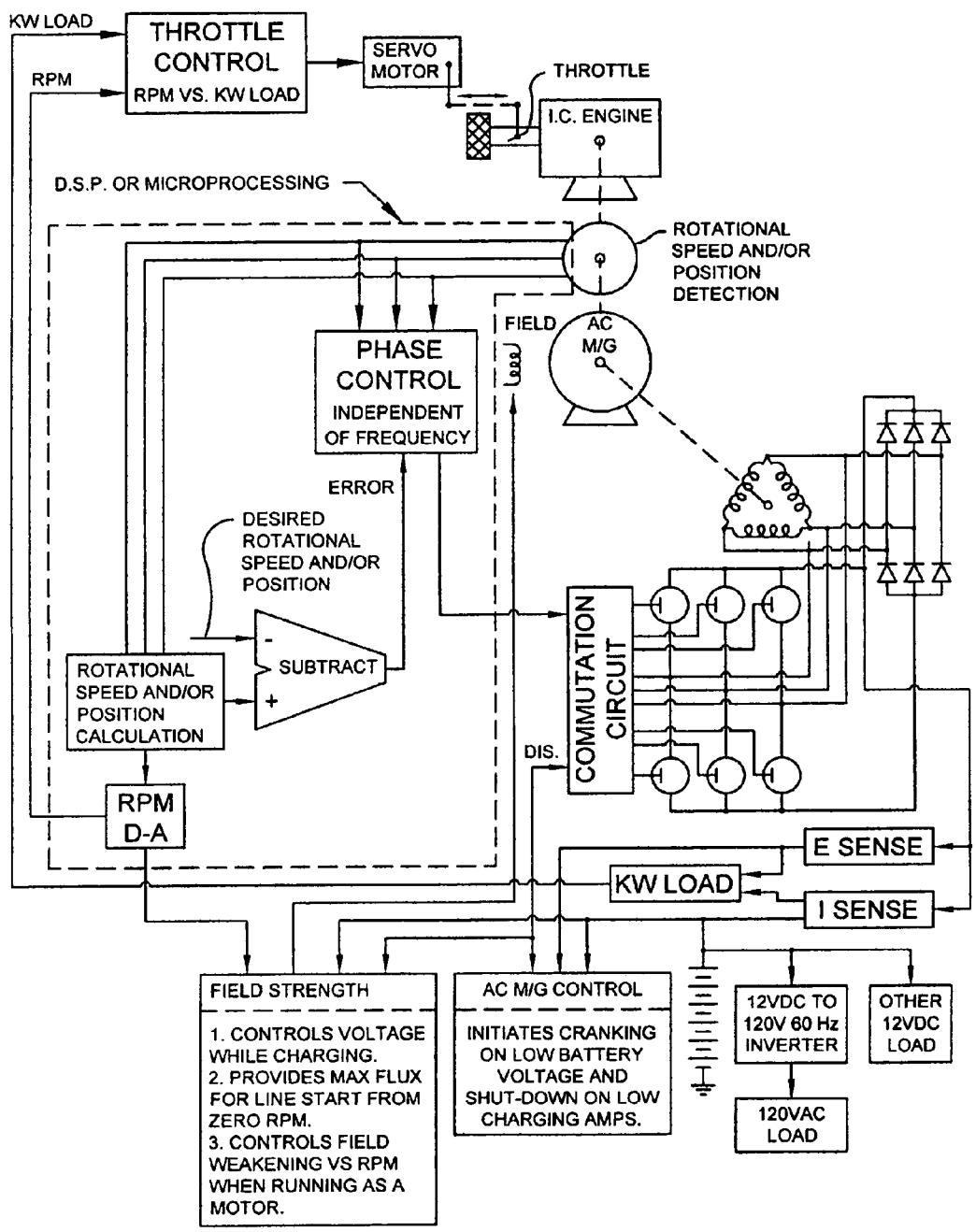
FIG. 22 is a detailed electrical schematic of a control circuit for digital signal processing for speed and/or position.

IV. Additional and Alternate Embodiments or Features:

A. Using a Microprocessor or Microcontroller:

FIG. 22 illustrates an exemplary schematic diagram for implementing one such microprocessor based control circuit. A microprocessor may be a microcontroller, an ASIC, a PAL or any other dedicated integrated circuit or combinations thereof. There are many analog measurements such as voltage and current that would have to be converted to digital signals, i.e., analog to digital (A/D), and then all computations such as phase control, throttle control, etc. could be calculated by way of known digital computations. Logic decisions such as start and stop could also be done digitally. However, the final control functions are analog in nature such as throttle position, field strength by way of field current, etc., which would require digital to analog (D/A) conversion.

"Rotational speed" as measured and "desired rotational speed", i.e., $VR_{PM}$ and $SPV_{RPM}$, could be either digital or analog. If the variables (process and setpoint) are analog, then the error or difference needs to be converted, i.e., A/D, for input to phase control; otherwise, the variables could remain as digital and go directly to phase control. Phase control by microprocessing would include using the same equations that are used in plotting the graphs for the algorithm. The calculations would preferably be done in nanoseconds (ns) and be repeated twice for each cycle for each phase of 3-phase power. The delayed pulse to the commutation circuit is the same, as previously described in analog. Also microprocessing could be used to calculate throttle position based on KW load provided $VR_{PM}$, voltage and current signals are first converted A/D. The conversion could be done repetitively at a high frequency rate (i.e., KHz) and then converted back via a D/A for the throttle servo motor. The same would apply for field control for both field weakening when the synchronous machine 20 is being used as a motor and for field strength when used for voltage control while generating. Logic decisions could be done with microprocessor technology. Other logic decisions such as IC engine 12, start and stop could also be done with microprocessor technology.

V. Charging and Discharging Batteries:

It is well known in the art that lead-acid batteries, in the interest of long life, should have their cells connected in parallel for charging and in series for discharging. The reason is that they may vary slightly in efficiency and performance. A cell fully charged and at rest has a voltage of approximately 2.10 volts, but when discharged nearly completely and again at rest, has a voltage of approximately 1.75 volts. These voltages could vary, e.g., the 2.1 volts could be slightly higher for a battery that is overcharged or for a chemical imbalance or the 2.1 volts could be slightly lower for a chemical imbalance. Starting-lighting-ignition (SLI) batteries suffer more sulfation than deep cycle batteries when brought to a deep discharge state, especially if they are allowed to remain in that state. Also, batteries that may not be able to perform the job for which they are intended, may be considered dead or near dead, e.g., starting a large engine in very cold weather where a 1.75V is a minimum could be as high as 1.95 V/cell. The above voltages are at a battery temperature of 25° C. or 76° F. Because all cells are not precisely the same they will, if discharged in series, receive the same discharge current, but if charged in series they would also receive the same charging current. The poorer or less efficient cells would discharge to a greater degree; but because they receive the same charging current when connected in series for charging, they would fail to receive a full charge along with the more efficient cells. However, if all cells were connected in parallel for charging, the poorer cells with a lower terminal voltage would receive more charging current than the more efficient cells with their higher terminal voltage and therefore all cells would tend to become fully charged at the same time. Also, when charging at a constant potential (considered to be approximately 2.33 volts per cell at 25° C.) the measured charging current will decrease as the cell (or cells) become more fully charged. A measured low current of approximately 5% of the ampere-hour capacity (at a 20 hour discharge rate) is considered a near full charge. If, when at rest (no further charge or discharge), the terminal voltage drops below 2.10 volts per cell, additional charge needs to be added.

In most instances it is impractical to take advantage of charge in parallel and discharge in series, especially in the instance of a hybrid automobile where accelerating and braking (discharging and charging) sometimes occurs in rapid succession. However, by taking advantage of four wheel drive with a separate synchronous machine 20 and battery BT1–BT4 for each wheel WHEEL1–WHEEL4 for both accelerating and braking, as previously described and shown in FIG. 8E, a method of disconnecting the batteries BT1–BT4 from each other as they may become fully charged either from braking or from the on board IC engine-driven charger is also provided herein.

Figure 7A:
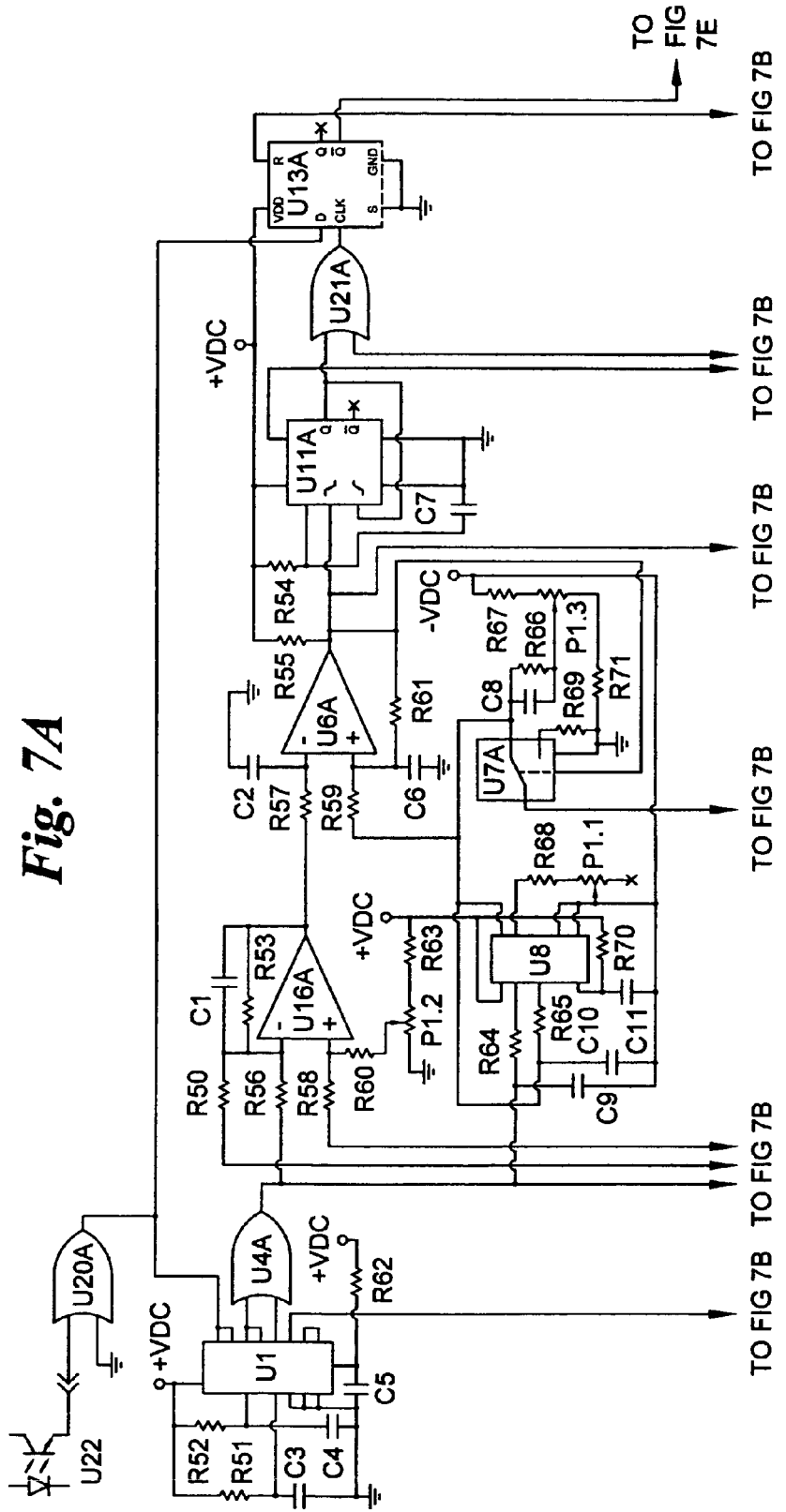
Figure 7C:
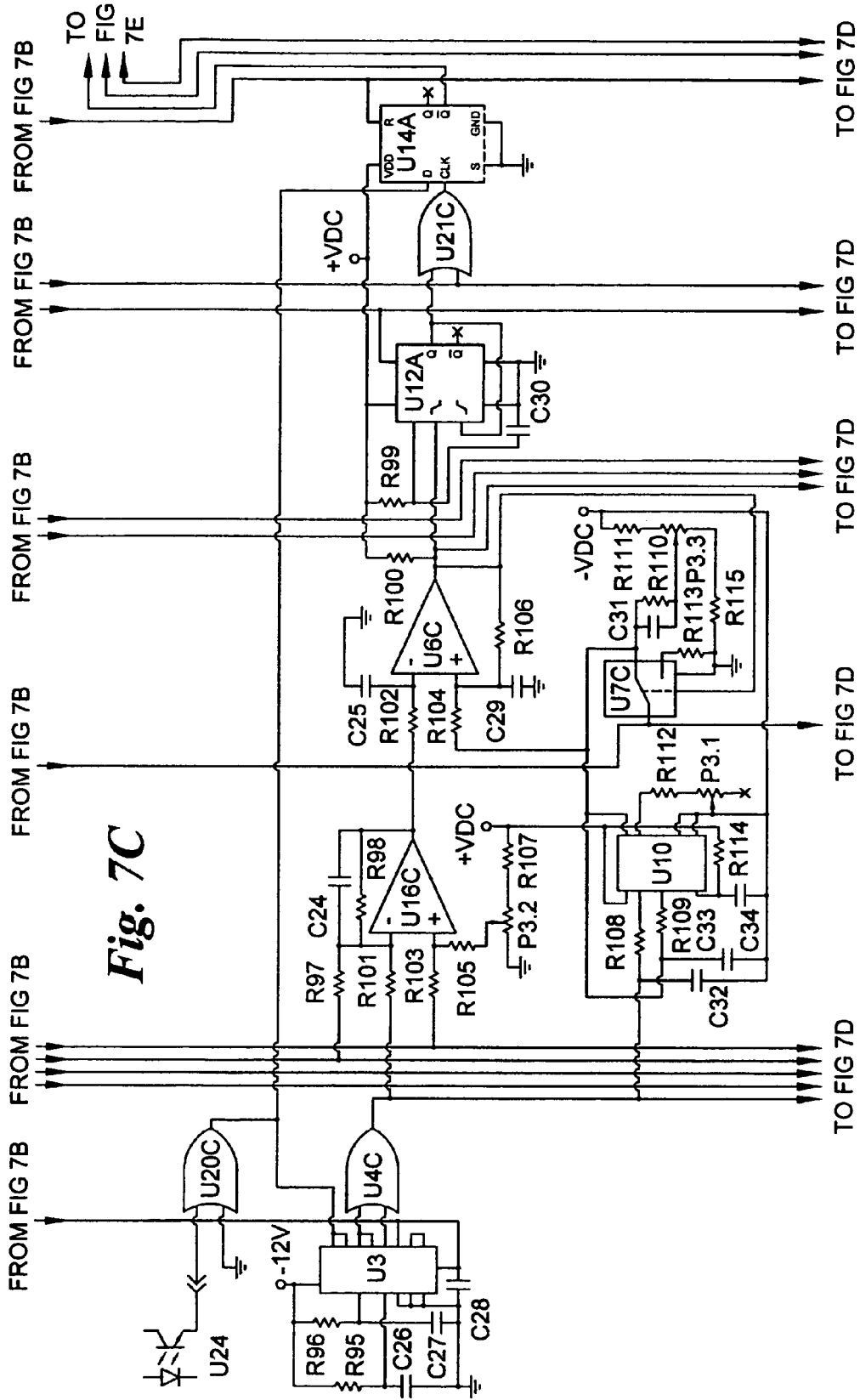
Figure 7D:
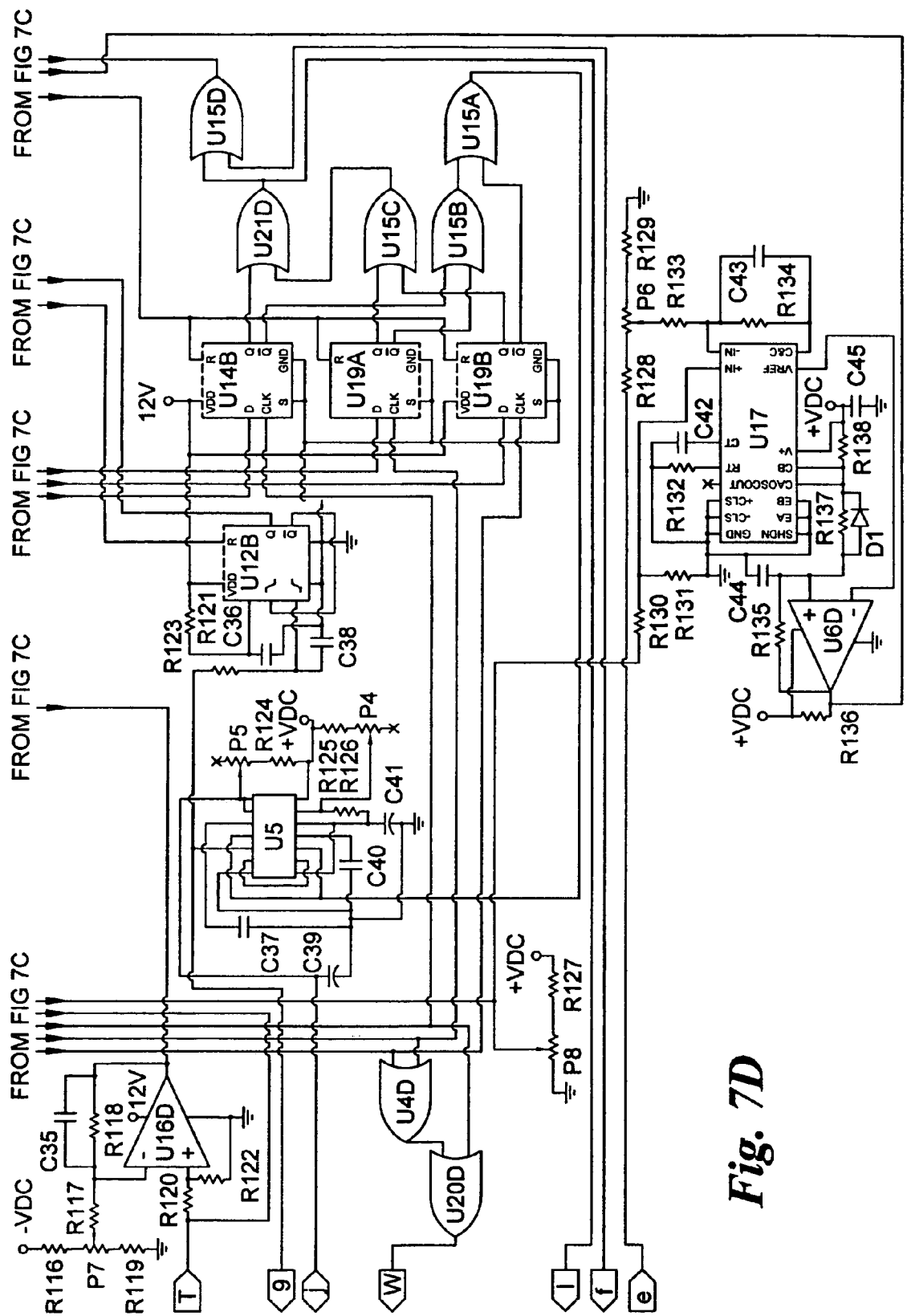
Figure 7E:
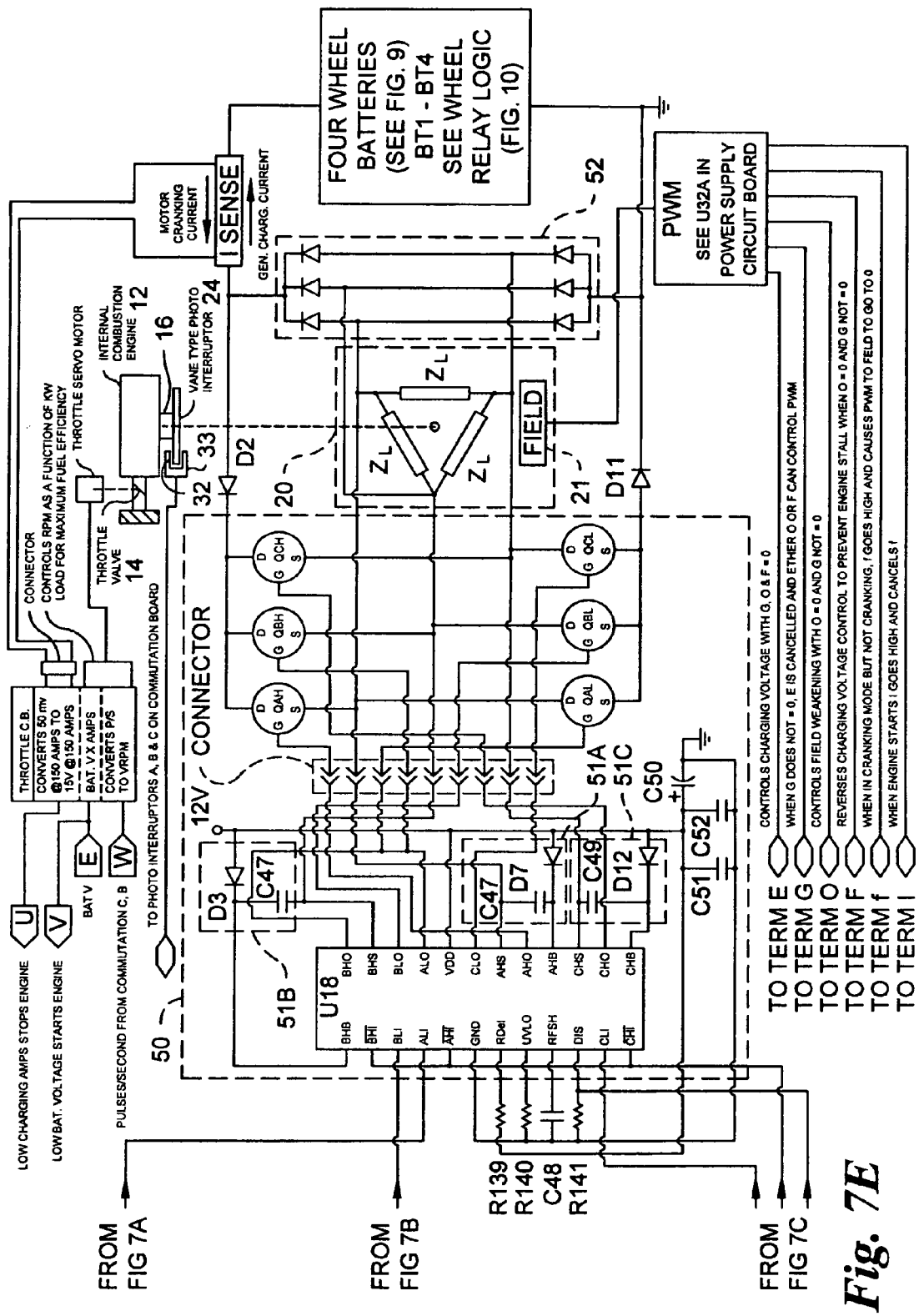
Figure 8A:
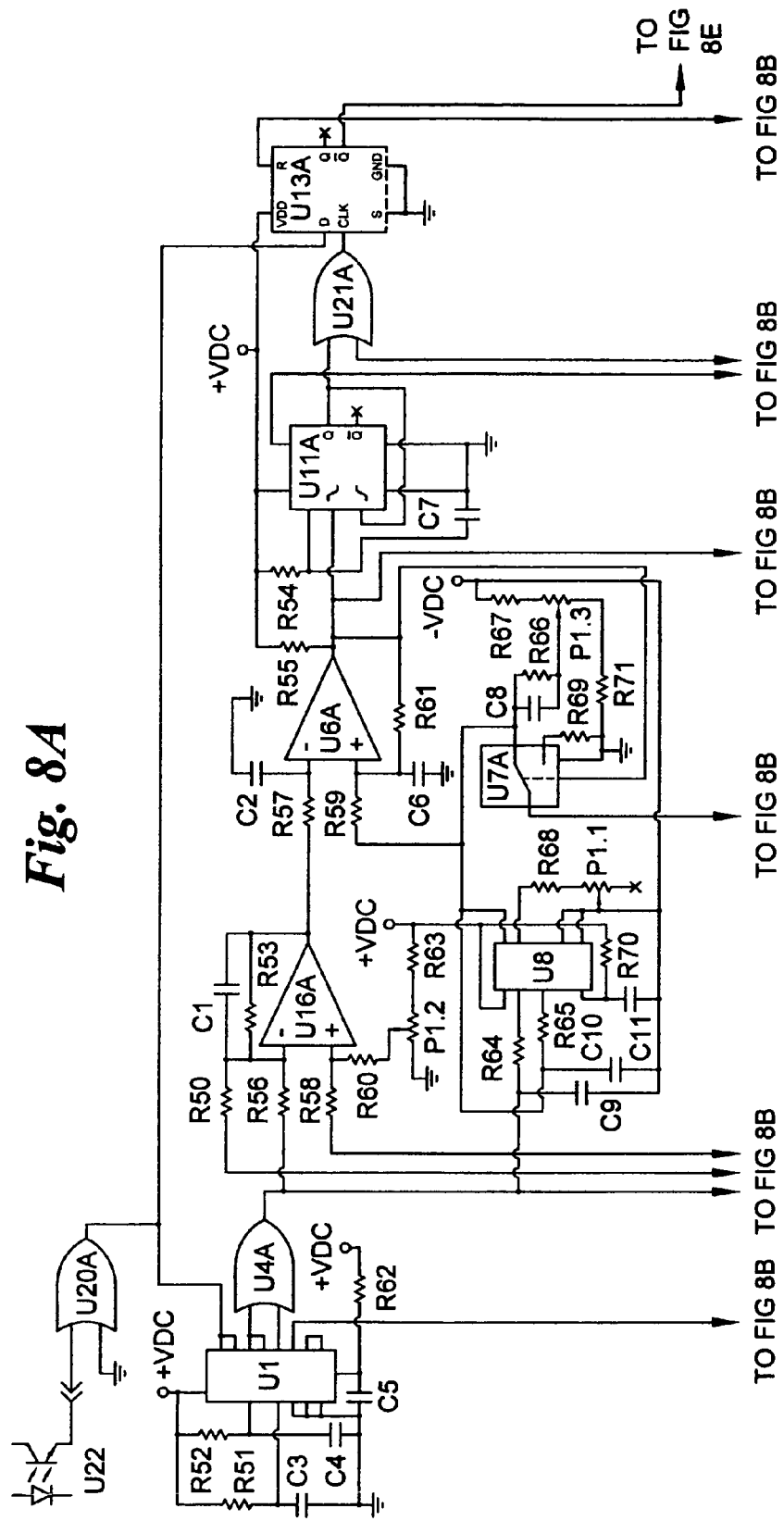
Figure 8C:
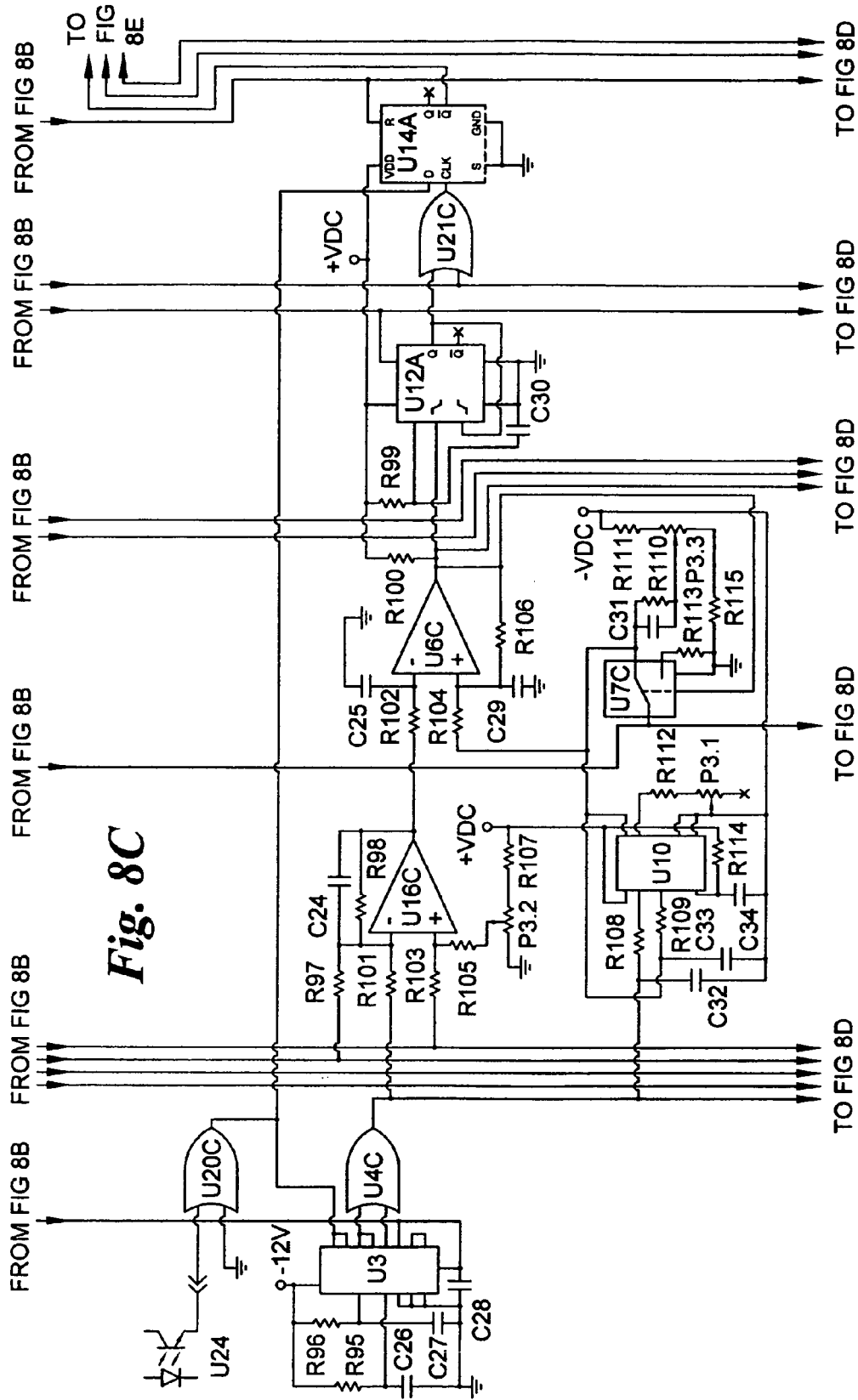
Figure 8D:
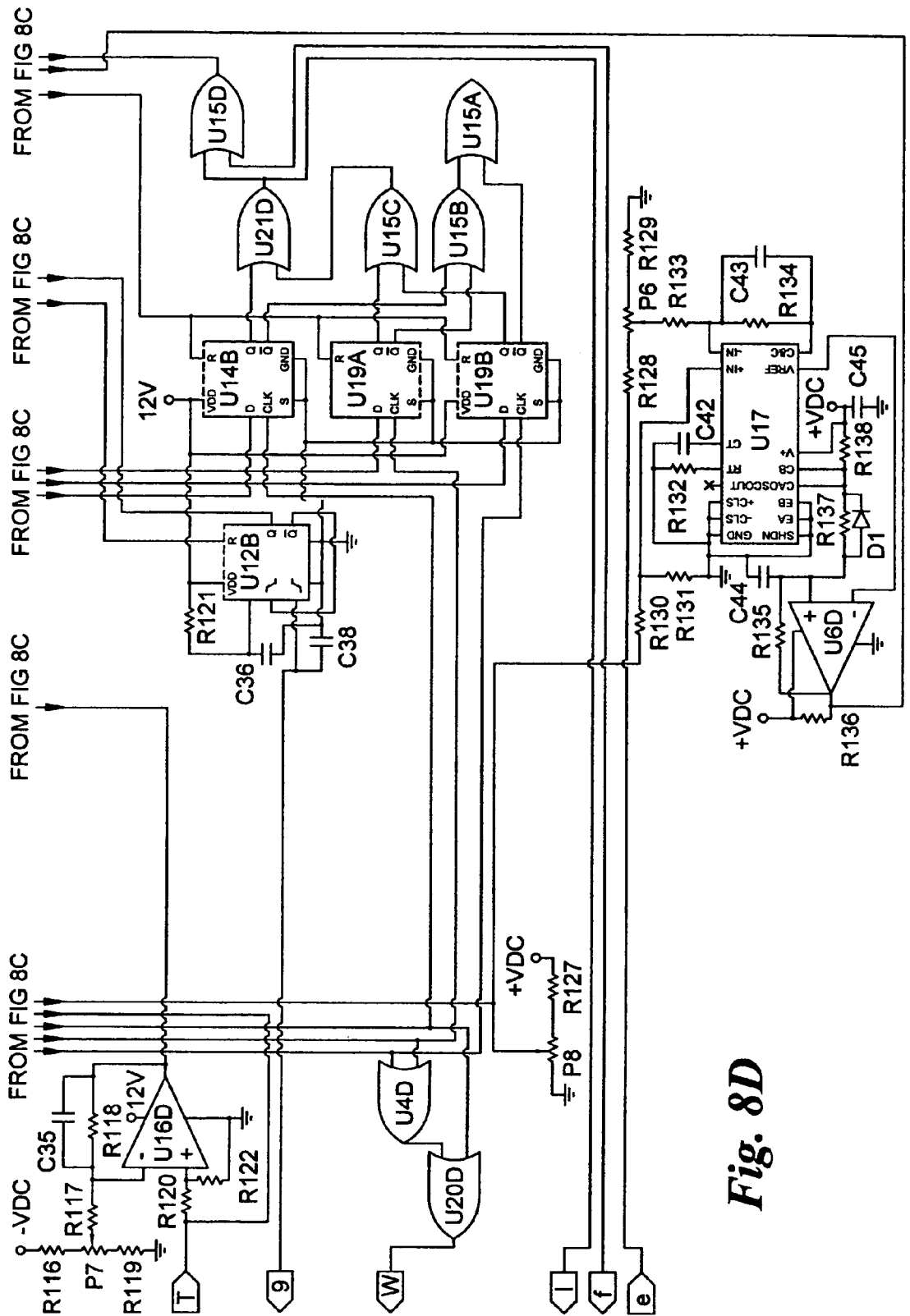
Figure 8E:
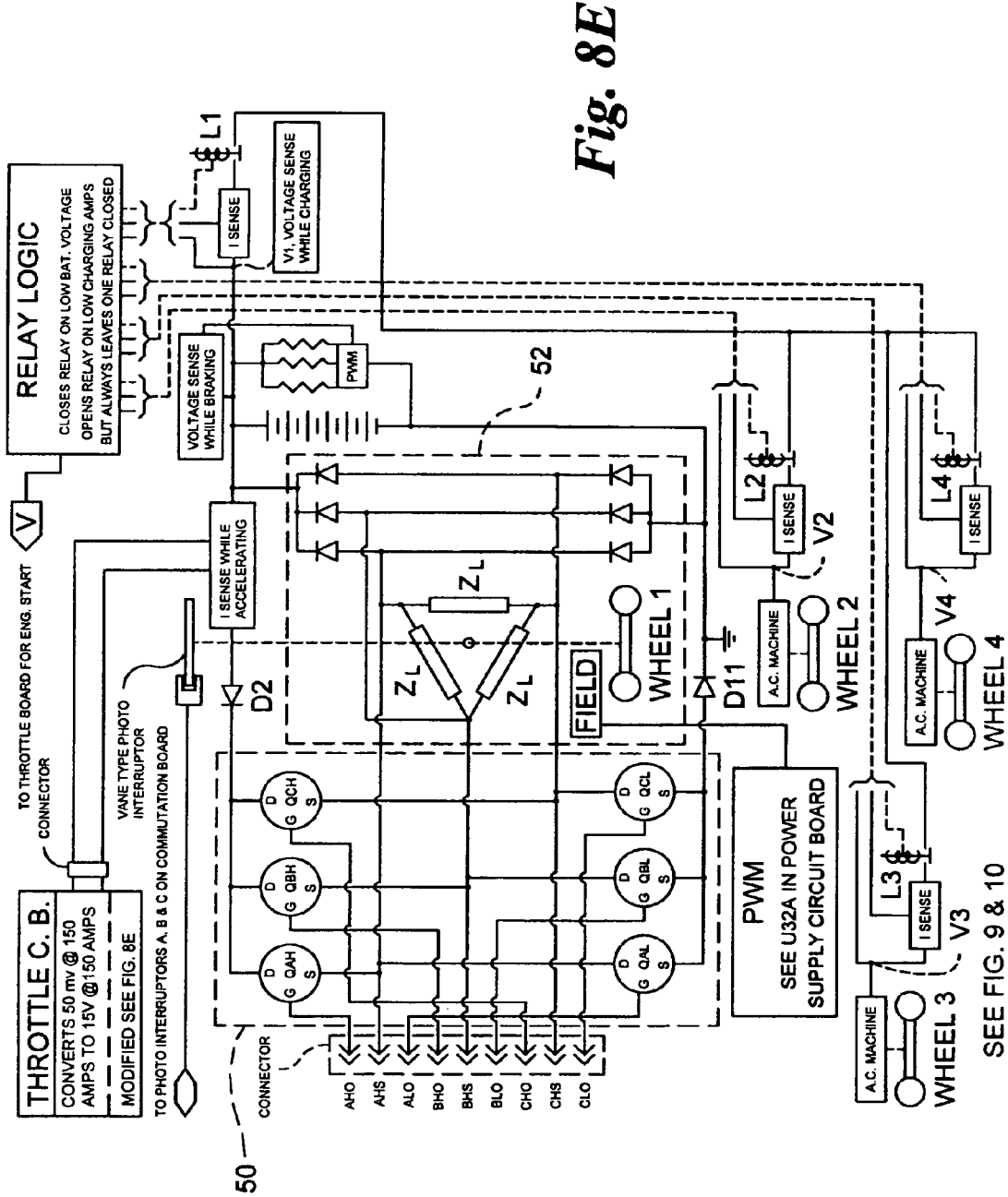
Figure 9:
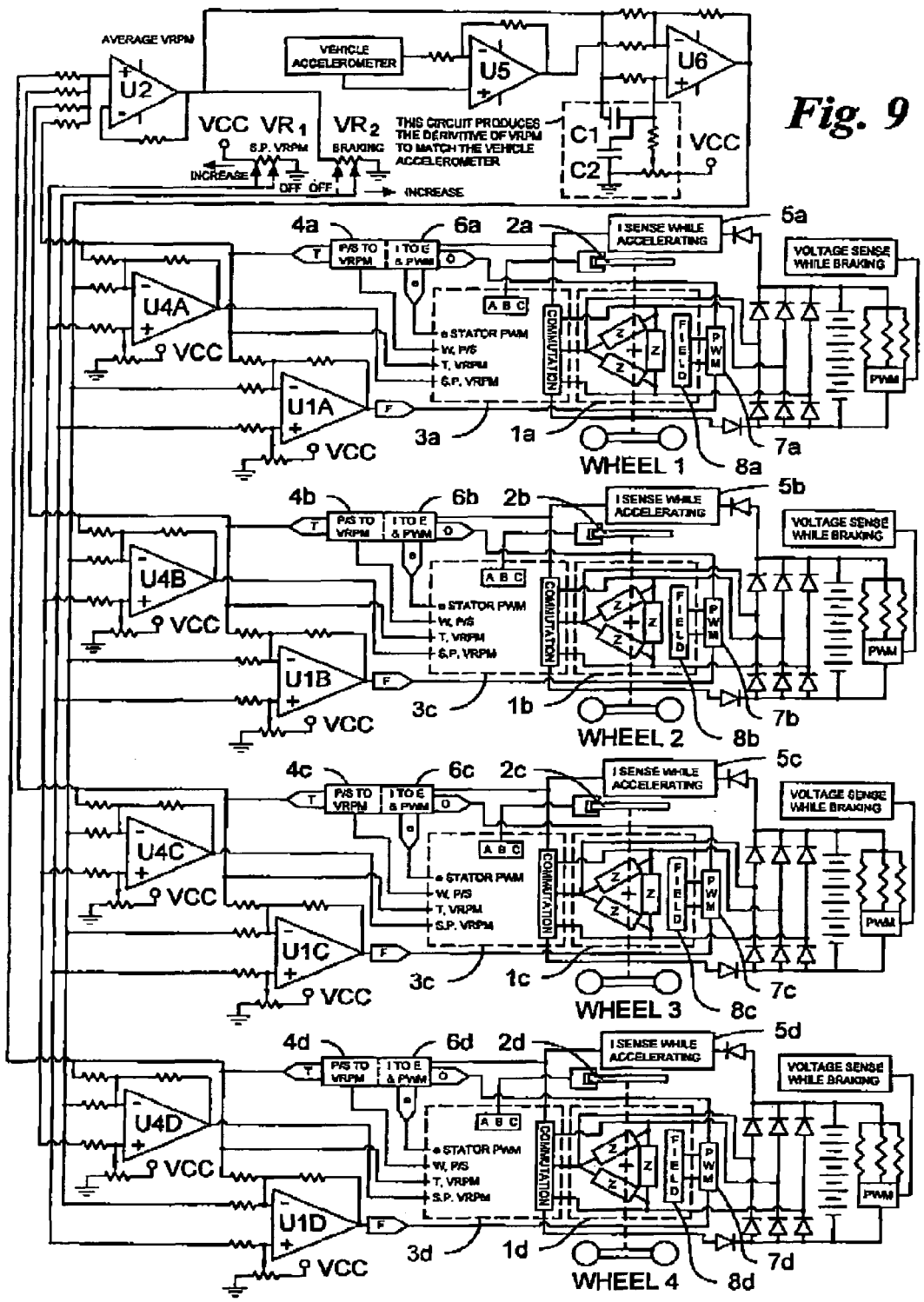
FIG. 9 is a functional schematic diagram of a four wheel control circuits and a differential control circuit integrated together for a four wheel hybrid automobile.
Figure 10:
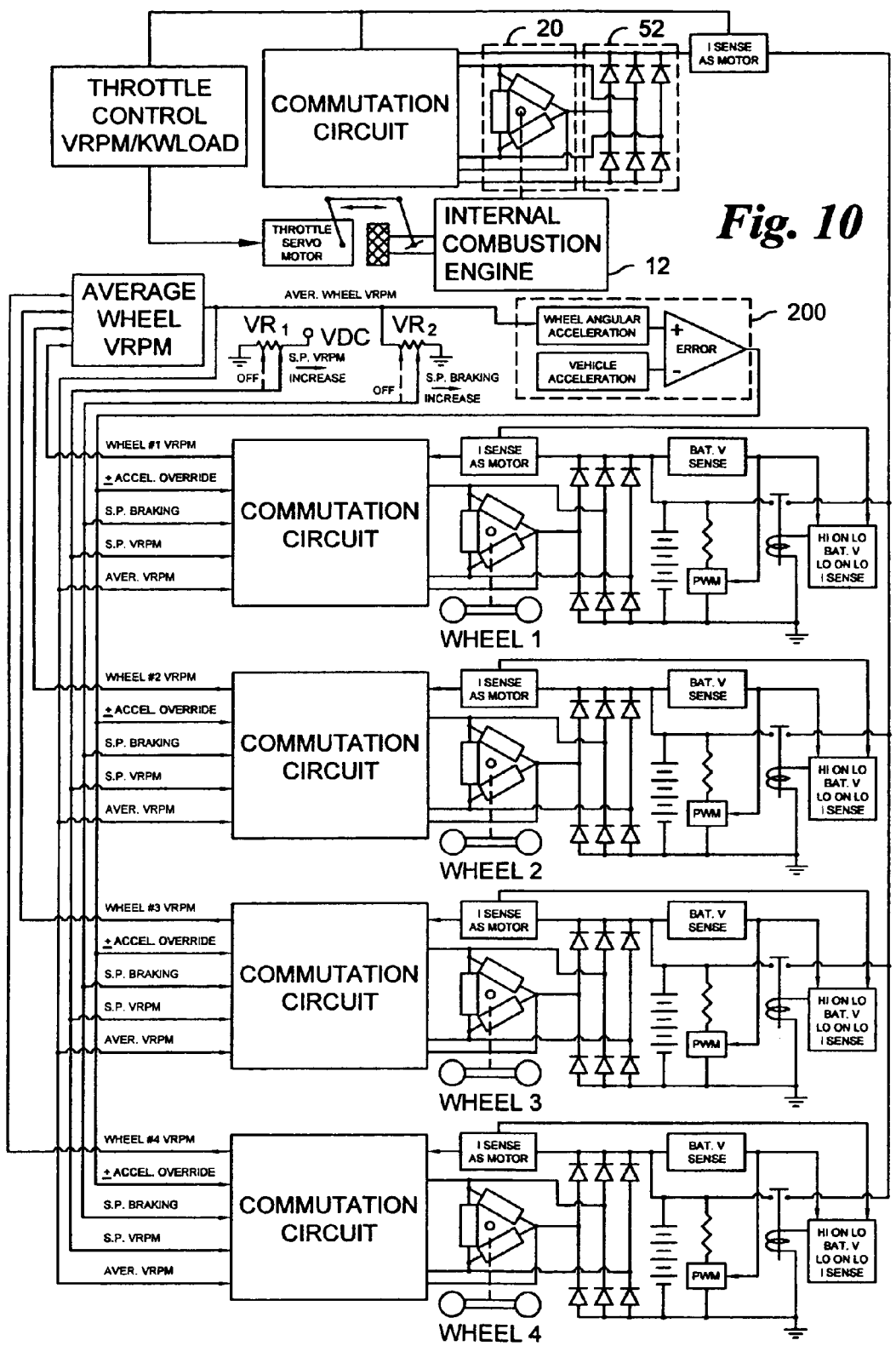
FIG. 10 is a block diagram schematic of the control circuit of FIG. 9.

This method is shown in FIG. 8E which also shows the simple connection between FIG. 7E, the on board IC engine driven charger, and FIG. 9, the interconnections between each wheel WHEEL1–WHEEL4 and each wheel's separate battery BT1–BT4. What is not shown in FIG. 9 is the "RELAY LOGIC" section which is shown in FIG. 8E along with four relays (L1–4), four $I_{SENSE}$ elements $I_{s1}$–$I_{s4}$, and a voltage sense connection to sense charging voltage while braking. They, as shown, are all connected to the RELAY LOGIC board. The RELAY LOGIC board, by sensing the appropriate low charging current to any of the four batteries BT1–BT4, will cause its associated relay to open to isolate that battery BT1–BT4 from the rest to prevent it from being overcharged. Of the rest, they too will, when fully charged, be disconnected. However, when three are disconnected, the fourth will remain connected. With the three disconnected batteries BT1–BT4, all four batteries BT1–BT4 are isolated from each other to prevent any from being overcharged. When the fourth is fully charged, the IC engine 12 is shut down but the battery BT1–BT4 remains connected to start the IC engine 12 if any of the four should drop in voltage as shown in FIG. 8E where any battery with low voltage will start the IC engine 12 through terminal labeled "V" of FIG. 7E. While this method is not total "series discharge" with total "parallel charge" it is a step in the proper direction, i.e., each group may be similarly discharged, but they are charged in parallel and disconnected when fully charged to prevent overcharge of a group while bringing all up to full charge.

Figure 23:
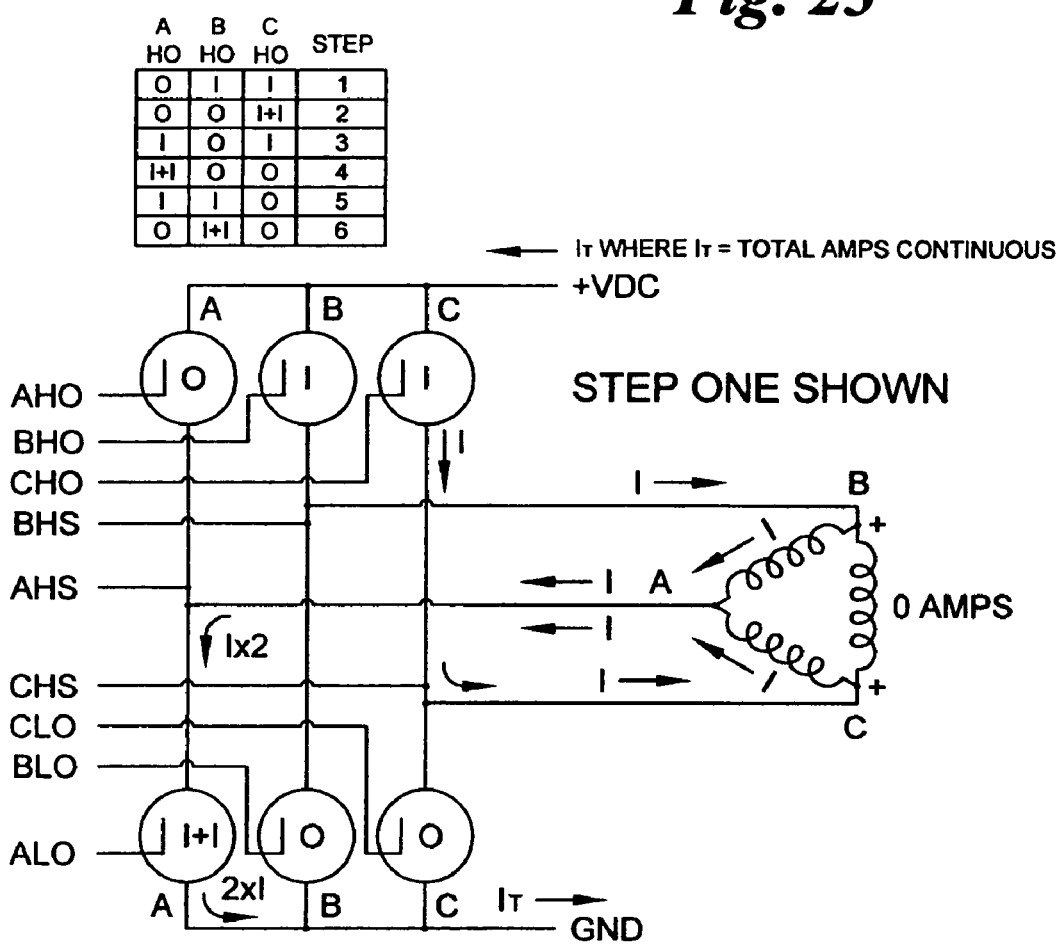
FIG. 23 is a detailed schematic and table for a six transistor commutation circuit.

VI. Multiple Parallel Power Transistors:

FIG. 23 shows the conventional method of providing commutation with six power transistors (three high and three low) such as metal-oxide-semiconductor field effect transistor (MOSFET) or insulated gate bipolar transistor (IGBT). The sequence of switching is illustrated in two Tables FIG. 23 one for the high and one for the low-side. A "0" indicates a transistor is not conducting, and an "1" indicates a transistor is conducting. Therefore, out of six transistors, three will always be conducting and three will not be conducting. When two HI's are conducting, the one LO will be conducting the combined current of the two HI's or 2 times the current I. Likewise, when two LO's are conducting, the one HI will be conducting the combined current of the two LO's. It can also be noted from the table of FIG. 4 that I+I or 2I will be conducting ⅙ of the time while I will be conducting ⅓ of the time. This is true for all six power transistors. Therefore, a $I_{AVE}$ can be expressed as follows:

$$(2I) \text{ for } \tfrac{1}{6} \text{ of time} + I \text{ for } \tfrac{1}{3} \text{ of time} = I_{AVE} \text{ or}$$

$$(2I) \times \tfrac{1}{6} + I \times \tfrac{1}{3} = I_{AVE} \text{ or}$$

$$\tfrac{1}{6}(2I) + \tfrac{1}{3}(I) = I_{AVE}, \text{ the current supplied to the stator.}$$

But, all power transistors have ON resistance while conducting, and therefore, a maximum continuous current flow rating governed by $I^2R$. Therefore, the power can be expressed as:

$$\tfrac{1}{6}(2I)^2 R + \tfrac{1}{3}(I)^2 R = I_{AVE}^2 R, \text{ where } R \text{ is the "ON"}$$
resistance of the transistor, $$\tfrac{4}{6}(I^2) + \tfrac{1}{3}(I^2) = I_{AVE}^2$$

$$I = I_{AVE}$$

Figure 24:
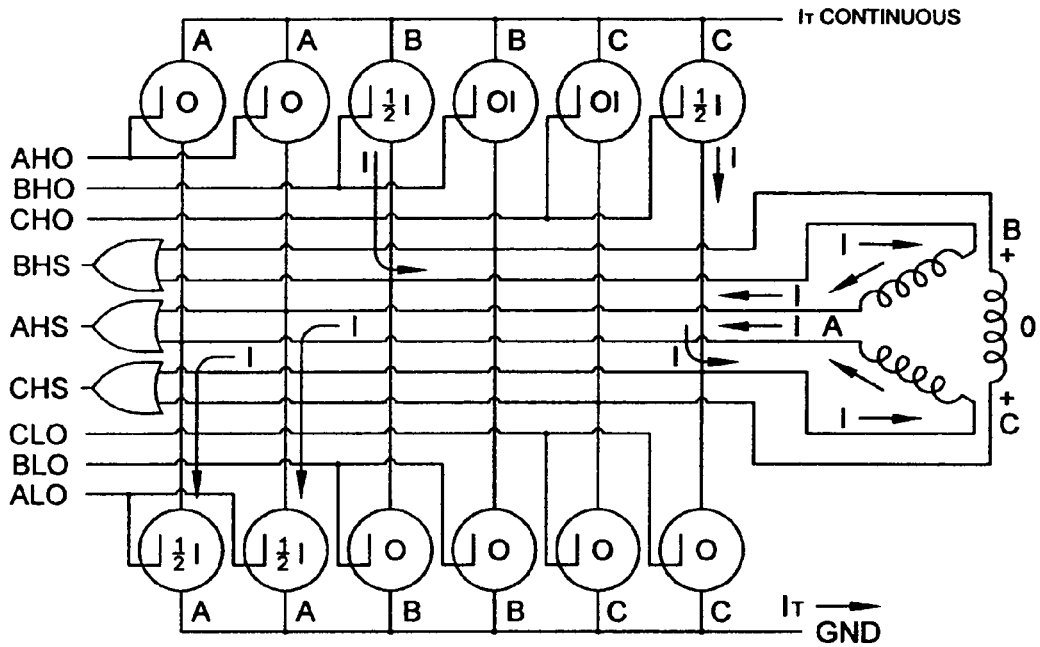
FIG. 24 is a detailed schematic and table for a twelve transistor commutation circuit.

Since $I_{AVE}$ is shown on FIG. 24 as I, continuous, it seems counterintuitive that this is also the same average current flow for each transistor even while it is only conducting for ½ of the time. But the explanation is simple, for ⅙ of the time each transistor is conducting twice the current flow, hence $(2I)^2$ for ⅙ of the time is equivalent to $4I^2$ for ⅙ of the time which can be expressed as:

$$\tfrac{4}{6}(I^2) + \tfrac{1}{3}(I^2) = I_{AVE}^2, \text{ where } I^2 R \text{ is the power dissipated by each transistor.}$$

From the above, it is quite evident that brushless DC motors will be limited in size by the amount of current and (high) voltage that MOSFET's and/or IGBT's can handle. MOSFET's will carry more current than IGBT's, but IGBT's will sustain a higher voltage. Therefore, for a selection based upon total power (i.e., W=EI), the IGBT's are the best choice. However, if batteries BT1–BT6 are used in series to obtain high voltage, a problem arises when it is desired to charge the batteries in series with the same synchronous machine 20. Weaker cells discharge faster and charge slower when in series. When batteries BT1–BT6 are charged in parallel, weaker cells will receive more current with respect to voltage applied; therefore, weaker cells in parallel will receive more charging current, and therefore, will tend to reach full charge along with the more efficient cells, as previously described.

Thus, it would be desirable to connect multiple power transistors, MOSFETs or IGBT's, in parallel. It does not appear to be possible for IGBT's because their "ON" resistance decreases with an increase temperature. Therefore, when one IGBT becomes hotter than the rest of the IGBT's connected in parallel, it will conduct more current and will very likely ultimately fail. With MOSFET's, the "ON" resistance increases with temperature and forces others in parallel to conduct a larger portion of the current. So while it appears as though MOSFET's can be connected in parallel, and indeed they can, it is generally still not a good idea, because while even if all have the same temperature, they may not all have precisely the same "ON" resistance.

Figure 25:
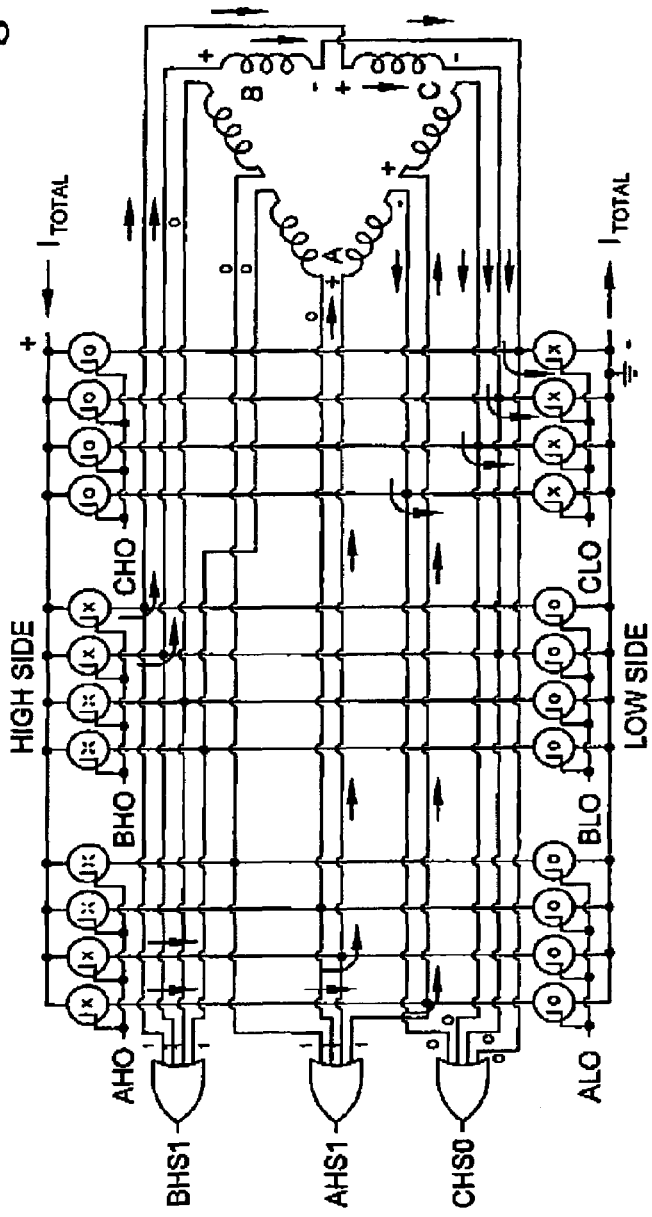
FIG. 25 is a detailed schematic and table for a twenty-four transistor commutation circuit.

A method is shown in FIG. 24 using twelve (12) MOSFETs or IGBTs where each is conducting one-third (⅓) of the time, and none is ever conducting twice the current of the others. Therefore, the average load is ⅓$I^2$R, or ⅓ of the average load as in FIG. 23. The average maximum load can then be increased to 3.464 times that if the same power transistor is used. If the number of devices were to be doubled again to twenty-four, as shown in FIG. 25, by splitting each phase winding in half and giving each half a separate MOSFET or IGBT, the maximum load is about 6.9282 time greater or double that for twelve. This illustrates an effective method of using the stator windings as a step-up transformer for effective high voltage AC from low voltage DC without resorting to many battery cells all being connected in series. In the case of IGBTs, they can be used with more batteries in series for very high voltage, but also in parallel, and control Megawatts instead of Kilowatts. The IGBTs would be effectively in parallel, but not electrically in a parallel.

As described above, a polyphase synchronous machine has a stator and a rotor. The stator has a plurality of stator windings. Each stator winding has a plurality of stator winding leads. The rotor also has a plurality of rotor windings. Each rotor winding has a plurality of rotor winding leads. The rotor windings are inductively coupled to the stator windings by proximity and cause electrical power to be induced in the stator windings when the polyphase synchronous machine is being operated as a generator or receiving electromotive force from the stator windings when the polyphase synchronous machine is being operated as a motor. The polyphase machine may be configured with a step-up circuit formed by connecting a step-up sub-combination of the plurality of stator winding leads and by separately connecting a step-up sub-combination of the plurality of rotor winding leads, whereby the synchronous machine is configured as an electro-mechanical step-up transformer. The polyphase synchronous machine may be configured with a step-down circuit formed by connecting a step-down sub-combination of the plurality of stator winding leads and by separately connecting a step-down sub-combination of the plurality of rotor winding leads, whereby the synchronous machine is configured as an electro-mechanical step-down transformer. The step-up and step-down circuits may be as simple as tying particular winding leads together, like a conventional multi-tap or multi-voltage transformer.

From the foregoing, it can be seen that the present invention comprises an apparatus and a method for controlling a synchronous electrical machine which selectively acts as both a motor and a generator by controlling phase angle in conjunction with PWM control of the field winding and PWM control of the stator current. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A control device for a polyphase synchronous machine, the synchronous machine having a field coil, a rotor and polyphase windings, the control device comprising:
   (a) a machine frequency detection sensor that detects machine frequency, the detection sensor set to 90° advanced electrically with respect to the rotor of the synchronous machine; and
   (b) a control circuit including:
      (i) a machine frequency detection circuit coupled to the machine frequency detection sensor and configured to generate pulses corresponding to the detected machine frequency;
      (ii) a commutation driver circuit coupled to the machine frequency detection circuit and having a high-side output coupled to the windings and a low-side output coupled to the windings, the commutation driver circuit selectively and alternately controlling the high-side and low-side outputs to control commutation of the synchronous machine.
      (iii) a time delay circuit coupled to the machine frequency detection sensor, the machine frequency detection circuit and the commutation driver circuit, the time delay circuit providing a control output to the commutation driver circuit based upon an adjustable setpoint compared to a speed of the machine as measured by the machine frequency detection circuit.

2. The control device according to claim 1, wherein the control circuit further includes:
   (iv) a stator current control circuit, the stator current control circuit selectively overriding control of the commutation driver circuit to at least the high-side output.

3. The control device according to claim 2, wherein the stator current control circuit uses pulse width modulation (PWM) to selectively override the control of the high-side output.

4. The control device according to claim 1, wherein the control circuit further includes:
   (iv) a field coil voltage control circuit, the field coil voltage control circuit selectively modulating the voltage to the field coil to control back electromagnetic field (EMF).

5. The control device according to claim 4, wherein the field coil voltage control circuit uses pulse width modulation (PWM) to selectively modulate the voltage to the field coil.

6. The control device according to claim 1, wherein the control circuit is configured to control phase angle or torque with a linear voltage independently of frequency while simultaneously, by way of superposition, controlling torque with pulse width modulation (PWM) of stator current.

7. The control device according to claim 1, wherein the machine frequency detection circuit generates the commutation output when the synchronous machine is advanced and ceases the commutation output when the synchronous machine is lagging by a predetermined amount of phase.

8. The control device according to claim 1, wherein the control circuit is configured to control field weakening directly as a function of frequency to increase speed by reduction of back electromagnetic field (EMF).

9. The control device according to claim 1, wherein the control circuit further includes a setpoint amplifier having inverting and non-inverting inputs, a voltage representative of the speed of the machine as measured by the machine frequency detection circuit being applied to the inverting input of the setpoint amplifier as feedback.

10. The control device according to claim 1, wherein the machine frequency detection circuit is configured to determine when the phase of the stator flux vector of the machine is delayed beyond an in-phase condition of rotor position by a predetermined amount.

11. The control device according to claim 1, wherein the time delay circuit controls the phase of commutation from an advanced condition to an in-phase condition in an analog manner.

12. The control device according to claim 1, wherein the control circuit is configured to automatically switch control of the machine from motor control to generator control when the machine frequency detection circuit detects a predetermined amount of delay beyond an in-phase condition of the machine.

13. The control device according to claim 1, wherein the control circuit is at least partially implemented in a microprocessor.

14. The control device according to claim 1, wherein the control circuit further includes a one time false pulse circuit that provides a one-shot output when the machine is being started up from a zero-speed condition or when the control circuit has not been reset since commutation control has ceased.

15. The control device according to claim 1, wherein the control circuit further includes:
   (iv) a power transistor-driver bridge having two high-side and two low-side power transistors for each phase of the polyphase synchronous machine, the two high-side power transistors being electrically connected in parallel between the windings and a power source and the two low-side power transistors being electrically connected in parallel between the windings and ground, the high-side outputs of the commutation driver circuit activating and deactivating the two high-side power transistors and the low-side outputs of the commutation driver circuit alternately, with respect to the high-side power transistors, activating and deactivating the two low-side power transistors.

16. The control device according to claim 1, wherein the control circuit further includes:
   (iv) a phase detection circuit that detects when the machine is lagging and leading with respect to electrical phase angle, the phase detection circuit generating a commutation output when the machine is leading, the commutation output being coupled to the commutation driver circuit to allow commutation.

17. The control device according to claim 16, wherein the control circuit further includes:
   (iv) a phase detection circuit that detects when the machine is lagging and leading with respect to electrical phase angle, the machine frequency detection circuit ceasing the commutation output when the machine is lagging.

18. The control device according to claim 15, wherein low-side inputs of the commutation driver circuit, when on, deactivate high-side inputs of the commutation driver circuit and the low-side inputs of the commutation driver circuit, when off activate the high-side inputs of the commutation driver circuit.

19. A hybrid vehicle having a frame and at least two wheels, the at least two wheels being movably coupled to the frame, the vehicle comprising:
   (a) a power source that supplies polyphase electrical power and direct current (DC) power;
   (b) at least one battery coupled to the power source to charge using DC power;
   (c) an inverter coupled to the at least one battery to convert DC voltage to a polyphase voltage;
   (d) a drive-wheel polyphase synchronous machine coupled to the inverter to receive polyphase voltage when operating as a motor, the drive-wheel polyphase synchronous machine having a stator and a rotor, one of the stator and rotor being fixed to the frame of the hybrid vehicle and the other of the stator and rotor being mechanically coupled to one of the at least two wheels to provide drive power thereto in a driving mode and to receive power therefrom in a coasting or a braking mode, the drive-wheel polyphase synchronous machine controlling acceleration and deceleration of the wheel coupled thereto; and
   (e) a drive-wheel rectifying circuit that receives polyphase voltage from the drive-wheel polyphase synchronous machine and converts the polyphase voltage to a direct current voltage to charge the at least one battery when the drive-wheel polyphase synchronous machine is operating as a generator.

20. The hybrid vehicle of claim 19, wherein the power source includes:
   (i) an internal combustion engine having an output shaft;
   (ii) a power-system polyphase synchronous machine that converts mechanical input power to the polyphase electrical power being supplied, the power-system polyphase synchronous machine having a rotor and a stator, the output shaft being mechanically coupled to one of the rotor and the stator of the power-system polyphase synchronous machine; and
   (iii) a power-system rectifying circuit that receives polyphase voltage from the power-system polyphase synchronous machine and converts the polyphase voltage to a DC voltage to charge the at least one battery.

21. The polyphase synchronous machine according to claim 19, further comprising:
   (d) a step-down circuit formed by connecting a step-down sub-combination of the plurality of stator winding leads and by separately connecting a step-down sub-combination of the plurality of rotor winding leads, whereby the synchronous machine is configured as an electromechanical step-down transformer.

22. A hybrid vehicle having a frame, the vehicle comprising:
   (a) a power source that supplies polyphase electrical power and direct current (DC) power;
   (b) at least one battery coupled to the power source to charge using DC power;
   (c) an inverter coupled to the at least one battery to convert DC voltage to a polyphase voltage;
   (d) four drive wheels movably coupled to the frame of the vehicle;
   (e) four drive-wheel control devices, each drive-wheel control device comprising:

(i) a drive-wheel polyphase synchronous machine coupled to the inverter to receive polyphase voltage when operating as a motor, the drive-wheel polyphase synchronous machine having a stator and a rotor, one of the stator and rotor being fixed to the frame of the hybrid vehicle and the other of the stator and rotor being mechanically coupled to a respective one of the four drive-wheels to provide drive power thereto in a driving mode and to receive power therefrom in a coasting or a braking mode, the drive-wheel polyphase synchronous machine controlling acceleration and deceleration of the wheel coupled thereto;

(ii) a drive-wheel control circuit that measures and controls the speed of the drive-wheel polyphase synchronous machine; and (iii) a drive-wheel rectifying circuit that receives polyphase voltage from the drive-wheel polyphase synchronous machine and converts the polyphase voltage to a direct current voltage to charge the at least one battery when the drive-wheel polyphase synchronous machine is operating as a generator; and (f) an anti-slip detection circuit that compares the speed of each drive-wheel polyphase synchronous machine to the speed of the other drive-wheel polyphase synchronous machines, the anti-slip detection circuit determining when the speed of one of the drive-wheel polyphase synchronous machines is greater than or less than one or more of the other drive-wheel polyphase synchronous machines by a predetermined amount.

23. An electrical generator comprising:

(a) an internal combustion engine having an output shaft; and (b) polyphase synchronous machine mechanically coupled to the output shaft of the internal combustion engine, the synchronous machine having a field coil, a rotor and polyphase windings, the synchronous machine including:

(ii) a machine frequency detection sensor set to 90° advanced electrically;

(iii) a machine frequency detection circuit coupled to the machine frequency detection sensor and configured to control electrical phase of the synchronous machine independent of frequency;

(iv) a commutation driver circuit coupled to the machine frequency detection circuit and having a high-side output coupled to the windings and a low-side output coupled to the windings, to the commutation driver circuit controlling the commutation of the synchronous machine only when the machine frequency detection circuit provides the commutation output; and (v) a time delay circuit coupled to the machine frequency detection sensor, the machine frequency detection circuit and the commutation driver circuit, the time delay circuit providing a control output to the commutation driver circuit based upon an adjustable setpoint compared to a speed of the machine as measured by the machine frequency detection circuit, wherein control of the control output is independent of frequency.

24. A polyphase synchronous machine comprising:

(a) a stator having a plurality of stator windings, each stator winding having a plurality of stator winding leads;

(b) a rotor having a plurality of rotor windings, each rotor winding having a plurality of rotor winding leads, the rotor windings being inductively coupled to the stator windings by proximity and causing electrical power to be induced in the stator windings when the polyphase synchronous machine is being operated as a generator or receiving electromotive force from the stator windings when the polyphase synchronous machine is being operated as a motor; and (c) a step-up circuit formed by connecting a step-up sub-combination of the plurality of stator winding leads and by separately connecting a step-up sub-combination of the plurality of rotor winding leads, whereby the synchronous machine is configured as an electro-mechanical step-up transformer.

25. An internal combustion engine-powered synchronous machine comprising:

(a) an internal combustion engine having a motor speed and an output shaft;

(b) a fuel flow control device that controls the flow of fuel to the internal combustion engine;

(c) a synchronous machine coupled to the output shaft of the internal combustion engine, the synchronous machine having an electrical load;

(d) a control circuit that measures the electrical load of the synchronous machine and continuously controls the fuel flow control device in order to control the motor speed of the internal combustion engine based upon the measured electrical load from an idle speed to a maximum speed so as to achieve an optimal fuel efficiency with respect to electrical load.

26. The internal combustion engine-powered synchronous machine of claim 25, wherein the control circuit momentarily shifts electrical load, when there is a sudden electrical load increase at low engine speed, from the generator to the battery in order to prevent engine stall.

* * * * *

UNITED STATES PATENT AND TRADEMARK OFFICE
CERTIFICATE OF CORRECTION

PATENT NO. : 7,064,513 B2 Page 1 of 1
APPLICATION NO. : 10/955451
DATED : June 20, 2006
INVENTOR(S) : Thomas D. Fenley It is certified that error appears in the above-identified patent and that said Letters Patent is hereby corrected as shown below:

Title page, Section (73)

The assignee should read -- J.L. Behmer Corporation, Perkasie, PA (US) --.

Signed and Sealed this

Sixteenth Day of October, 2007

JON W. DUDAS
*Director of the United States Patent and Trademark Office*